United States Patent
Niinuma et al.

(10) Patent No.: US 7,526,110 B2
(45) Date of Patent: Apr. 28, 2009

(54) BIOMETRIC INFORMATION AUTHENTICATION DEVICE, BIOMETRIC INFORMATION AUTHENTICATION METHOD, AND COMPUTER-READABLE RECORDING MEDIUM WITH BIOMETRIC INFORMATION AUTHENTICATION PROGRAM RECORDED THEREON

(75) Inventors: Koichiro Niinuma, Kawasaki (JP); Satoshi Semba, Kawasaki (JP); Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 732 days.

(21) Appl. No.: 11/084,168

(22) Filed: Mar. 21, 2005

(65) Prior Publication Data

US 2006/0078177 A1   Apr. 13, 2006

(30) Foreign Application Priority Data

Oct. 8, 2004   (JP) .............................. 2004-296301

(51) Int. Cl.
 *G06K 9/00* (2006.01)
(52) U.S. Cl. ........................... 382/125; 283/68; 283/78; 340/5.53; 340/5.83; 382/218; 713/186
(58) Field of Classification Search ................. 235/382; 283/68, 69, 78; 340/5.83, 5.52, 5.53, 5.82; 382/118, 124, 125, 209, 115, 218; 705/44; 713/186

See application file for complete search history.

(56) References Cited

U.S. PATENT DOCUMENTS

| | | | |
|---|---|---|---|
| 5,109,428 A | 4/1992 | Igaki et al. ................... 382/5 |
| 5,426,708 A | 6/1995 | Hamada et al. ............. 382/125 |
| 5,493,621 A | 2/1996 | Matsumura ................. 382/125 |
| 5,796,857 A | 8/1998 | Hara .......................... 382/124 |
| 5,978,495 A * | 11/1999 | Thomopoulos et al. ..... 382/124 |

(Continued)

FOREIGN PATENT DOCUMENTS

EP   0 329 166   8/1989

(Continued)

OTHER PUBLICATIONS

European Search Report, mailed Nov. 21, 2006, and issued in corresponding European Patent Application No. 05251923.8-1224.

(Continued)

*Primary Examiner*—Gregory M Desire
(74) *Attorney, Agent, or Firm*—Staas & Halsey LLP

(57) ABSTRACT

For personal authentication using biometric information, to allow for unfailing authentication without increasing verification time even for an authentication object that is not supported only by a minutia matching method, the present invention provides a biometric information authentication device comprising: a first verifying section for verifying first to-be-verified data against first registration data registered preliminarily using a minutia matching method; a second verifying section for verifying second to-be-verified data against second registration data registered preliminarily using a pattern matching method; and a determining section for comparing match degree, which is obtained as a result of verification by the first verifying section, with a first threshold value and a second threshold value to allow the second verifying section to perform verification in the case where the match degree is equal to or smaller than the first threshold value and equal to or larger than the second threshold value.

31 Claims, 40 Drawing Sheets

U.S. PATENT DOCUMENTS

| | | | |
|---|---|---|---|
| 6,031,942 A | 2/2000 | Nakayama | 382/284 |
| 6,067,369 A | 5/2000 | Kamei | |
| 6,233,348 B1 | 5/2001 | Fujii et al. | 382/125 |
| 6,266,433 B1* | 7/2001 | Bolle et al. | 382/125 |
| 6,282,304 B1* | 8/2001 | Novikov et al. | 382/125 |
| 6,546,122 B1* | 4/2003 | Russo | 382/125 |
| 6,751,340 B2* | 6/2004 | Prokoski | 382/118 |
| 6,901,155 B2* | 5/2005 | Xia et al. | 382/125 |
| 6,983,061 B2 | 1/2006 | Ikegami et al. | |
| 6,993,166 B2* | 1/2006 | Lo et al. | 382/124 |
| 7,020,310 B2* | 3/2006 | Tumey et al. | 382/124 |
| 7,142,699 B2* | 11/2006 | Reisman et al. | 382/124 |
| 7,197,168 B2* | 3/2007 | Russo | 382/125 |
| 2002/0035542 A1* | 3/2002 | Tumey et al. | 705/44 |
| 2002/0126883 A1* | 9/2002 | Senior | 382/125 |
| 2002/0174347 A1* | 11/2002 | Ting | 713/186 |
| 2003/0021452 A1* | 1/2003 | Hamid | 382/124 |
| 2003/0044052 A1* | 3/2003 | Martin | 382/125 |
| 2003/0223625 A1* | 12/2003 | Hillhouse et al. | 382/125 |
| 2004/0005087 A1* | 1/2004 | Hillhouse | 382/125 |
| 2004/0032976 A1* | 2/2004 | Hara et al. | 382/125 |
| 2004/0125993 A1* | 7/2004 | Zhao et al. | 382/124 |
| 2004/0144841 A1* | 7/2004 | Tsukamoto et al. | 235/382 |
| 2004/0151352 A1 | 8/2004 | Nakajima et al. | 382/124 |
| 2005/0129290 A1* | 6/2005 | Lo et al. | 382/124 |
| 2006/0078177 A1* | 4/2006 | Niinuma et al. | 382/124 |
| 2007/0206841 A1* | 9/2007 | Hamid | 382/124 |

FOREIGN PATENT DOCUMENTS

| | | |
|---|---|---|
| EP | 1093079 A2 | 4/2001 |
| GB | 2 278 945 | 12/1994 |
| JP | 56-24675 | 3/1981 |
| JP | 62-212781 | 9/1987 |
| JP | 2-153479 | 6/1990 |
| JP | 5-242226 | 9/1993 |
| JP | 6-60167 | 3/1994 |
| JP | 6-103366 | 4/1994 |
| JP | 7-110860 | 4/1995 |
| JP | 7-121712 | 5/1995 |
| JP | 10-105704 | 4/1998 |
| JP | 10-177650 | 6/1998 |
| JP | 11-195119 | 7/1999 |
| JP | 2000-99720 | 4/2000 |
| JP | 2001-118065 | 4/2001 |
| JP | 2001-307102 | 11/2001 |
| JP | 2003-44858 | 2/2003 |
| JP | 2004-192633 | 7/2004 |
| JP | 2004/093013 | 10/2004 |

OTHER PUBLICATIONS

Korean Patent Office Action issued Aug. 10, 2006 for corresponding Korean Patent Application No. 10-2005-0029249.

Japanese Patent Office Notice of Grounds of Rejection mailed Nov., 25 2008 for corresponding Japanese Patent Application No. 2004-296301.

* cited by examiner

BIOMETRIC INFORMATION AUTHENTICATION DEVICE, BIOMETRIC INFORMATION AUTHENTICATION METHOD, AND COMPUTER-READABLE RECORDING MEDIUM WITH BIOMETRIC INFORMATION AUTHENTICATION PROGRAM RECORDED THEREON

BACKGROUND OF THE INVENTION

1) Field of the Invention

The present invention relates to a technique for performing personal authentication using biometric information such as fingerprint, palm print, palm shape, blood vessel pattern (digital vein, palmvein, etc.), iris, and/or face image.

2) Description of the Related Art

In recent years, biometric authentication (personal authentication), which utilizes human biometric information such as fingerprint, palm print, palm shape, blood vessel pattern (digital vein, palmvein, etc.), iris, and/or face image, has been widely used for login to personal computers (PCs), entrance/exit management, etc.

Minutia matching method or pattern matching method has conventionally been used widely as a technique for verifying such biometric information.

Minutia matching method uses the position and/or direction of a fingerprint minutia, the relationship between fingerprint minutiae, etc. to perform authentication, specifically including, for example, a technique using the connection relationship between minutiae (refer to Patent Document 1 below) and a technique using the number of ridges between minutiae (refer to Patent Document 2 below).

On the other hand, pattern matching method uses encoding information based on the image information or shape of a fingerprint, or encoding information based on the frequency analysis thereof to perform authentication, and for which various kinds of techniques have also been proposed (refer to Patent Documents 3 and 4 below, for example).

Meanwhile, as a common characteristic among various minutia matching methods, authentication (verification) using a minutia matching method shows a high verification rate and thereby a short verification time to have the advantage that it is suited for one-to-many verification, while the disadvantage that it is not good at authenticating unclear images.

On the other hand, as a common characteristic among various pattern matching methods, authentication (verification) using a pattern matching method has the advantage that it is good at authenticating unclear images, while shows a low verification rate and thereby a long verification time to have the disadvantage that it is not suited for one-to-many verification.

Hence, it can be considered that authentication using verification results of both minutia matching method and pattern matching method allows for unfailing authentication even for unclear images, which are difficult to be authenticated (i.e., not supported) by a minutia matching method, whereby it is possible to decrease unsupported ratio and to improve authentication accuracy. This case, however, requires verification using both methods and thereby takes a long verification time.

[Patent Document 1]
Japanese Patent Laid-Open No. HEI 11-195119
[Patent Document 2]
Japanese Patent Laid-Open No. SHO 56-24675
[Patent Document 3]
Japanese Patent Laid-Open No. HEI 6-60167
[Patent Document 4]
Japanese Patent Laid-Open No. HEI 10-105704

SUMMARY OF THE INVENTION

The present invention has been made in consideration of the problems above, and an object thereof is, for personal authentication using biometric information, to allow for unfailing authentication without increasing verification time even for an authentication object that is not supported only by a minutia matching method, and therefore to allow verification time to be reduced while unsupported ratio to be decreased.

To achieve the above-described object, a biometric information authentication device according to the present invention is characterized by comprising: an obtaining section for obtaining biometric information of an authentication object; a first extraction section for extracting first to-be-verified data to be used in a minutia matching method from the biometric information obtained by the obtaining section; a second extraction section for extracting second to-be-verified data to be used in a pattern matching method from the biometric information obtained by the obtaining section; a first verifying section for verifying the first to-be-verified data extracted by the first extraction section against first registration data registered preliminarily using the minutia matching method; a second verifying section for verifying the second to-be-verified data extracted by the second extraction section against second registration data registered preliminarily using the pattern matching method; and a determining section for comparing match degree (hereinafter referred to as first match degree) between the first to-be-verified data and the first registration data, which is obtained as a result of verification by the first verifying section, with a first threshold value provided preliminarily and a second threshold value also provided preliminarily to allow the second verifying section to perform verification in the case where the first match degree is equal to or smaller than the first threshold value and equal to or larger than the second threshold value.

It is then preferred that the biometric information authentication device further comprises a first authentication advisability determining section for determining whether or not to perform verification using the minutia matching method based on information about the reliability of the first registration data, and that in the case of a determination by the first authentication advisability determining section not to perform verification using the minutia matching method, not the first verifying section but the second verifying section performs verification.

It is further preferred that the information about the reliability of the first registration data relates to the quality of the first registration data.

It is also preferred that the first registration data is generated based on a plurality of biometric information obtained through a plurality of times of collection from the same living body, and that the information about the reliability of the first registration data is generated based on match degree obtained by verifying sets of minutia data extracted, respectively, from the plurality of biometric information against each other.

It is then preferred that the determining section determines that there is a particular relationship between the authentication object and the first registration data in the case where the first match degree is larger than the first threshold value, while that there is no particular relationship between the authentication object and the first registration data in the case where the first match degree is smaller than the second threshold value.

It is further preferred that the biometric information authentication device further comprises: a final match degree calculating section for calculating final match degree based on at least one of either the first match degree or match degree (hereinafter referred to as second match degree) between the second to-be-verified data and the second registration data, which is obtained as a result of verification by the second verifying section; and a final match degree determining section for determining whether or not there is a particular relationship between the authentication object and the first registration data or the second registration data based on the final match degree calculated by the final match degree calculating section. In this case, it is preferred that the final match degree determining section compares the final match degree with a third threshold value provided preliminarily to determine that there is a particular relationship between the authentication object and the first registration data or the second registration data in the case where the final match degree is larger than the third threshold value, while that there is no particular relationship between the authentication object and the first registration data or the second registration data in the case where the final match degree is equal to or smaller than the third threshold value.

In addition, to achieve the above-described object, a biometric information authentication method according to the present invention is characterized by comprising the steps of: (a) obtaining biometric information of an authentication object; (b) extracting first to-be-verified data to be used in a minutia matching method from the biometric information obtained in the step (a) of obtaining; (c) extracting second to-be-verified data to be used in a pattern matching method from the biometric information obtained in the step (a) of obtaining; (d) verifying the first to-be-verified data extracted in the step (b) of extracting against first registration data registered preliminarily using the minutia matching method; (e) verifying the second to-be-verified data extracted in the step (c) of extracting against second registration data registered preliminarily using the pattern matching method; and (f) comparing match degree (hereinafter referred to as first match degree) between the first to-be-verified data and the first registration data, which is obtained as a result of verification in the step (d) of verifying, with a first threshold value provided preliminarily and a second threshold value also provided preliminarily to allow the step (e) of verifying to perform verification in the case where the first match degree is equal to or smaller than the first threshold value and equal to or larger than the second threshold value.

Also, to achieve the above-described object, a biometric information authentication program according to the present invention allows a computer to function as a biometric information authentication device comprising an obtaining section for obtaining biometric information of an authentication object and adapted to determine, based on the biometric information obtained by the obtaining section and data registered preliminarily, whether or not there is a particular relationship between the authentication object and the data, the program being characterized in that the computer functions as: a first extraction section for extracting first to-be-verified data to be used in a minutia matching method from the biometric information obtained by the obtaining section; a second extraction section for extracting second to-be-verified data to be used in a pattern matching method from the biometric information obtained by the obtaining section; a first verifying section for verifying the first to-be-verified data extracted by the first extraction section against first registration data registered preliminarily using the minutia matching method; a second verifying section for verifying the second to-be-verified data extracted by the second extraction section against second registration data registered preliminarily using the pattern matching method; and a determining section for comparing match degree (hereinafter referred to as first match degree) between the first to-be-verified data and the first registration data, which is obtained as a result of verification by the first verifying section, with a first threshold value provided preliminarily and a second threshold value also provided preliminarily to allow the second verifying section to perform verification in the case where the first match degree is equal to or smaller than the first threshold value and equal to or larger than the second threshold value.

Furthermore, to achieve the above-described object, a computer-readable recording medium according to the present invention records the biometric information authentication program thereon.

Thus in accordance with the present invention, only in the case where the first match degree obtained using the minutia matching method is equal to or smaller than the first threshold value and equal to or larger than the second threshold value is performed verification using the pattern matching method. Therefore, performing verification using the pattern matching method in the case where it is impossible to verify identification clearly using the minutia matching method allows to-be-verified data that can be verified using the minutia matching method to be subject to high-speed verification thereby, and allows for unfailing authentication using the pattern matching method for fingerprint images, which are difficult to be verified using the minutia matching method, such as unclear fingerprint images. This allows for unfailing authentication without increasing verification time even for authentication data that is not supported only by the minutia matching method, and therefore allows verification time to be reduced while unsupported ratio to be decreased.

DESCRIPTION OF THE PREFERRED EMBODIMENTS

Embodiments of the present invention will hereinafter be described with reference to the accompanying drawings.

[1] First Embodiment of the Present Invention

A biometric information authentication device according to the first embodiment of the present invention will first be described. It is noted that in the following first to twelfth embodiments is cited a fingerprint authentication device, which uses a fingerprint, as an example to describe their respective biometric information authentication devices.

Figure 1:
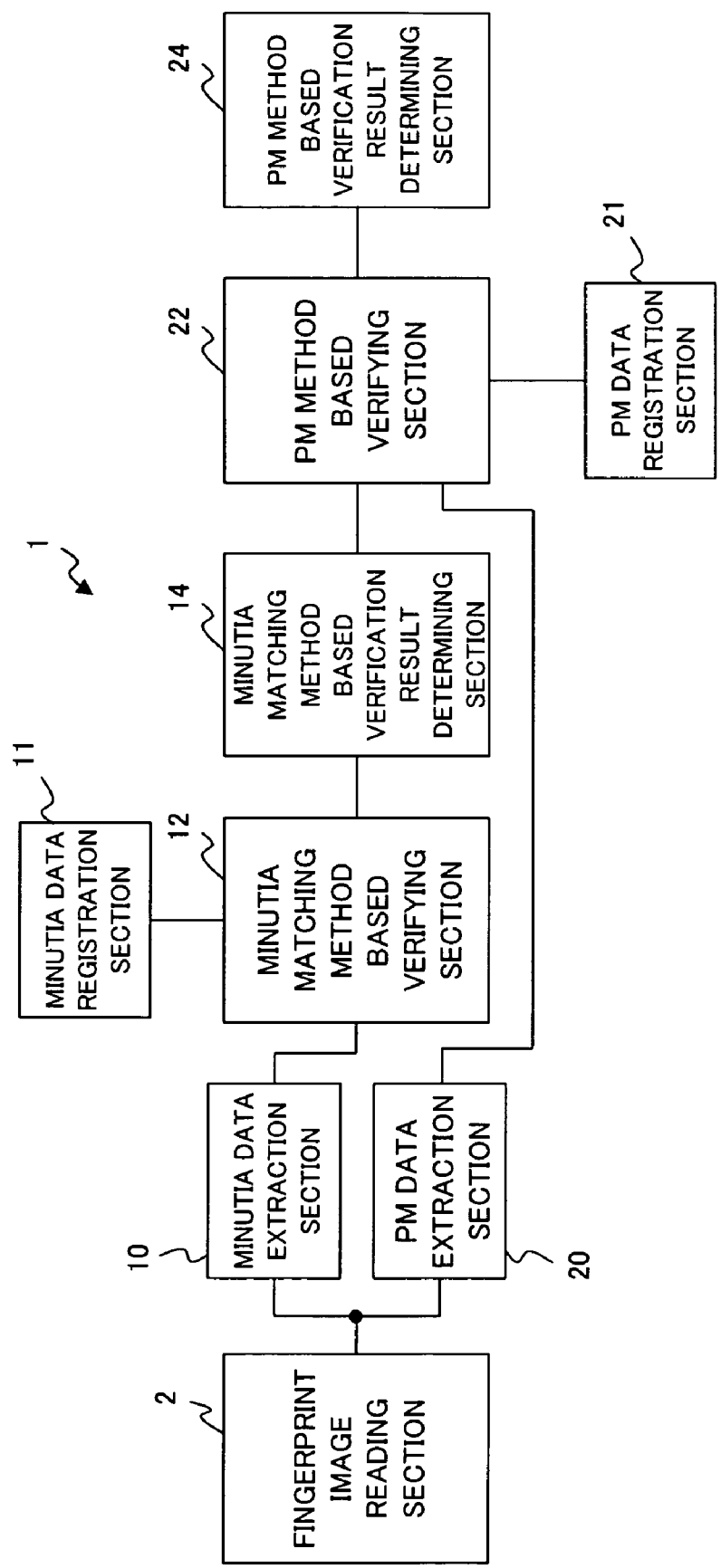
FIG. 1 is a block diagram showing the configuration of a biometric information authentication device according to a first embodiment of the present invention.

FIG. 1 is a block diagram showing the configuration of the biometric information authentication device (fingerprint authentication device) according to the first embodiment of the present invention. As shown in FIG. 1, the biometric information authentication device 1 comprises a fingerprint image reading section (obtaining section) 2, a minutia data extraction section (first extraction section) 10, a minutia data registration section (first registration section) 11, a minutia matching method based verifying section (first verifying section) 12, a minutia matching method based verification result determining section (determining section) 14, a pattern matching data extraction section (referred to as PM data extraction section in the figure, and "pattern matching" will hereinafter referred to also as PM; second extraction section) 20, a PM data registration section (second registration section) 21, a PM method based verifying section (second verifying section) 22, and a PM method based verification result determining section 24. It is noted that the biometric information authentication device 1 is adapted to perform one-to-one personal authentication.

The fingerprint image reading section 2 reads a fingerprint and creates a fingerprint image to obtain not only biometric information (fingerprint image here) of an authentication object, but also biometric information (registration fingerprint image) to be used for verification of an authentication object when registered initially (fingerprint registration processing). The fingerprint image reading section 2 consists of, for example, a sweep fingerprint sensor.

The minutia data extraction section 10 is adapted to extract minutia data to be used in a minutia matching method from the biometric information (fingerprint image here) obtained by the fingerprint image reading section 2. That is, the minutia data extraction section 10 extracts first to-be-verified data from the fingerprint image (fingerprint image for verification) of the authentication object obtained by the fingerprint image reading section 2.

The minutia data registration section 11 is adapted to hold first registration data extracted.

It is noted that the minutia data registration section 11 may be integrated in the biometric information authentication device 1, attached to the biometric information authentication device 1, or connected through a network etc., in either case being connected in such a manner as to be able to provide the first registration data corresponding to the authentication object to the biometric information authentication device 1.

First registration data to be registered and held in the minutia data registration section 11 may also be extracted and obtained from a registration fingerprint image input through the fingerprint image reading section 2 by a registrant using the fingerprint image reading section 2 and the minutia data extraction section 10 of the biometric information authentication device 1, or extracted and obtained by a different device than the biometric information authentication device 1 to be registered and held in the minutia data registration section 11.

The minutia matching method based verifying section 12 is adapted to verify the first registration data registered preliminarily in the minutia data registration section 11 against the first to-be-verified data to be authenticated that is extracted by the minutia data extraction section 10, and to obtain match degree (first match degree "M") between the first registration data and the first to-be-verified data as a result thereof.

It is noted that the extraction of minutia data by the minutia data extraction section 10 and the verification by the minutia matching method based verifying section 12 can be performed using a technique disclosed, for example, in the foregoing Patent Document 1 or 2.

The minutia matching method based verification result determining section 14 is adapted to determine whether or not there is a particular relationship between the first to-be-verified data to be authenticated and the first registration data registered preliminarily (i.e., he/she has the same fingerprint (as the very person)) based on the first match degree "M" obtained as a result of verification by the minutia matching method based verifying section 12, the minutia matching method based verification result determining section 14 comprising a first threshold value to be used for the determination that there is a particular relationship and a second threshold value to be used for the determination that there is no particular relationship.

That is, the first threshold value, which is a value capable of determining clearly that there is a particular relationship, is the minimum value of the first match degree "M" where it is determined that there is a particular relationship between the first to-be-verified data and the first registration data.

Also, the second threshold value, which is a value capable of determining clearly that there is no particular relationship, is the maximum value of the first match degree "M" where it is determined that there is no particular relationship between the first to-be-verified data and the first registration data.

The minutia matching method based verification result determining section 14 compares the first match degree "M" and the first threshold value to determine that there is a good enough particular relationship between the first to-be-verified data to be authenticated and the first registration data (i.e., he/she is as likely as the very person) in the case where the first match degree "M" is larger than the first threshold value, while compares the first match degree "M" and the second threshold value to determine that there is no particular relationship between the first to-be-verified data and the first registration data (i.e., he/she is as likely as a different person) in the case where the first match degree "M" is smaller than the second threshold value, and further in a different case than above where the first match degree "M" is equal to or smaller than the first threshold value and equal to or larger than the second threshold value, allows the PM method based verifying section 22 to be described below to perform verification.

The PM data extraction section 20 is adapted to extract PM data to be used in a PM method from the biometric information (fingerprint image here) obtained by the fingerprint image reading section 2. That is, the PM data extraction section 20 extracts second to-be-verified data from the fingerprint image (fingerprint image for verification) of the authentication object obtained by the fingerprint image reading section 2 and second registration data from the registration fingerprint image obtained by the fingerprint image reading section 2.

The PM data registration section 21 is adapted to hold the second registration data extracted by the PM data extraction section 20.

It is noted that the PM data registration section 21 may be integrated in the biometric information authentication device 1, attached to the biometric information authentication device 1, or connected through a network etc., in either case being connected in such a manner as to be able to provide the second registration data corresponding to the authentication object to the biometric information authentication device 1.

Second registration data to be registered and held in the PM data registration section 21 may also be extracted and obtained from a registration fingerprint image input through the fingerprint image reading section 2 by a registrant using the fingerprint image reading section 2 and the PM data extraction section 20 of the biometric information authentication device 1, or extracted and obtained by a different devices than the biometric information authentication device 1 to be registered and held in the PM data registration section 21.

If the first registration data that is to be used by the minutia matching method based verifying section 12 has a common portion to a portion of the second registration data that is to be used by the PM method based verifying section 22, the biometric information authentication device preferably has a common data registration section (not shown) for registering a common portion shared by the first registration data and the second registration data, separately from the minutia data registration section 11 and the PM data registration section 21.

The PM method based verifying section 22 is adapted to verify the second registration data registered preliminarily in the PM data registration section 21 against the second to-be-verified data to be authenticated that is extracted by the PM data extraction section 20, and to obtain match degree (second match degree "P") between the second registration data and the second to-be-verified data as a result thereof.

It is noted that the extraction of PM data by the PM data extraction section 20 and the verification by the PM method based verifying section 22 can be performed using a technique disclosed, for example, in the foregoing Patent Document 3 or 4, or in the specification of PCT Application No. JP03/04784 filed on Apr. 15, 2003 by the present applicant.

The PM method based verification result determining section 24 is adapted to determine whether or not there is a particular relationship between the second to-be-verified data to be authenticated and the second registration data registered preliminarily (i.e., he/she has the same fingerprint (as the very person)) based on the second match degree "P" obtained as a result of verification by the PM method based verifying section 22.

That is, the PM method based verification result determining section 24 compares the second match degree "P" with a threshold value "A" held preliminarily to determine that there is a particular relationship (i.e., he/she is the very person) in the case where the second match degree "P" is larger than the threshold value "A", while that there is no particular relationship (i.e., he/she is not the very person) in the case where the second match degree "P" is equal to or smaller than the threshold value "A".

Next, the procedure of a biometric information authentication method (operation of the biometric information authentication device 1) according to the first embodiment of the present invention will be described with reference to the flow chart (steps S10 to S18) shown in FIG. 2.

Figure 2:
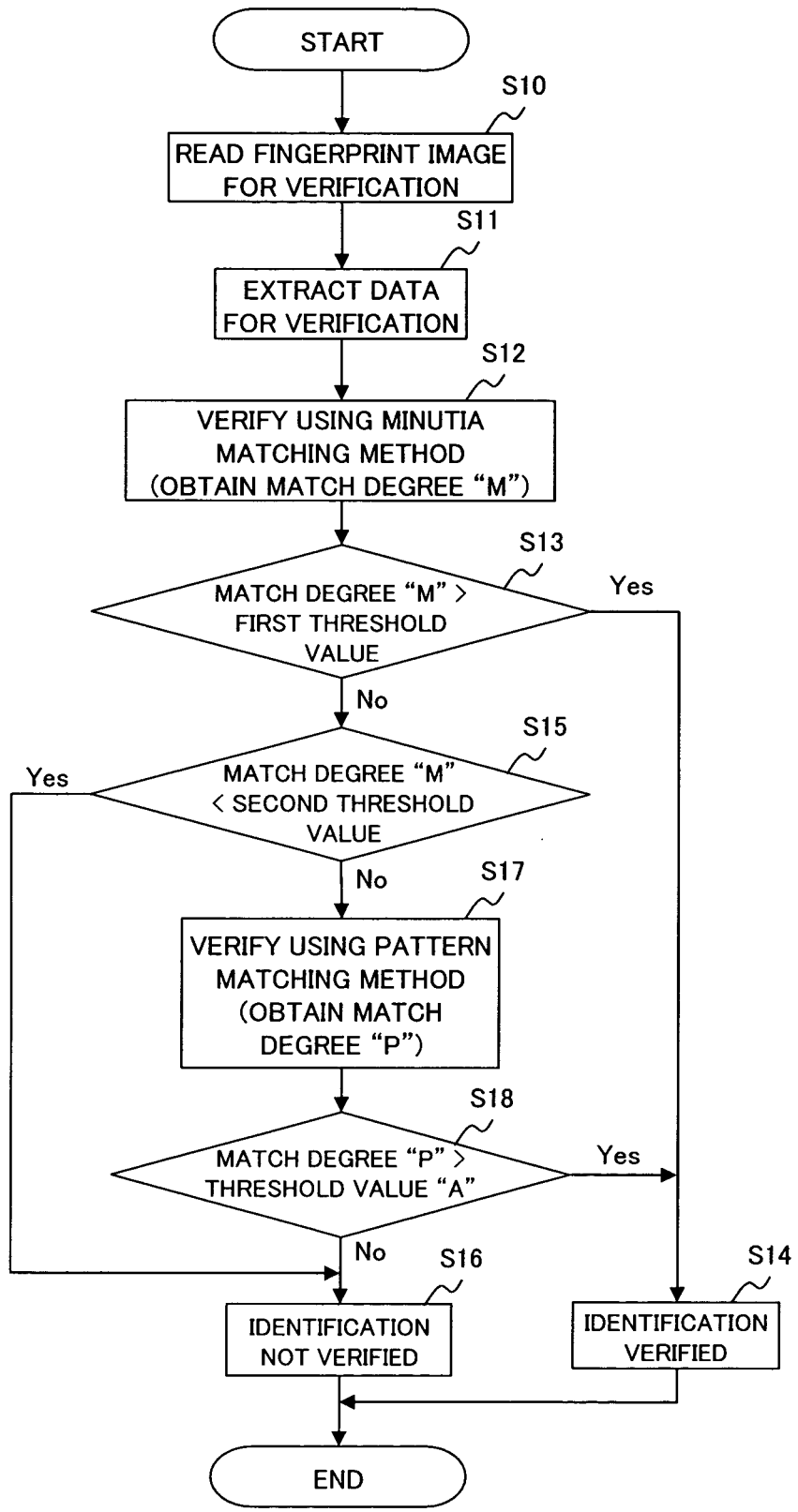
FIG. 2 is a flow chart illustrating the procedure of a biometric information authentication method according to the first embodiment of the present invention.

As shown in FIG. 2, when performing personal authentication using the biometric information authentication device 1, the fingerprint image reading section 2 first reads biometric information (fingerprint image for verification) of an authentication object (obtaining step; step S10), and then the minutia data extraction section 10 and PM data extraction section 20 extract, respectively, first to-be-verified data and second to-be-verified data (data for verification) (first extraction step and second extraction step; step S11).

Next, the minutia matching method based verifying section 12 compares the first to-be-verified data to be authenticated that is extracted by the minutia data extraction section 10 and first registration data registered preliminarily in the minutia data registration section 11, and performs verification to obtain first match degree "M" as a result thereof (first verification step; step S12).

Then, the minutia matching method based verification result determining section 14 determines whether or not there is a particular relationship between the first to-be-verified data and the first registration data (i.e., he/she is the very person) based on the first match degree "M" obtained as a result of verification by the minutia matching method based verifying section 12. Here, the minutia matching method based verification result determining section 14 first determines whether or not the first match degree "M" is larger than the first threshold value (determination step; step S13), and in the case where the first match degree "M" is larger than the first threshold value ("Yes" in step S13), determines that there is a particular relationship between the first to-be-verified data and the first registration data (i.e., he/she is the very person; step S14) and then terminates the processing.

On the contrary, in the case where the first match degree "M" is equal to or smaller than the first threshold value ("No" in step S13), the minutia matching method based verification result determining section 14 determines whether or not the first match degree "M" is smaller than the second threshold value (determination step; step S15)

Here, in the case where the first match degree "M" is smaller than the second threshold value ("Yes" in step S15), the minutia matching method based verification result determining section 14 determines that there is no particular relationship between the first to-be-verified data and the first registration data (i.e., he/she is not the very person; step S16) and then terminates the processing.

On the contrary, in the case where the first match degree "M" is equal to or larger than the second threshold value ("No" in step S15), the minutia matching method based verification result determining section 14 allows the PM method based verifying section 22 to perform verification (second verification step; step S17).

That is, in the case where the first match degree "M" is equal to or larger than the second threshold value ("No" in step S15), the PM method based verifying section 22 compares the second to-be-verified data to be authenticated that is extracted by the PM data extraction section 20 and second registration data registered preliminarily in the PM data registration section 21, and performs verification using a pattern matching method to obtain second match degree "P" as a result thereof (step S17).

Then, the PM method based verification result determining section 24 compares the second match degree "P" and the threshold value "A" to determine whether or not there is a particular relationship between the second to-be-verified data and the second registration data (i.e., he/she is the very person; step S18).

Thus in accordance with the biometric information authentication device 1 and the biometric information authentication method according to the first embodiment of the present invention, the minutia matching method based verification result determining section 14 allows the PM method based verifying section 22 to perform verification only in the case where the first match degree "M" obtained as a result of verification by the minutia matching method based verifying section 12 is equal to or smaller than the first threshold value and equal to or larger than the second threshold value, that is, where it is impossible to verify identification clearly using a minutia matching method. Therefore, the minutia matching method based verifying section 12 can perform high-speed verification for fingerprint images that can be authenticated using a minutia matching method with higher verification rate and shorter verification time relative to pattern matching method, while the PM method based verifying section 22 can perform unfailing verification and determination using pattern matching method for fingerprint images that are difficult to be verified and determined (personal authentication) using a minutia matching method, such as unclear fingerprint images, which allows unsupported ratio to be decreased while verification time to be reduced.

It is noted that although in the biometric information authentication device 1 and the biometric information authentication method according to the first embodiment of the present invention as mentioned above, the minutia matching method based verification result determining section 14 is arranged to determine whether or not he/she is the very person using the first and second threshold values, the present invention is not restricted thereto, and it is only required to identify at least fingerprint images (biometric information) which are difficult to be authenticated using a minutia matching method based on the first and second threshold values. For example, the minutia matching method based verification result determining section 14 may determine whether or not he/she is the very person using different threshold values than the first and second threshold values.

[2] Second Embodiment of the Present Invention

Figure 3:
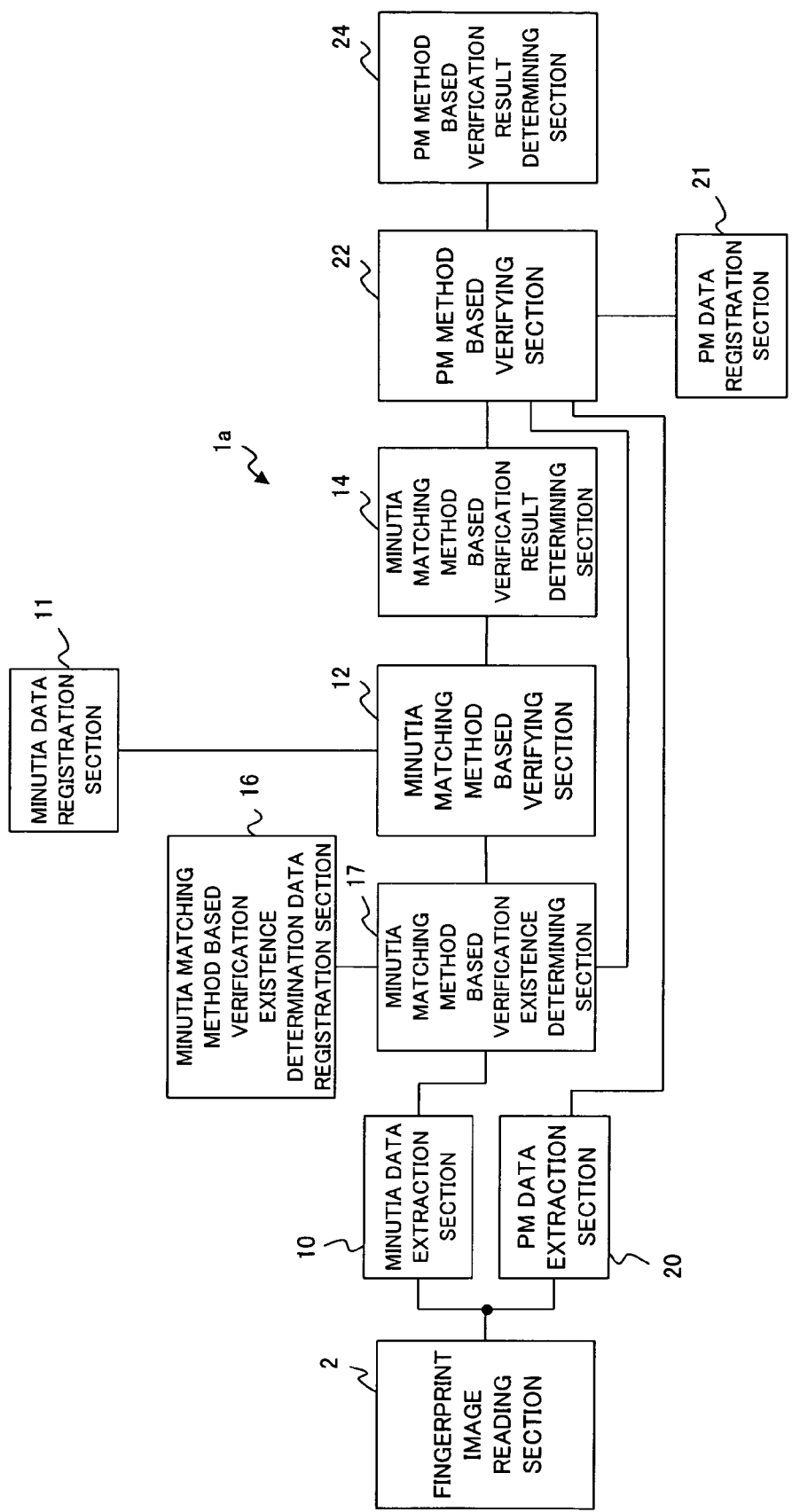
FIG. 3 is a block diagram showing the configuration of a biometric information authentication device according to a second embodiment of the present invention.

Next will be described a biometric information authentication device according to the second embodiment of the present invention. FIG. 3 is a block diagram showing the configuration of the biometric information authentication device (fingerprint authentication device) 1a according to the second embodiment of the present invention. It is noted that the same numerals in FIG. 3 as those mentioned above indicate the same or almost the same components.

As shown in FIG. 3, the biometric information authentication device 1a is arranged similarly as the biometric information authentication device 1 of the first embodiment mentioned above with reference to FIG. 1, except that the device 1a comprises a minutia matching method based verification existence determination data registration section 16 for holding minutia matching method based verification existence determination data and a minutia matching method based verification existence determining section (first authentication advisability determining section) 17 for determining whether or not to allow the minutia matching method based verifying section 12 to perform verification based on the minutia matching method based verification existence determination data, to determine whether or not to allow the minutia matching method based verifying section 12 to perform verification. Therefore, the detailed description of components common to those of the above-mentioned biometric information authentication device 1 of the first embodiment will be omitted here.

Here, minutia matching method based verification existence determination data means information about the reliability of minutia data (first registration data) extracted by the minutia data extraction section 10, which is extracted based, for example, on the quality and/or the estimated value of match degree of minutia data (first registration data). The quality of minutia data means that of minutiae of first registration data extracted, and when extracting minutia matching method based verification existence determination data based on such quality, the extracted minutia matching method based verification existence determination data means a value that represents the quality of minutiae of the first registration data.

Also, the estimated value of match degree means that when performing verification with the same fingerprint, and in the case where first registration data is generated based on a plurality of biometric information (fingerprint images), minutia matching method based verification existence determination data based on the estimated value of match degree is generated based on match degree obtained by verifying a plurality of minutia data extracted, respectively, from the fingerprint images against each other.

The minutia matching method based verification existence determination data registration section 16 is adapted to register such minutia matching method based verification existence determination data.

It is noted that the minutia matching method based verification existence determination data registration section 16 may be integrated in the biometric information authentication device 1a, attached to the biometric information authentication device 1a, or connected through a network etc., in either case being connected in such a manner as to be able to provide minutia matching method based verification existence determination data to the biometric information authentication device 1a.

Minutia matching method based verification existence determination data to be registered and held in the minutia matching method based verification existence determination data registration section 16 may also be extracted and obtained from a registration fingerprint image input through the fingerprint image reading section 2 by a registrant using a minutia matching method based verification existence determination data extraction section, provided in the biometric information authentication device 1a, for extracting minutia matching method based verification existence determination data based on minutia data (first registration data), the fingerprint image reading section 2, and the minutia data extraction section 10, or extracted and obtained by such a minutia matching method based verification existence determination data extraction section of a different device than the biometric information authentication device 1a to be registered and held in the minutia matching method based verification existence determination data registration section 16.

The minutia matching method based verification existence determining section 17 is adapted to determine whether or not to allow the minutia matching method based verifying section 12 to perform verification (verification using a minutia matching method) based on minutia matching method based verification existence determination data registered in the minutia matching method based verification existence determination data registration section 16, for example, whether or not the minutia matching method based verification existence determination data is equal to or larger than a predetermined value.

Then, in the case of a determination by the minutia matching method based verification existence determining section 17 to perform verification using the minutia matching method, the minutia matching method based verification existence determining section 17 allows the minutia matching method based verifying section 12 to perform verification, while in the case of a determination not to perform verification using a minutia matching method, the minutia matching method based verification existence determining section 17 allows not the minutia matching method based verifying section 12 but the PM method based verifying section 22 to perform verification.

Next, the procedure of a biometric information authentication method (operation of the biometric information authentication device 1a) according to the second embodiment of the present invention will be described with reference to the flow chart (steps S10 to S19) shown in FIG. 4. It is noted that the same numerals in FIG. 4 as those mentioned above indicate the same or almost the same components.

Figure 4:
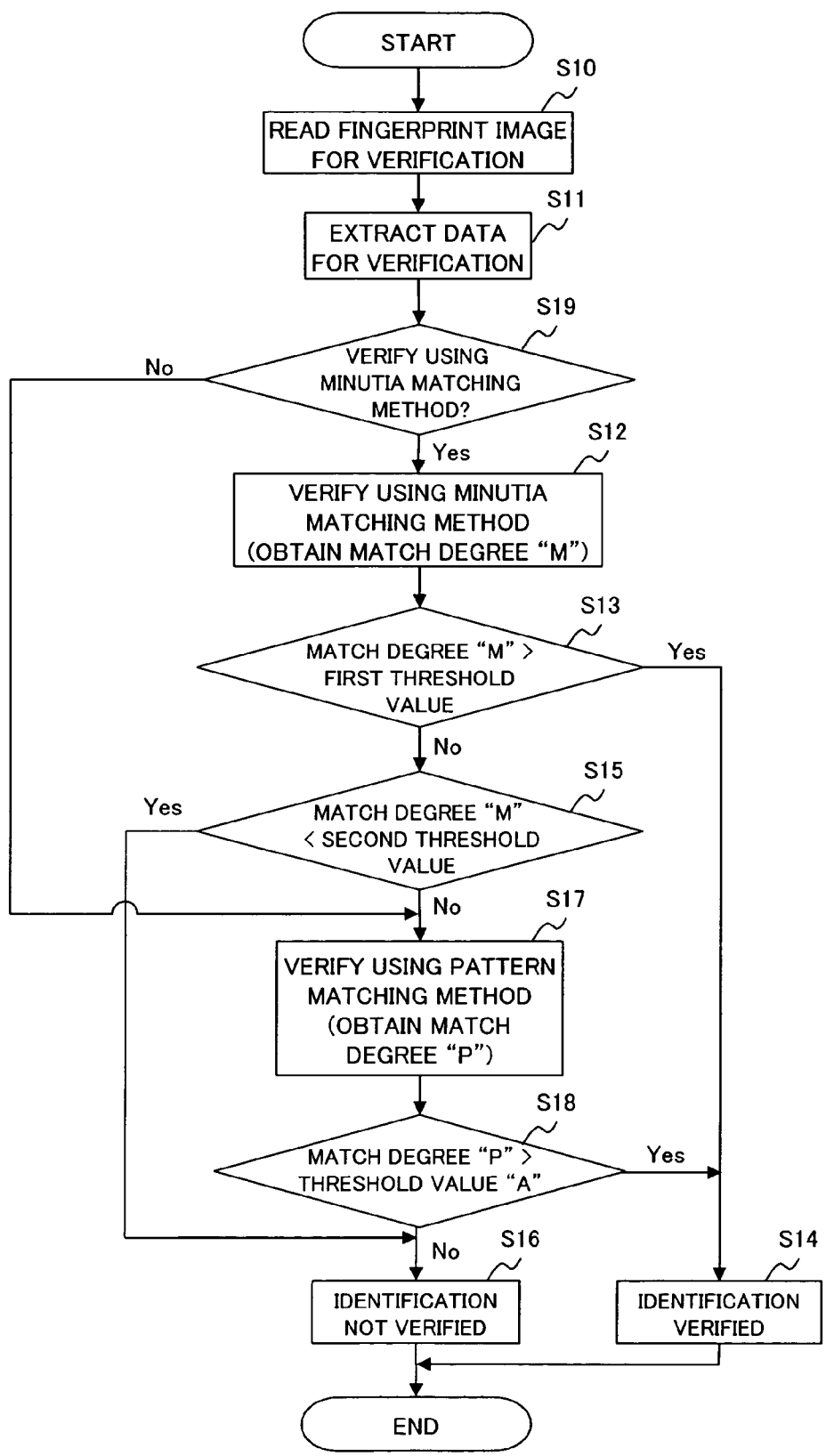
FIG. 4 is a flow chart illustrating the procedure of a biometric information authentication method according to the second embodiment of the present invention.

As shown in FIG. 4, the biometric information authentication method according to the second embodiment of the present invention is the same as the biometric information authentication method of the first embodiment mentioned above with reference to FIG. 2, except that a step S19 in which the minutia matching method based verification existence determining section 17 determines the existence of verification by the minutia matching method based verifying section 12 is included. Therefore, the detailed description of components common to those of the above-mentioned biometric information authentication method of the first embodiment will be omitted here.

That is, in accordance with the biometric information authentication method according to the second embodiment of the present invention as shown in FIG. 4, the minutia data extraction section 10 extracts first to-be-verified data to be authenticated (step S11), and then the minutia matching method based verification existence determining section 17 determines whether or not to allow the minutia matching method based verifying section 12 to perform verification based on minutia matching method based verification existence determination data registered in the minutia matching method based verification existence determination data registration section 16 (step S19).

Here, in the case of a determination by the minutia matching method based verification existence determining section 17 to allow the minutia matching method based verifying section 12 to perform verification ("Yes" in step S19), the minutia matching method based verifying section 12 performs verification (step S12).

On the contrary, in the case of a determination by the minutia matching method based verification existence determining section 17 not to allow the minutia matching method based verifying section 12 to perform verification ("No" in step S19), not the minutia matching method based verifying section 12 but the PM method based verifying section 22 performs verification (step S17).

Thus in accordance with the biometric information authentication device 1a and the biometric information authentication method according to the second embodiment of the present invention, the minutia matching method based verification existence determining section 17 determines whether or not to allow the minutia matching method based verifying section 12 to perform verification based on minutia matching method based verification existence determination data before the minutia matching method based verifying section 12 performs verification, and in accordance with the determination, allows the minutia matching method based verifying section 12 to perform verification or skips verification by the minutia matching method based verifying section 12 to allow the 22 to perform verification. Therefore, if the first registration data has poor reliability (quality and/or estimated value of match degree), which results in the difficulty of performing verification using the minutia matching method, not the minutia matching method but only the pattern matching method can be used to perform verification. For this reason, it is possible to exhibit the same effect as the above-mentioned first embodiment, and to prevent performing verification using the minutia matching method for fingerprints which are difficult to be verified using the minutia matching method to eliminate wasting verification time, and further to perform verification more reliably for fingerprints which are difficult to be verified using the minutia matching method.

[3] Third Embodiment of the Present Invention

Figure 5:
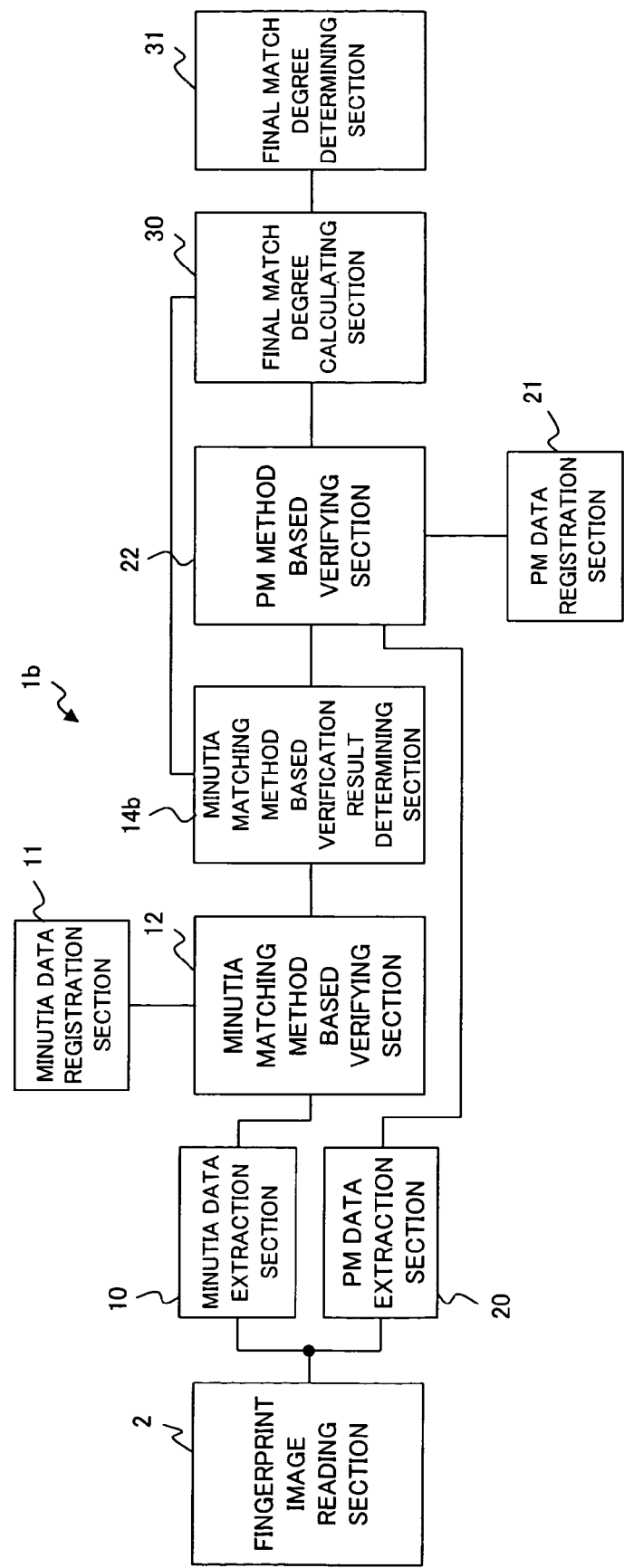
FIG. 5 is a block diagram showing the configuration of a biometric information authentication device according to a third embodiment of the present invention.

Next will be described a biometric information authentication device according to the third embodiment of the present invention. FIG. 5 is a block diagram showing the configuration of the biometric information authentication device (fingerprint authentication device) 1b according to the third embodiment of the present invention. It is noted that the same numerals in FIG. 5 as those mentioned above indicate the same or almost the same components.

As shown in FIG. 5, the biometric information authentication device 1b is arranged similarly as the biometric information authentication device 1 of the first embodiment mentioned above with reference to FIG. 1, except that the device 1b comprises a final match degree calculating section 30 for calculating final match degree "H" based on first match degree "M" obtained as a result of verification by the minutia matching method based verifying section 12 and second match degree "P" obtained as a result of verification by the PM method based verifying section 22 and a final match degree determining section 31 for determining whether or not there is a particular relationship between the authentication object and first registration data or second registration data (i.e., he/she is the very person) based on the final match degree "H" calculated by the final match degree calculating section 30. Therefore, the detailed description of components common to those of the above-mentioned biometric information authentication device 1 of the first embodiment will be omitted here.

The final match degree calculating section 30 calculates final match degree "H" by, for example, the following Formula (1) based on at least one of either first match degree "M" or second match degree "P". It is noted that "α" in the following Formula (1) represents a coefficient (where, $0 \leq \alpha \leq 1$) that is set appropriately.

$$H = \alpha M + (1-\alpha) P \qquad (1)$$

Also, the method for calculating final match degree "H" by the final match degree calculating section 30 is not restricted to the foregoing Formula (1).

The final match degree determining section 31 compares the final match degree "H" calculated by the final match degree calculating section 30 with a third threshold value provided preliminarily to determine that there is a particular relationship, respectively, between first to-be-verified data or second to-be-verified data to be authenticated and first registration data or second registration data (i.e., he/she is the very person) in the case where the final match degree "H" is larger than the third threshold value, while that there is no particular relationship, respectively, between the first to-be-verified data or the second to-be-verified data to be authenticated and the first registration data or the second registration data (i.e., he/she is not the very person) in the case where the final match degree "H" is equal to or smaller than the third threshold value.

Thus in the biometric information authentication device 1b, the final match degree determining section 31 makes a final authentication determination based on the final match degree "H" calculated by the 30. Therefore, the minutia matching method based verification result determining section 14b of the biometric information authentication device 1b determines whether or not to allow the PM method based verifying section 22 to perform verification using a pattern matching method without comparing first match degree "M" obtained as a result of verification by the minutia matching method based verifying section 12 with the first and second threshold values to make a final authentication determination.

That is, the minutia matching method based verification result determining section 14b compares the first match degree "M" and the first threshold value to estimate that the first to-be-verified data of the authentication object is as likely as the very person (there is a particular relationship) in the case where the first match degree "M" is larger than the first threshold value, and further compares the first match degree "M" and the second threshold value to estimate that the first to-be-verified data of the authentication object is as likely as a different person (there is no particular relationship) in the case where the first match degree "M" is smaller than the second threshold value, and in these cases determines that only verification using the minutia matching method can verify identification to prevent verification by the PM method based verifying section 22.

On the contrary, the minutia matching method based verification result determining section 14b determines that only verification using the minutia matching method cannot verify identification in the case where the first match degree "M" is equal to or smaller than the first threshold value and equal to or larger than the second threshold value, and then allows the PM method based verifying section 22 to perform verification.

Next, the procedure of a biometric information authentication method (operation of the biometric information authentication device 1b) according to the third embodiment of the present invention will be described with reference to the flow chart (steps S10 to S13, S15, S17, and S20 to S23) shown in FIG. 6. It is noted that the same numerals in FIG. 6 as those mentioned above indicate the same or almost the same components.

Figure 6:
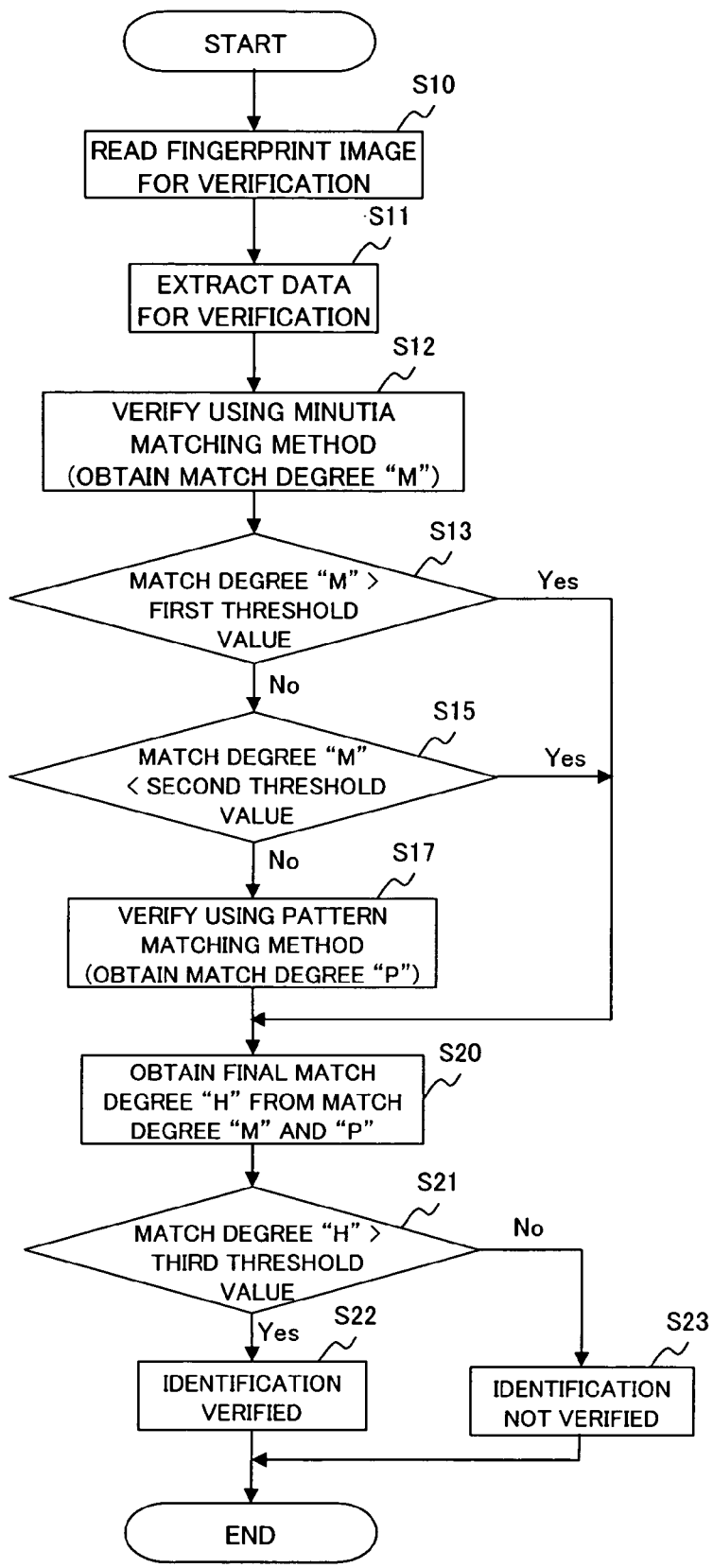
FIG. 6 is a flow chart illustrating the procedure of a biometric information authentication method according to the third embodiment of the present invention.

In the biometric information authentication method according to the third embodiment of the present invention as shown in FIG. 6, the minutia matching method based verifying section 12 compares the first match degree "M" with the first threshold value (step S13), and in the case where the first match degree "M" is larger than the first threshold value ("Yes" in step S13), verification by the PM method based verifying section 22 (step S17) is skipped to proceed to processing by the final match degree calculating section 30 (step S20) to be described below.

Also, the minutia matching method based verifying section 12 compares the first match degree "M" with the second threshold value (step S15), and in the case where the first match degree "M" is smaller than the second threshold value ("Yes" in step S15), verification by the PM method based verifying section 22 (step S17) is skipped to proceed to processing by the final match degree calculating section 30 (step S20) to be described below.

Then, in the case where the first match degree "M" is equal to or smaller than the first threshold value and equal to or larger than the second threshold value ("No" in step S13 and then "No" in step S15), the PM method based verifying section 22 performs verification (step S17).

Next, the final match degree calculating section 30 calculates final match degree "H" by the foregoing Formula (1) based on the first match degree "M" and the second match degree "P" (step S20). Here, in the case of a determination of "Yes" in the foregoing step S13 or S15, that is, no second match degree "P" calculated, the final match degree calculating section 30 employs the first match degree "M" as final match degree "H" by setting "α" to 1 in the foregoing Formula (1).

Then, the final match degree determining section 31 compares the final match degree "H" with the third threshold value to determine whether or not there is a particular relationship, respectively, between the first to-be-verified data or the second to-be-verified data to be authenticated and the first registration data or the second registration data (i.e., he/she is the very person; step S21).

That is, in the case where the final match degree "H" is larger than the third threshold value ("Yes" in step S21), the final match degree determining section 31 determines that he/she is the very person (step S22), while in the case where the final match degree "H" is equal to or smaller than the third threshold value ("No" in step S21), determines that he/she is not the very person (step S23).

Thus, the biometric information authentication device 1b and the biometric information authentication method according to the third embodiment of the present invention can exhibit the same effect as the above-mentioned first embodiment.

[4] Fourth Embodiment of the Present Invention

Figure 7:
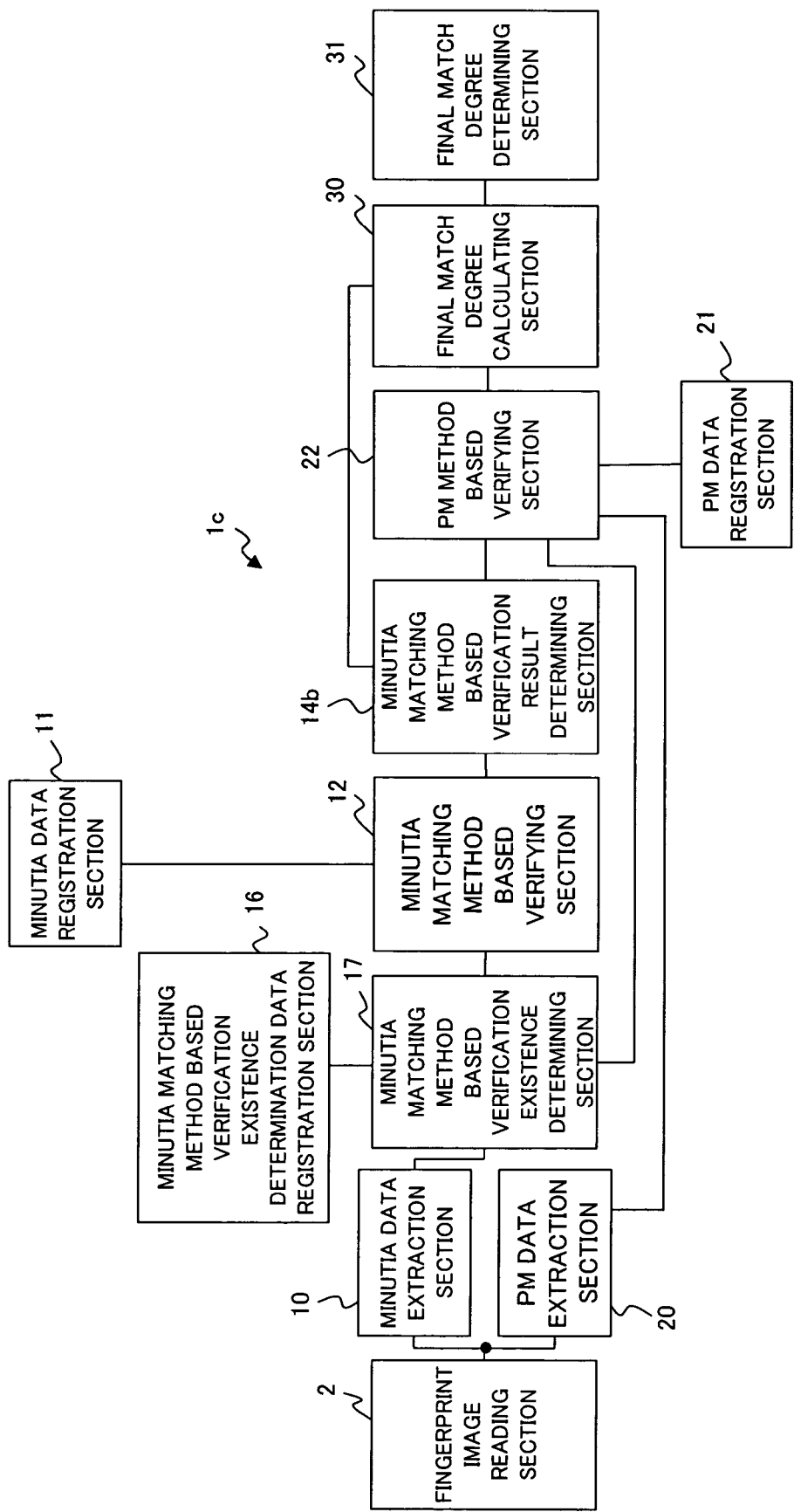
FIG. 7 is a block diagram showing the configuration of a biometric information authentication device according to a fourth embodiment of the present invention.

Next will be described a biometric information authentication device according to the fourth embodiment of the present invention. FIG. 7 is a block diagram showing the configuration of the biometric information authentication device (fingerprint authentication device) 1c according to the fourth embodiment of the present invention. It is noted that the same numerals in FIG. 7 as those mentioned above indicate the same or almost the same components.

As shown in FIG. 7, the biometric information authentication device 1c is arranged similarly as the biometric information authentication device 1b of the third embodiment mentioned above with reference to FIG. 5, except that the device 1c comprises a minutia matching method based verification existence determination data registration section 16 and a minutia matching method based verification existence determining section (first authentication advisability determining section) 17 to determine whether or not to allow the minutia matching method based verifying section 12 to perform verification. That is, the above-mentioned third embodiment is changed in the same way that the first embodiment is changed to be the second embodiment as mentioned above. Therefore, the detailed description of components common to those of the biometric information authentication device 1a of the second embodiment and the biometric information authentication device 1b of the third embodiment mentioned above will be omitted here.

That is, in the biometric information authentication device 1c, the minutia matching method based verification existence determining section 17 determines whether or not to allow the minutia matching method based verifying section 12 to perform verification, and only in the case of a determination by the minutia matching method based verification existence determining section 17 to perform verification using the minutia matching method, the minutia matching method based verifying section 12 performs verification.

Next, the procedure of a biometric information authentication method (operation of the biometric information authentication device 1c) according to the fourth embodiment of the present invention will be described with reference to the flow chart (steps S10 to S13, S15, S17, and S19 to S23) shown in FIG. 8. It is noted that the same numerals in FIG. 8 as those mentioned above indicate the same or almost the same components.

Figure 8:
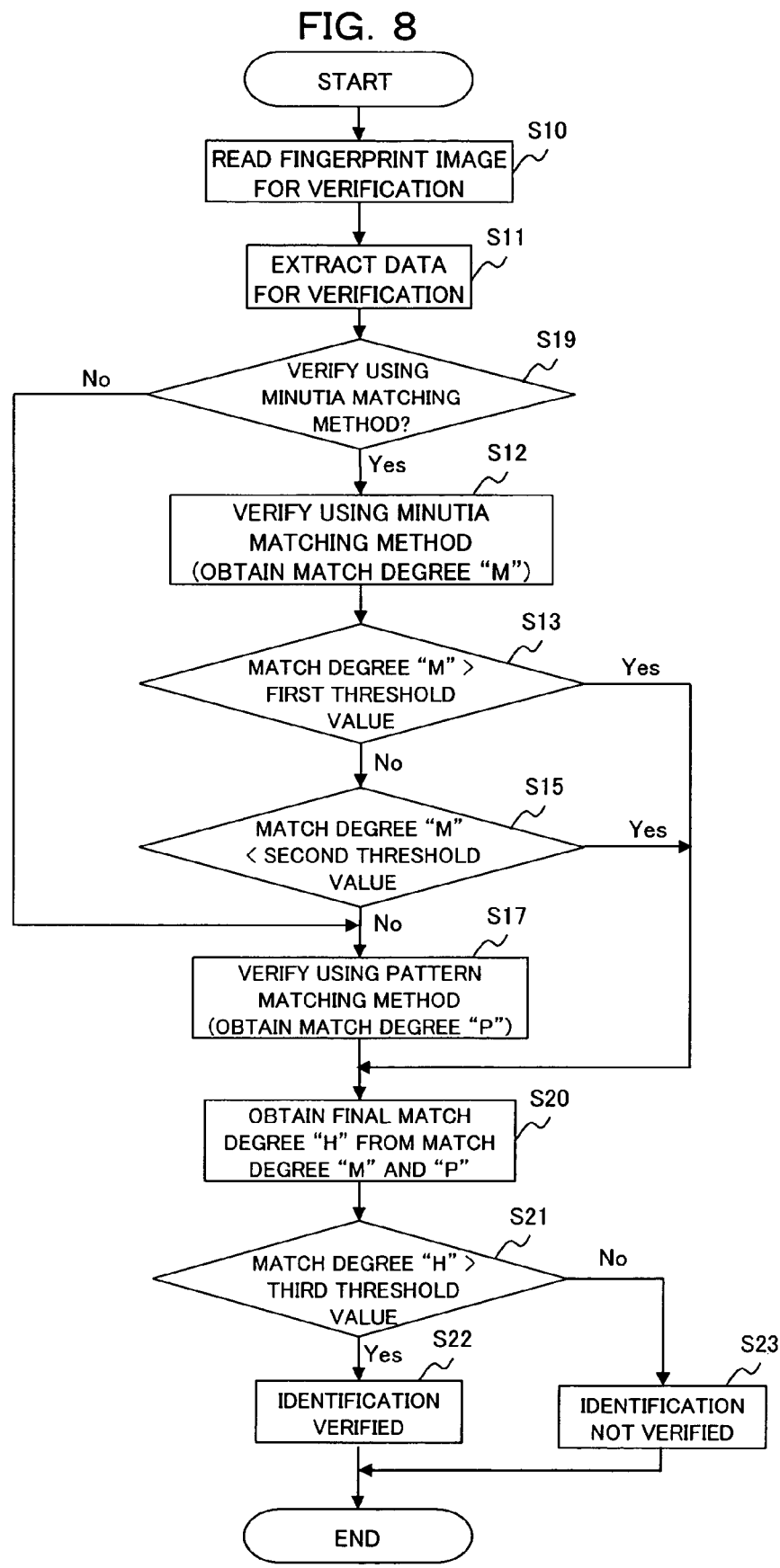
FIG. 8 is a flow chart illustrating the procedure of a biometric information authentication method according to the fourth embodiment of the present invention.

As shown in FIG. 8, the biometric information authentication method according to the fourth embodiment of the present invention is the same as the above-mentioned biometric information authentication method of the third embodiment, as is the case with the biometric information authentication method of the second embodiment mentioned above with reference to FIG. 4, except that an additional step S19 in which the minutia matching method based verification existence determining section 17 determines the existence of verification by the minutia matching method based verifying section 12 is included.

Thus, the biometric information authentication device 1c and the biometric information authentication method according to the fourth embodiment of the present invention can exhibit the same effect as the above-mentioned second and third embodiments.

[5] Fifth Embodiment of the Present Invention

Figure 9:
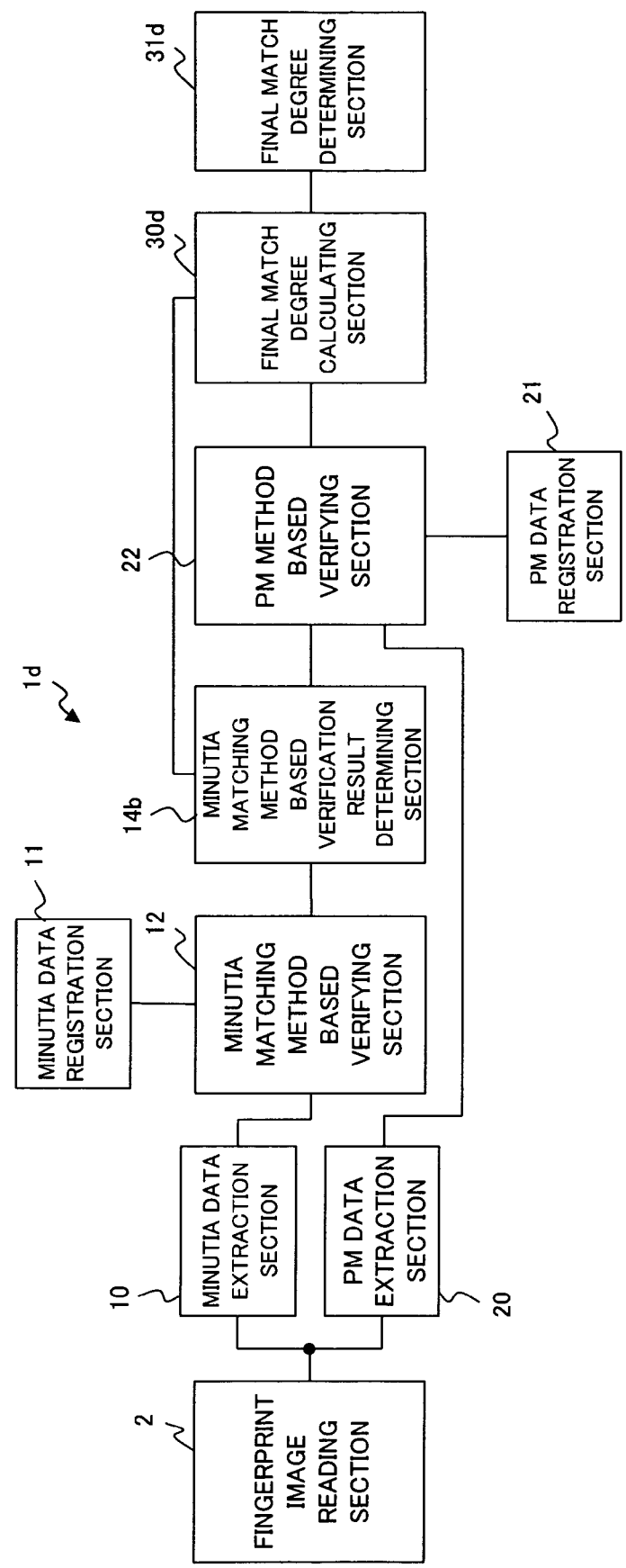
FIG. 9 is a block diagram showing the configuration of a biometric information authentication device according to a fifth embodiment of the present invention.

Next will be described a biometric information authentication device according to the fifth embodiment of the present invention. FIG. 9 is a block diagram showing the configuration of the biometric information authentication device (fingerprint authentication device) 1d according to the fifth embodiment of the present invention It is noted that the same numerals in FIG. 9 as those mentioned above indicate the same or almost the same components.

As shown in FIG. 9, the biometric information authentication device 1d is the same as the biometric information authentication device 1b of the third embodiment mentioned above with reference to FIG. 5, except for the method for calculating final match degree "H" by the final match degree calculating section 30d and the method for determination by the final match degree determining section 31d. Therefore, the detailed description of components common to those of the above-mentioned biometric information authentication device 1b of the third embodiment will be omitted here.

In the case where the PM method based verifying section 22 performs no verification to obtain no second match degree "P", the final match degree calculating section 30d employs the first match degree "M" obtained as a result of verification by the minutia matching method based verifying section 12 as final match degree "H", while in the case where the PM method based verifying section 22 performs verification to obtain second match degree "P", employs the second match degree "P" as final match degree "H" regardless of whether first match degree "M" is obtained or not by the minutia matching method based verifying section 12.

Then, the final match degree determining section 31d determines whether or not there is a particular relationship, respectively, between the first to-be-verified data or the second to-be-verified data to be authenticated and the first registration data or the second registration data (i.e., he/she is the very person) using a threshold value (fourth or fifth threshold value) according to the final match degree "H" calculated by the final match degree calculating section 30d.

That is, the final match degree determining section 31d compares, in the case where the final match degree "H" calculated by the final match degree calculating section 30 is the first match degree "M", the final match degree "H" with the fourth threshold value provided preliminarily to determine that he/she is the very person in the case where the final match degree "H" is larger than the fourth threshold value, while that he/she is not the very person in the case where the final match degree "H" is equal to or smaller than the fourth threshold value.

Also, the final match degree determining section 31d compares, in the case where the final match degree "H" calculated by the final match degree calculating section 30d is the second match degree "P", the final match degree "H" with the fifth threshold value provided preliminarily to determine that he/she is the very person in the case where the final match degree "H" is larger than the fifth threshold value, while that he/she is not the very person in the case where the final match degree "H" is equal to or smaller than the fifth threshold value.

Next, the procedure of a biometric information authentication method (operation of the biometric information authentication device 1d) according to the fifth embodiment of the present invention will be described with reference to the flow chart (steps S10 to S13, S15, S17, and S30 to S35) shown in FIG. 10. It is noted that the same numerals in FIG. 10 as those mentioned above indicate the same or almost the same components.

Figure 10:
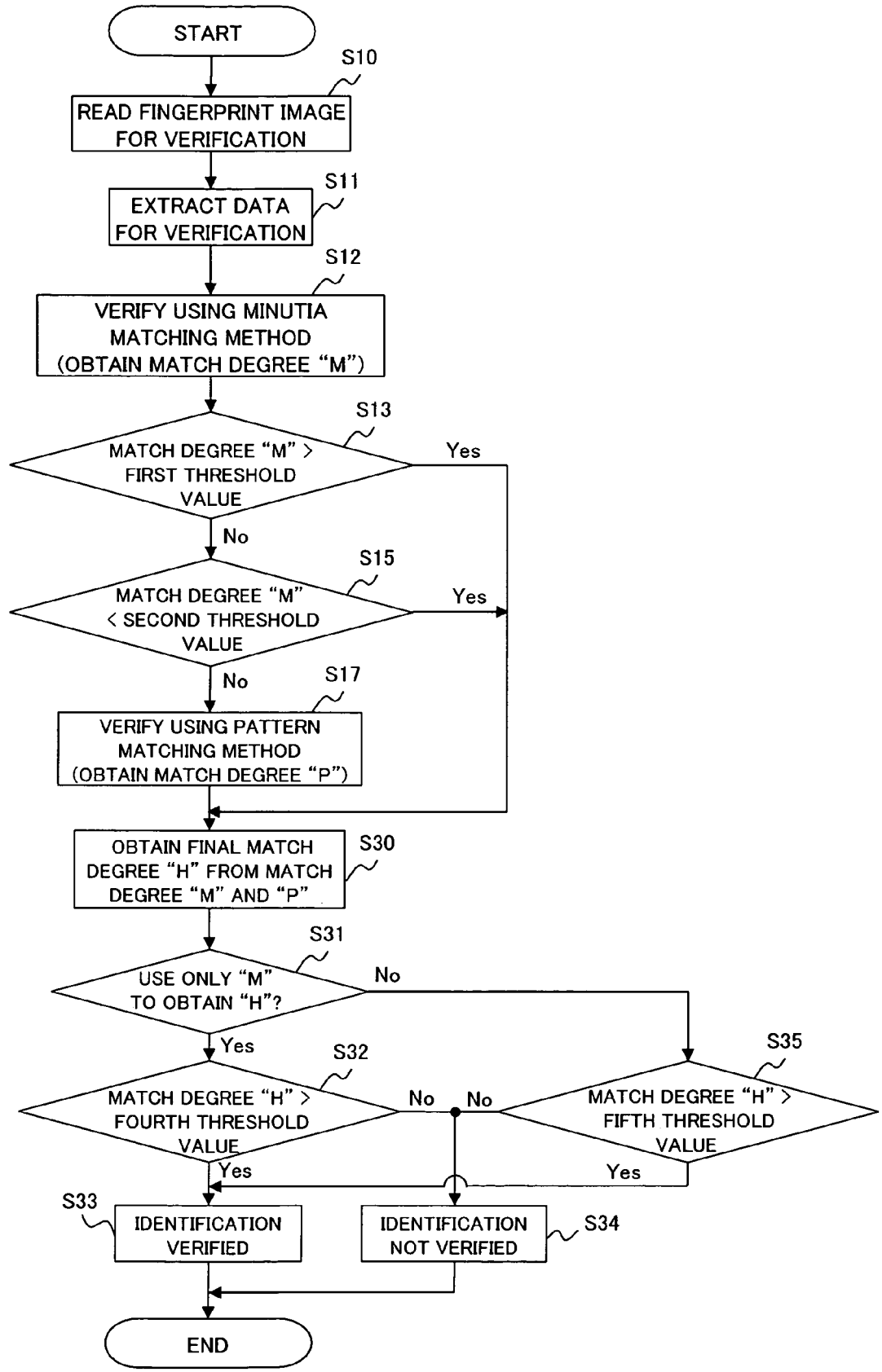
FIG. 10 is a flow chart illustrating the procedure of a biometric information authentication method according to the fifth embodiment of the present invention.

As shown in FIG. 10, the biometric information authentication method according to the fifth embodiment of the present invention is the same as the biometric information authentication method of the third embodiment mentioned above with reference to FIG. 6, except for the calculation step (step S30) of calculating final match degree "H" by the final match degree calculating section 30d and the determination step (steps S31 to S35) by the final match degree determining section 31d. Therefore, the detailed description of components common to those of the above-mentioned biometric information authentication method of the third embodiment will be omitted here.

That is, in accordance with the biometric information authentication method according to the fifth embodiment of the present invention as shown in FIG. 10, in the case where no second match degree "P" is calculated as mentioned above, the final match degree calculating section 30d employs the first match degree "M" as final match degree "H", while in the case where second match degree "P" is calculated, employs the second match degree "P" as final match degree "H" as described above (step S30).

Next, the final match degree determining section 31d determines whether or not the final match degree "H" calculated by the final match degree calculating section 30d is obtained only from the first match degree "M" (step S31), and in the case where the final match degree "H" is the first match degree "M" ("Yes" in step S31), the final match degree determining section 31d compares the final match degree "H" with the fourth threshold value (step S32).

Then, in the case where the final match degree "H" is larger than the fourth threshold value ("Yes" in step S32), the final match degree determining section 31d determines that there is a particular relationship between the first to-be-verified data to be authenticated and the first registration data (i.e., he/she is the very person; step S33).

On the contrary, in the case where the final match degree "H" is equal to or smaller than the fourth threshold value ("No" in step S32), the final match degree determining section 31d determines that there is no particular relationship between the first to-be-verified data to be authenticated and the first registration data (i.e., he/she is not the very person; step S34).

Also, in the case where the final match degree "H" is the second match degree "P" ("No" in step S31), the final match degree determining section 31d compares the final match degree "H" with the fifth threshold value (step S35).

Then, in the case where the final match degree "H" is larger than the fifth threshold value ("Yes" in step S35), the final match degree determining section 31d determines that there is a particular relationship between the second to-be-verified data to be authenticated and the second registration data (i.e., he/she is the very person; step S33).

On the contrary, in the case where the final match degree "H" is equal to or smaller than the fifth threshold value ("No" in step S35), the final match degree determining section 31d determines that there is no particular relationship between the second to-be-verified data to be authenticated and the second registration data (i.e., he/she is not the very person; step S34).

Thus, the biometric information authentication device 1d and the biometric information authentication method according to the fifth embodiment of the present invention can exhibit the same effect as the above-mentioned first and third embodiments, and makes an authentication determination (personal authentication) using the threshold value (fourth or fifth threshold value) according to the original match degree (first match degree "M" or second match degree "P") of the calculated final match degree "H", which allows for a higher-accuracy authentication determination.

Figure 11:
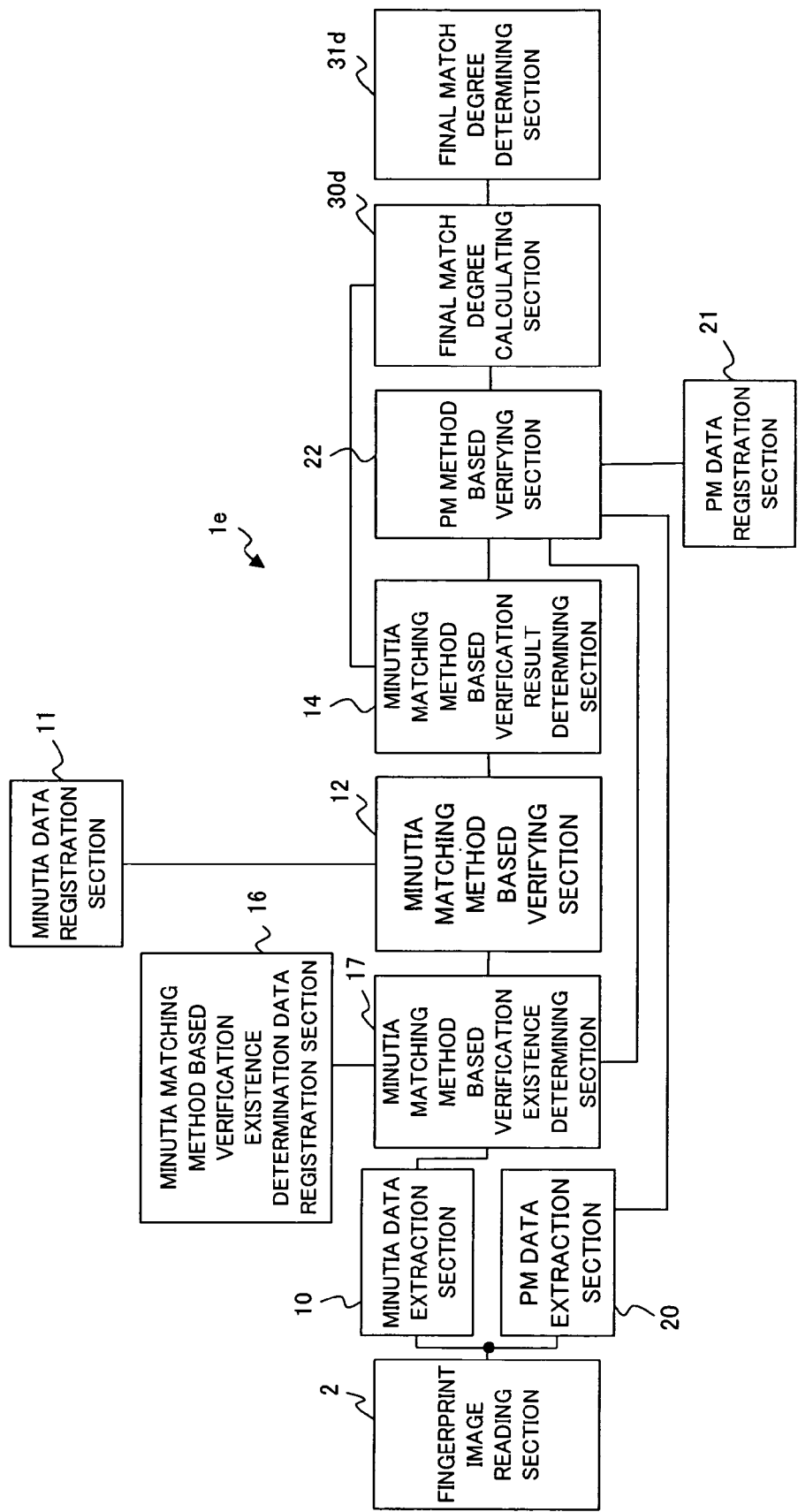
FIG. 11 is a block diagram showing the configuration of a biometric information authentication device according to a variant of the fifth embodiment of the present invention.

It is noted that the biometric information authentication device 1c of the fourth embodiment mentioned above with reference to FIG. 7 maybe changed to be a biometric information authentication device 1e shown in FIG. 11 as a variant of the fifth embodiment of the present invention in the same way that the biometric information authentication device 1b of the third embodiment shown in FIG. 5 is changed in the fifth embodiment of the present invention (i.e., the final match degree calculating section 30 is changed to be the final match degree calculating section 30d, while the final match degree determining section 31 to be the final match degree determining section 31d).

Figure 12:
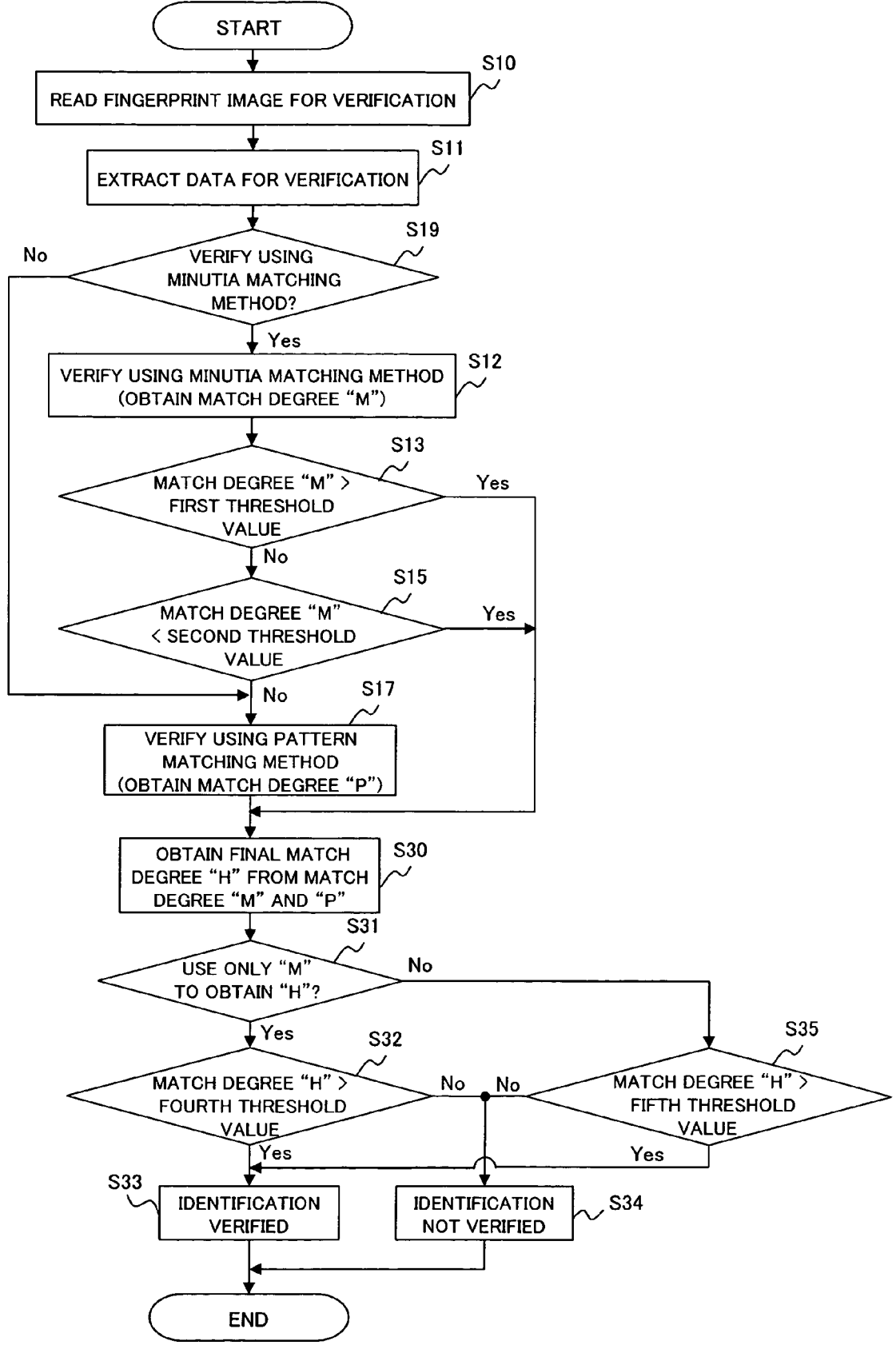
FIG. 12 is a flow chart illustrating the procedure of a biometric information authentication method according to the variant of the fifth embodiment of the present invention.

In the case above, a biometric information authentication method according to the present variant performs steps S30 to S35 (refer to FIG. 10) in place of the steps S20 to S23 in the biometric information authentication method of the fourth embodiment mentioned above with reference to FIG. 8, as shown in the flow chart (steps S10 to S13, S15, S17, S19, and S30 to S35) shown in FIG. 12.

Thus, applying the change from the third embodiment in the fifth embodiment of the present invention to the above-mentioned fourth embodiment can further exhibit the same effect as the fourth embodiment.

[6] Sixth Embodiment of the Present Invention

Figure 13:
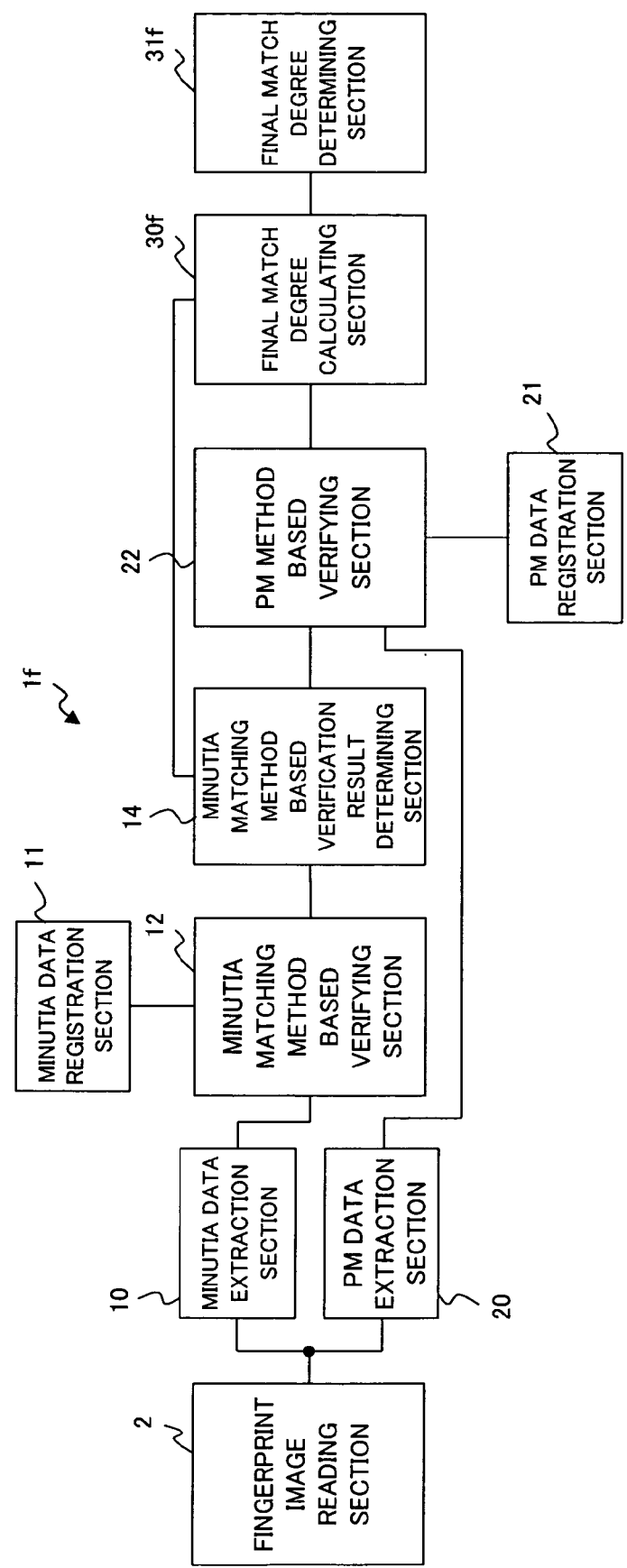
FIG. 13 is a block diagram showing the configuration of a biometric information authentication device according to a sixth embodiment of the present invention.

Next will be described a biometric information authentication device according to the sixth embodiment of the present invention. FIG. 13 is a block diagram showing the configuration of the biometric information authentication device (fingerprint authentication device) $1f$ according to the sixth embodiment of the present invention. It is noted that the same numerals in FIG. 13 as those mentioned above indicate the same or almost the same components.

As shown in FIG. 13, the biometric information authentication device $1f$ is the same as the biometric information authentication device $1b$ of the third embodiment mentioned above with reference to FIG. 5, except for the method for calculating final match degree "H" by the final match degree calculating section $30f$ and the method for determination by the final match degree determining section $31f$. Therefore, the detailed description of components common to those of the above-mentioned biometric information authentication device $1b$ of the third embodiment will be omitted here.

In the case where one of either first match degree "M" or second match degree "P" is only calculated, the final match degree calculating section $30f$ employs either one calculated as final match degree "H", while in the case where both first match degree "M" and second match degree "P" are calculated, calculates final match degree "H" by the foregoing Formula (1) based on the first match degree "M" and the second match degree "P".

Then, the final match degree determining section $31f$ determines whether or not there is a particular relationship, respectively, between the first to-be-verified data or the second to-be-verified data to be authenticated and the first registration data or the second registration data (i.e., he/she is the very person) using a threshold value (fourth, fifth, or sixth threshold value) according to the final match degree "H" calculated by the final match degree calculating section $30f$.

That is, the final match degree determining section $31f$ compares, in the case where the final match degree "H" calculated by the final match degree calculating section $30f$ is the first match degree "M", the final match degree "H" with the fourth threshold value provided preliminarily to determine that he/she is the very person in the case where the final match degree "H" is larger than the fourth threshold value, while that he/she is not the very person in the case where the final match degree "H" is equal to or smaller than the fourth threshold value.

Also, the final match degree determining section $31f$ compares, in the case where the final match degree "H" calculated by the final match degree calculating section $30f$ is the second match degree "P", the final match degree "H" with the fifth threshold value provided preliminarily to determine that he/she is the very person in the case where the final match degree "H" is larger than the fifth threshold value, while that he/she is not the very person in the case where the final match degree "H" is equal to or smaller than the fifth threshold value.

Further, the final match degree determining section $31f$ compares, in the case where the final match degree "H" calculated by the final match degree calculating section $30f$ is calculated by the first match degree "M" and the second match degree "P", the final match degree "H" with the sixth threshold value provided preliminarily to determine that he/she is the very person in the case where the final match degree "H" is larger than the sixth threshold value, while that he/she is not the very person in the case where the final match degree "H" is equal to or smaller than the sixth threshold value.

Next, the procedure of a biometric information authentication method (operation of the biometric information authentication device $1f$) according to the sixth embodiment of the present invention will be described with reference to the flow chart (steps S10 to S13, S15, S17, and S40 to S47) shown in FIG. 14. It is noted that the same numerals in FIG. 14 as those mentioned above indicate the same or almost the same components.

Figure 14:
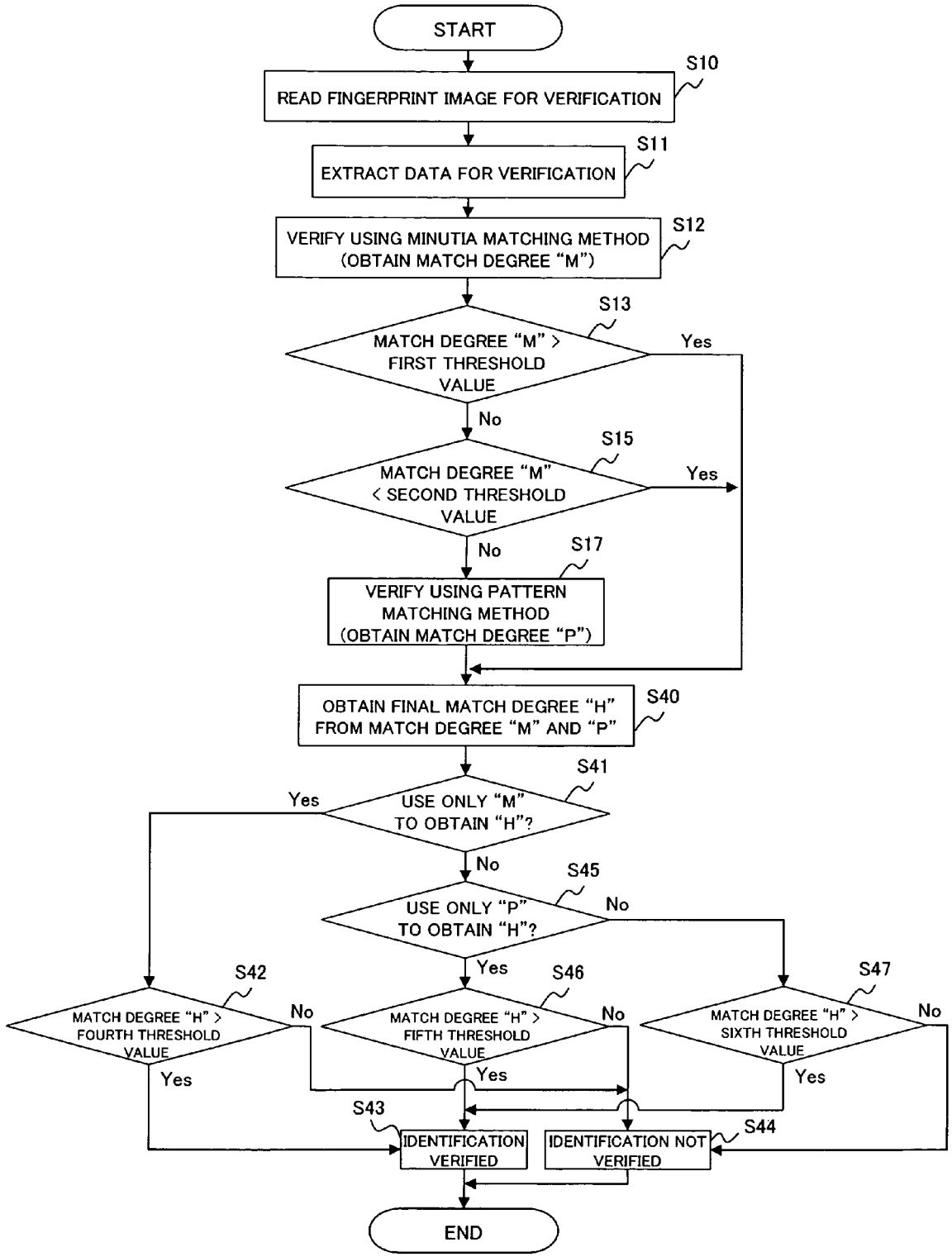
FIG. 14 is a flow chart illustrating the procedure of a biometric information authentication method according to the sixth embodiment of the present invention.

As shown in FIG. 14, the biometric information authentication method according to the sixth embodiment of the present invention is the same as the biometric information authentication method of the third embodiment mentioned above with reference to FIG. 6, except for the calculation step (step S40) of calculating final match degree "H" by the final match degree calculating section $30f$ and the determination step (steps S41 to S47) of determining by the final match degree determining section $31f$. Therefore, the detailed description of components common to those of the above-mentioned biometric information authentication method of the third embodiment will be omitted here.

That is, in the biometric information authentication method according to the sixth embodiment of the present invention as shown in FIG. 14, the final match degree calculating section $30f$ employs, in the case where one of either first match degree "M" or second match degree "P" is only calculated, either one calculated as final match degree "H", while in the case where both first match degree "M" and second match degree "P" are calculated, calculates final match degree "H" by the foregoing Formula (1) based on the first match degree "M" and the second match degree "P" as mentioned above (step S40).

Next, the final match degree determining section $31f$ determines whether or not the final match degree "H" calculated by the final match degree calculating section $30f$ is obtained only from the first match degree "M" (step S41), and in the case where the final match degree "H" is the first match degree "M" ("Yes" in step S41), the final match degree determining section $31f$ compares the final match degree "H" with the fourth threshold value (step S42).

Then, in the case where the final match degree "H" is larger than the fourth threshold value ("Yes" in step S42), the final match degree determining section $31f$ determines that there is a particular relationship between the first to-be-verified data to be authenticated and the first registration data (i.e., he/she is the very person; step S43).

On the contrary, in the case where the final match degree "H" is equal to or smaller than the fourth threshold value ("No" in step S42), the final match degree determining section $31f$ determines that there is no particular relationship between the first to-be-verified data to be authenticated and the first registration data (i.e., he/she is not the very person; step S44).

Also, in the case where the final match degree "H" is not the first match degree "M" ("No" in step S41), the final match degree determining section $31f$ determines whether or not the final match degree "H" is obtained only from the second match degree "P" (step S45), and in the case where the final match degree "H" is the second match degree "P" ("Yes" in step S45), the final match degree determining section 31f compares the final match degree "H" with the fifth threshold value (step S46).

Then, in the case where the final match degree "H" is larger than the fifth threshold value ("Yes" in step S46), the final match degree determining section 31f determines that there is a particular relationship between the second to-be-verified data to be authenticated and the second registration data (i.e., he/she is the very person; step S43).

On the contrary, in the case where the final match degree "H" is equal to or smaller than the fifth threshold value ("No" in step S46), the final match degree determining section 31f determines that there is no particular relationship between the second to-be-verified data to be authenticated and the second registration data (i.e., he/she is not the very person; step S44).

Further, in the case where the final match degree "H" is not the second match degree "P" ("No" in step S45), that is, the final match degree "H" is obtained by the first match degree "M" and the second match degree "P", the final match degree determining section 31f compares the final match degree "H" with the sixth threshold value (step S47), and then in the case where the final match degree "H" is larger than the sixth threshold value ("Yes" in step S47), determines that there is a particular relationship between the authentication object and the first registration data as well as the second registration data (i.e., he/she is the very person; step S43).

On the contrary, in the case where the final match degree "H" is equal to or smaller than the sixth threshold value ("No" in step S47), the final match degree determining section 31f determines that there is no particular relationship between the authentication object and the first registration data as well as the second registration data (i.e., he/she is not the very person; step S44).

Thus, the biometric information authentication device if and the biometric information authentication method according to the sixth embodiment of the present invention can exhibit the same effect as the above-mentioned first and third embodiments, and makes an authentication determination (personal authentication) using a different threshold value (fourth, fifth, or sixth threshold value) according to the calculated final match degree "H", which allows for a higher-accuracy authentication determination.

Figure 15:
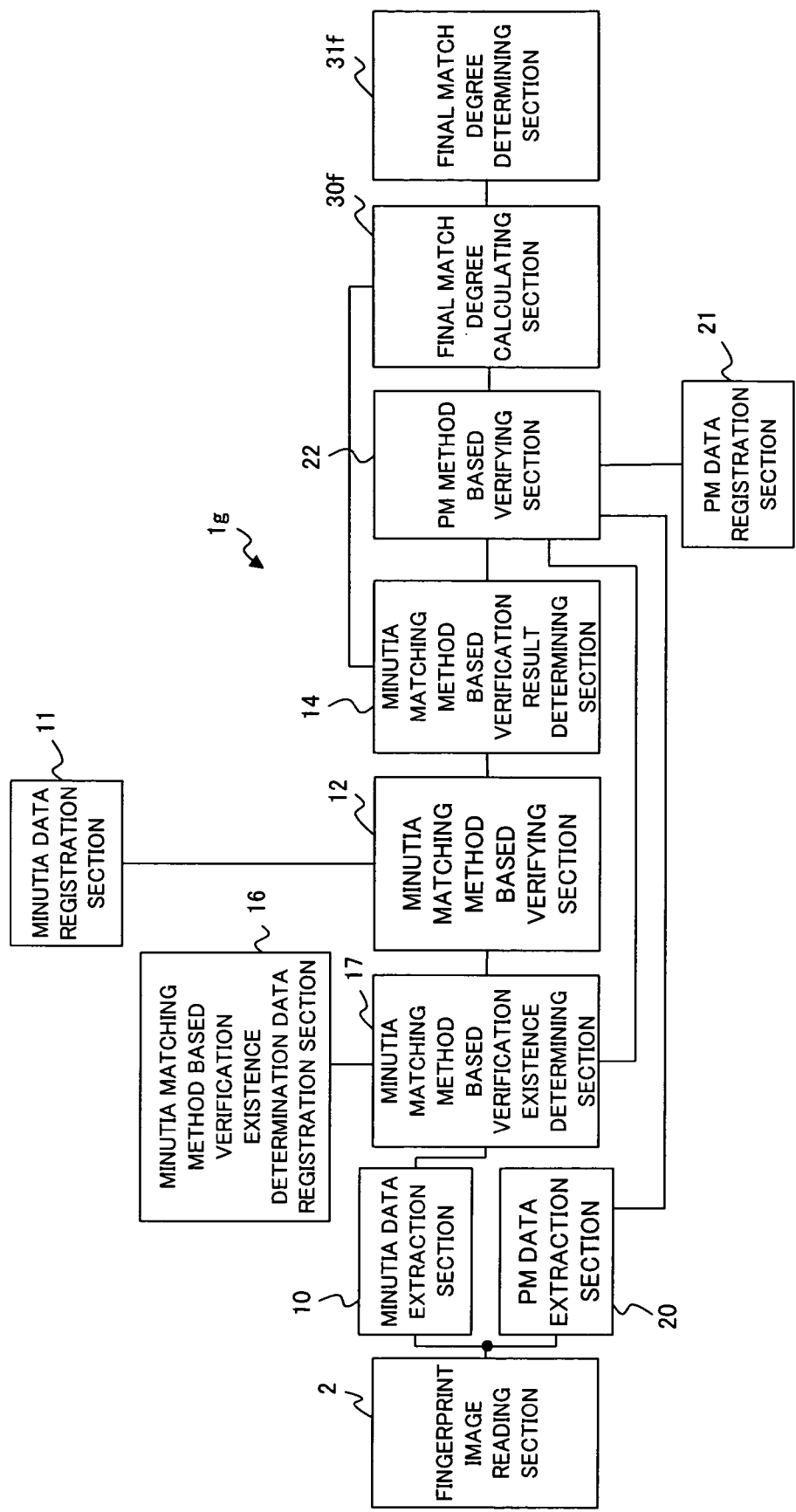
FIG. 15 is a block diagram showing the configuration of a biometric information authentication device according to a variant of the sixth embodiment of the present invention.

It is noted that the biometric information authentication device 1c of the fourth embodiment mentioned above with reference to FIG. 7 maybe changed to be a biometric information authentication device 1g shown in FIG. 15 as a variant of the sixth embodiment of the present invention in the same way that the biometric information authentication device 1b of the third embodiment shown in FIG. 5 is changed in the sixth embodiment of the present invention (i.e., the final match degree calculating section 30 is changed to be the final match degree calculating section 30f, while the final match degree determining section 31 to be the final match degree determining section 31f).

Figure 16:
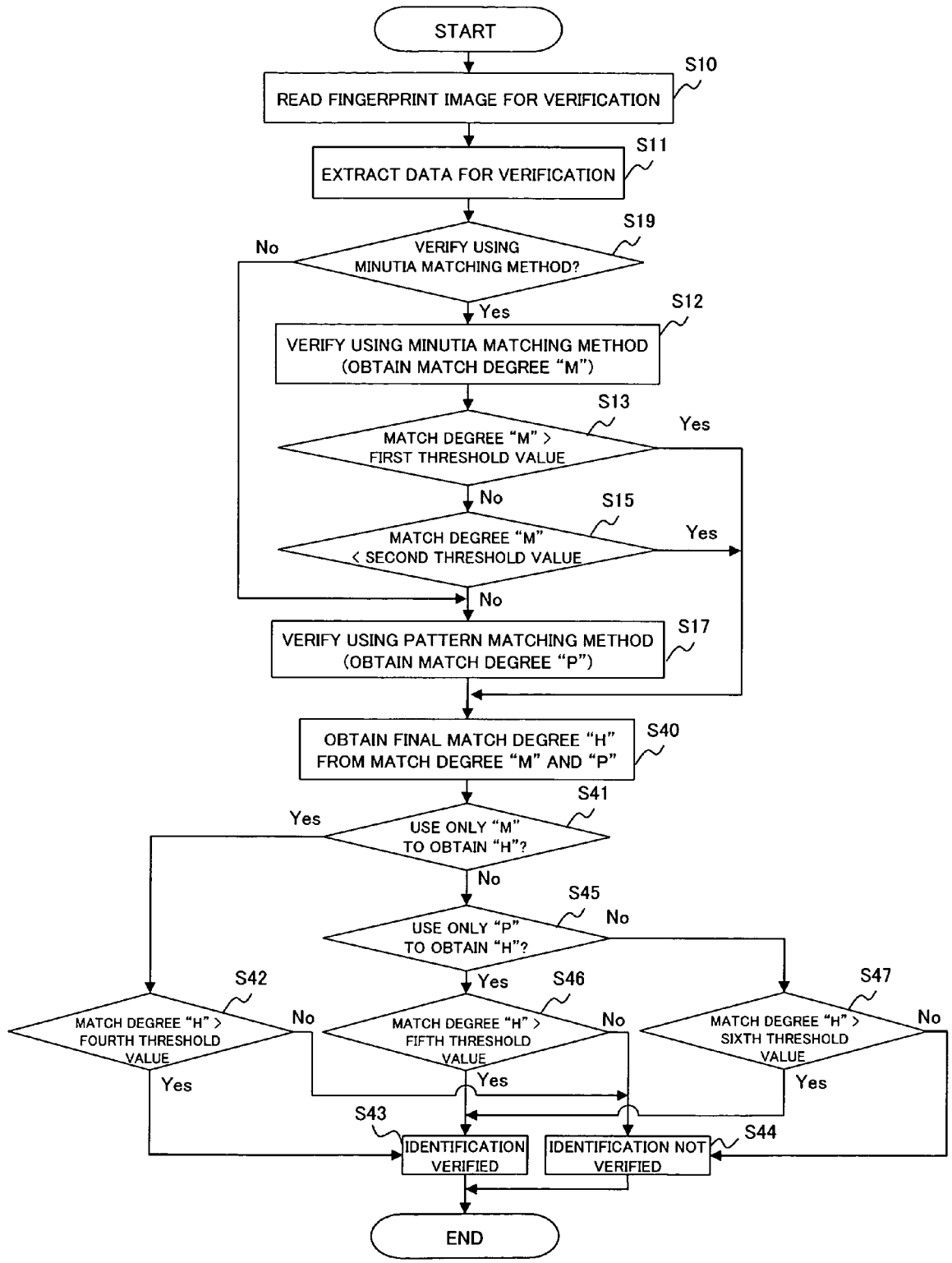
FIG. 16 is a flow chart illustrating the procedure of a biometric information authentication method according to the variant of the sixth embodiment of the present invention.

In the case above, as shown in the flow chart (steps S10 to S13, S15, S17, S19, and S40 to S47) shown in FIG. 16, a biometric information authentication method according to the present variant performs steps S40 to S47 (refer to FIG. 14) in place of the steps S20 to S23 in the biometric information authentication method of the fourth embodiment mentioned above with reference to FIG. 8.

Thus, applying the change from the third embodiment in the sixth embodiment of the present invention to the above-mentioned fourth embodiment can further exhibit the same effect as the fourth embodiment.

[7] Seventh Embodiment of the Present Invention

Figure 17:
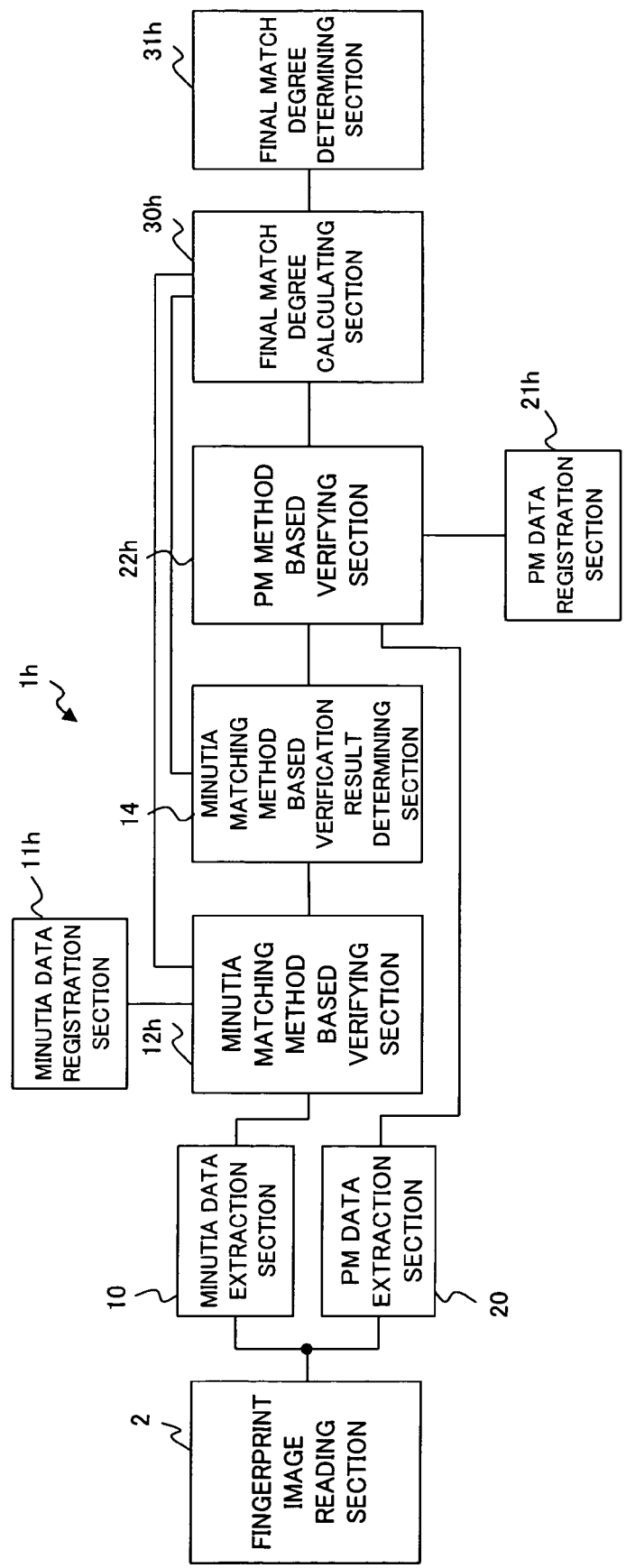
FIG. 17 is a block diagram showing the configuration of a biometric information authentication device according to a seventh embodiment of the present invention.

Next will be described a biometric information authentication device according to the seventh embodiment of the present invention. FIG. 17 is a block diagram showing the configuration of the biometric information authentication device (fingerprint authentication device) 1h according to the seventh embodiment of the present invention. It is noted that the same numerals in FIG. 17 as those mentioned above indicate the same or almost the same components.

As shown in FIG. 17, unlike the biometric information authentication device 1b of the third embodiment mentioned above with reference to FIG. 5, which performs one-to-one personal authentication, the biometric information authentication device 1h is for one-to-many personal authentication, including N pieces of first registration data and second registration data respectively, and is adapted to perform verification against the respective N pieces of registration data. Therefore, only components different from those of the above-mentioned biometric information authentication device 1b of the third embodiment will be described in detail for one-to-many verification and the detailed description of components common to those of the biometric information authentication device 1b of the third embodiment will be omitted here.

The fingerprint image reading section 2 reads a plurality (N pieces here) of biometric information (registration fingerprint image) to be used for verification of an authentication object when registered initially (fingerprint registration processing).

The minutia data registration section 11h is adapted to hold a plurality (N pieces here) of first registration data extracted by the biometric information authentication device 1h or a different device, etc. The PM data registration section 21h is also adapted to hold a plurality (N pieces here) of second registration data extracted by the biometric information authentication device 1h or a different device, etc.

It is noted that first registration data held in the minutia data registration section 11h and second registration data held in the PM data registration section 21h correspond to each other, and that the minutia data registration section 11h and PM data registration section 21h hold the same number of registration data.

The minutia matching method based verifying section 12h is adapted to verify the first to-be-verified data to be authenticated against each of N pieces of first registration data held in the minutia data registration section 11h to obtain first match degree "M" for each first registration data as a result thereof.

The PM method based verifying section 22h is also adapted to verify the second to-be-verified data to be authenticated against each of N pieces of second registration data held in the PM data registration section 21h to obtain second match degree "P" for each second registration data as a result thereof.

The final match degree calculating section 30h is adapted to calculate final match degree "H" for each registration data.

The final match degree determining section 31h is adapted to make a determination based on the maximum final match degree "H" among N pieces of final match degree "H" calculated by the final match degree calculating section 30h. That is, the final match degree determining section 31h compares the maximum final match degree "H" with a third threshold value to determine that there is a particular relationship between the authentication object and the first registration data or the second registration data corresponding to the maximum final match degree "H" (i.e., he/she is the very person) in the case where the maximum final match degree "H" is larger than the third threshold value, while that there is no particular relationship between the authentication object and the first registration data or the second registration data corresponding to the maximum final match degree "H" (i.e., he/she is not the very person) in the case where the maximum final match degree "H" is equal to or smaller than the third threshold value.

It is noted that the determination by the final match degree determining section 31h that there is no particular relationship between the authentication object and the first registration data or the second registration data corresponding to the maximum final match degree "H" indicates that no registration data (first or second registration data) among N pieces of registration data matches to-be-verified data (first or second to-be-verified data) to be authenticated, and that no fingerprint to be authenticated is registered.

Next, the procedure of a biometric information authentication method (operation of the biometric information authentication device 1h) according to the seventh embodiment of the present invention will be described with reference to the flow chart (steps S10 to S13, S15, S17, S20, and S50 to S56) shown in FIG. 18. It is noted that the same numerals in FIG. 18 as those mentioned above indicate the same or almost the same components.

Figure 18:
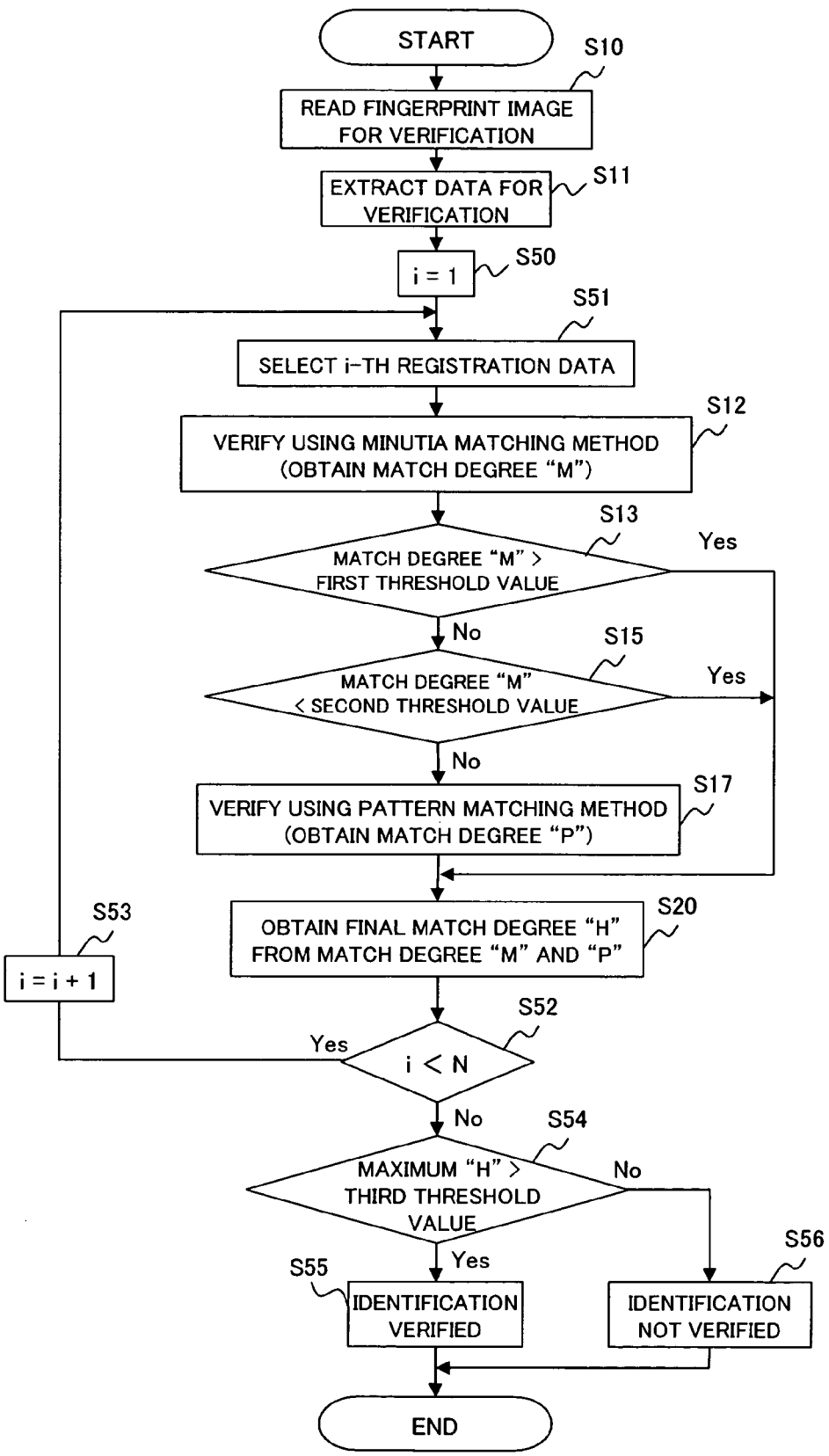
FIG. 18 is a flow chart illustrating the procedure of a biometric information authentication method according to the seventh embodiment of the present invention.

As shown in FIG. 18, the biometric information authentication method according to the seventh embodiment of the present invention is the same as the biometric information authentication method of the third embodiment mentioned above with reference to FIG. 6, except that verification is performed against a plurality (N pieces here) of registration data (steps S50 to S53), and that the final match degree determining section 31h makes an determination based on the maximum final match degree "H" (steps S54 to S56). Therefore, the detailed description of components common to those of the above-mentioned biometric information authentication method of the third embodiment will be omitted here.

That is, in the biometric information authentication method according to the seventh embodiment of the present invention, for N pieces of first registration data to be verified completely in the order registered in the minutia data registration section 11h by the minutia matching method based verifying section 12h, a counter "i" is first set to 1 (step S50) to select the i-th (1st here) first registration data held in the minutia data registration section 11h (step S51).

Then, the minutia matching method based verifying section 12h verifies the selected first registration data against the first to-be-verified data to be authenticated to obtain first match degree "M" of the i-th first registration data (step S12).

Next, the minutia matching method based verification result determining section 14 determines whether or not to require the PM method based verifying section 22h to perform verification using first and second threshold values (steps S13 and S15), and in the case where the minutia matching method based verification result determining section 14 determines to require the PM method based verifying section 22h to per form verification, the PM method based verifying section 22h performs verification for the second registration data corresponding to the first registration data selected in the foregoing step S51 (step S17).

Further, the final match degree calculating section 30h calculates final match degree "H" for the i-th registration data based on the first match degree "M" or the first match degree "M" as well as the second match degree "P" (step S20) Then, the minutia matching method based verifying section 12h determines whether or not the counter "i" is smaller than N (i.e., the counter "i" reaches N; step S52), and in the case where the counter "i" is smaller than N, increments the counter "i" by one (step S53) to apply the processing of the foregoing steps S51, S12, S13, S15, S17, S20, and S52 to the subsequent registration data (i-th data after incremented in the foregoing step S53) held in the minutia data registration section 11h.

That is, until it is determined that the counter "i" is not smaller than N ("No" in step S53), that is, the counter "i" becomes equal to N, the processing of the foregoing steps S51, S12, S13, S15, S17, S20, S52 and S53 is repeated.

Then, in the case of a determination that the counter "i" is not smaller than N ("No" in step S53), the final match degree determining section 31h compares the maximum final match degree "H" among N pieces of final match degree "H" calculated by the final match degree calculating section 30h with the third threshold value provided preliminarily (step S54), and in the case where the maximum final match degree "H" is larger than the third threshold value ("Yes" in step S54), determines that there is a particular relationship between the authentication object and the registration data (first or second registration data) corresponding to the maximum final match degree "H" (i.e., he/she is the very person; step S55).

On the contrary, in the case where the maximum final match degree "H" is equal to or smaller than the third threshold value ("No" in step S54), the final match degree determining section 31h determines that there is no particular relationship between the authentication object and the registration data (first or second registration data) corresponding to the maximum final match degree "H" (i.e., he/she is not the very person; step S56)

Thus, the biometric information authentication device 1h and the biometric information authentication method according to the seventh embodiment of the present invention can exhibit the same effect as the above-mentioned third embodiment even for one-to-many personal authentication.

Figure 19:
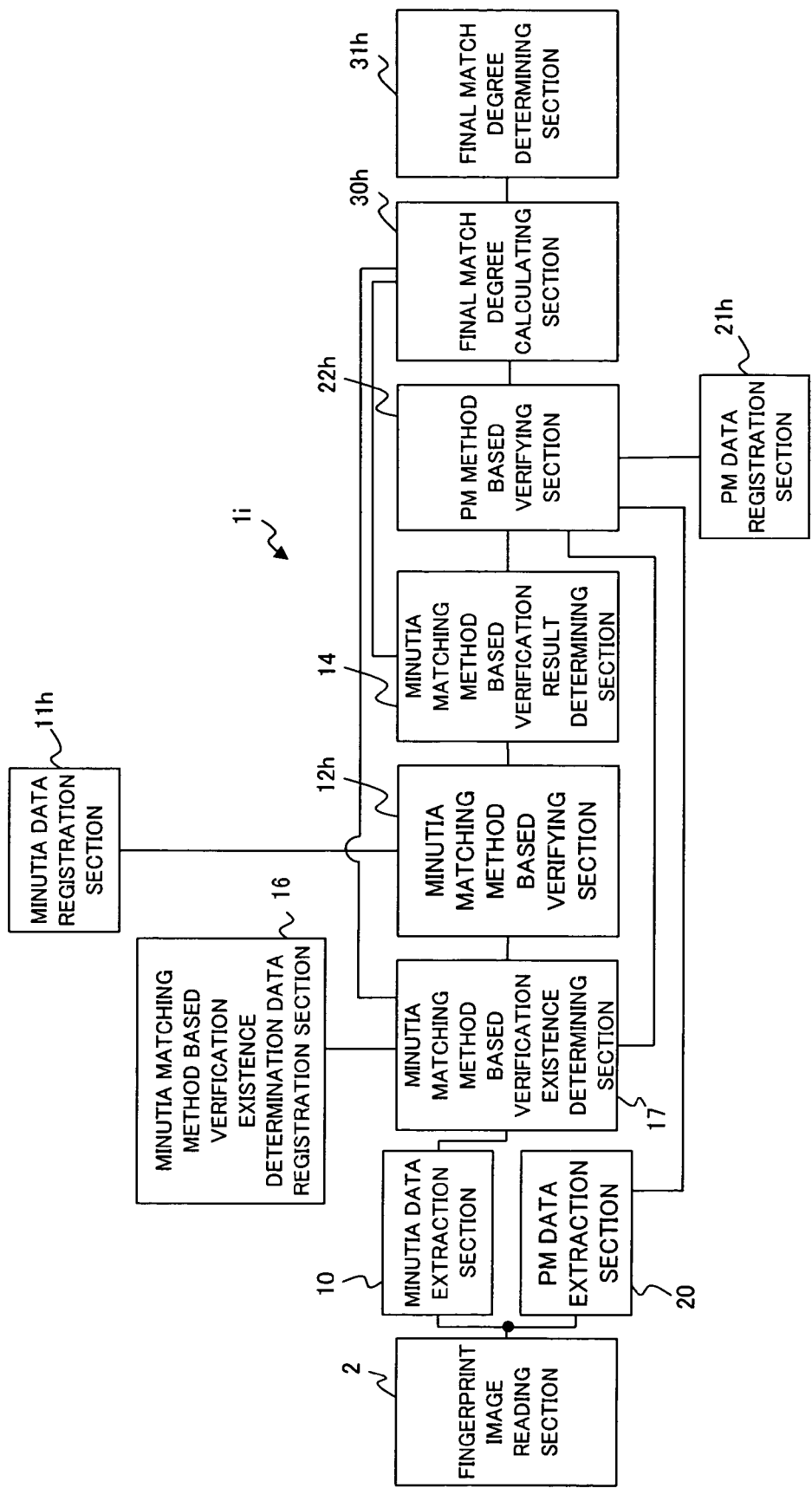
FIG. 19 is a block diagram showing the configuration of a biometric information authentication device according to a variant of the seventh embodiment of the present invention.

It is noted that the biometric information authentication device 1c of the fourth embodiment mentioned above with reference to FIG. 7 maybe changed to be a biometric information authentication device 1i shown in FIG. 19 as a variant of the seventh embodiment of the present invention, to perform one-to-many personal authentication, in the same way that the biometric information authentication device 1b of the third embodiment shown in FIG. 5 is changed in the seventh embodiment of the present invention.

Figure 20:
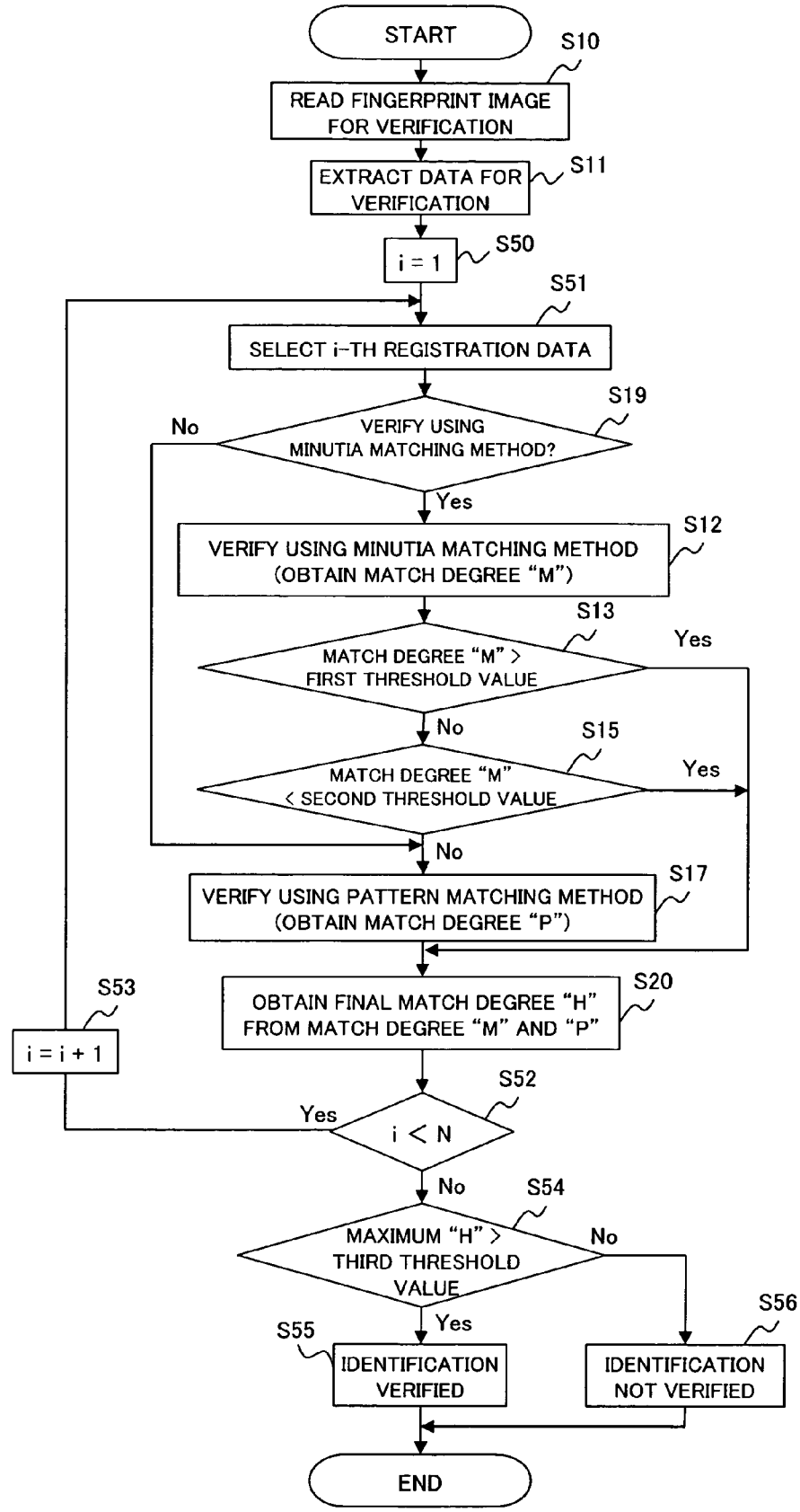
FIG. 20 is a flow chart illustrating the procedure of a biometric information authentication method according to the variant of the seventh embodiment of the present invention.

In the case above, as shown in the flow chart (steps S10 to S13, S15, S17, S19, S20, and S50 to S56) shown in FIG. 20, a biometric information authentication method according to the present variant includes an additional step S19 relative to the biometric information authentication method of the seventh embodiment shown in FIG. 18.

Thus, applying the change from the third embodiment in the seventh embodiment of the present invention to the above-mentioned fourth embodiment can further exhibit the same effect as the fourth embodiment in addition to the above-mentioned effect.

[8] Eighth Embodiment of the Present Invention

Figure 21:
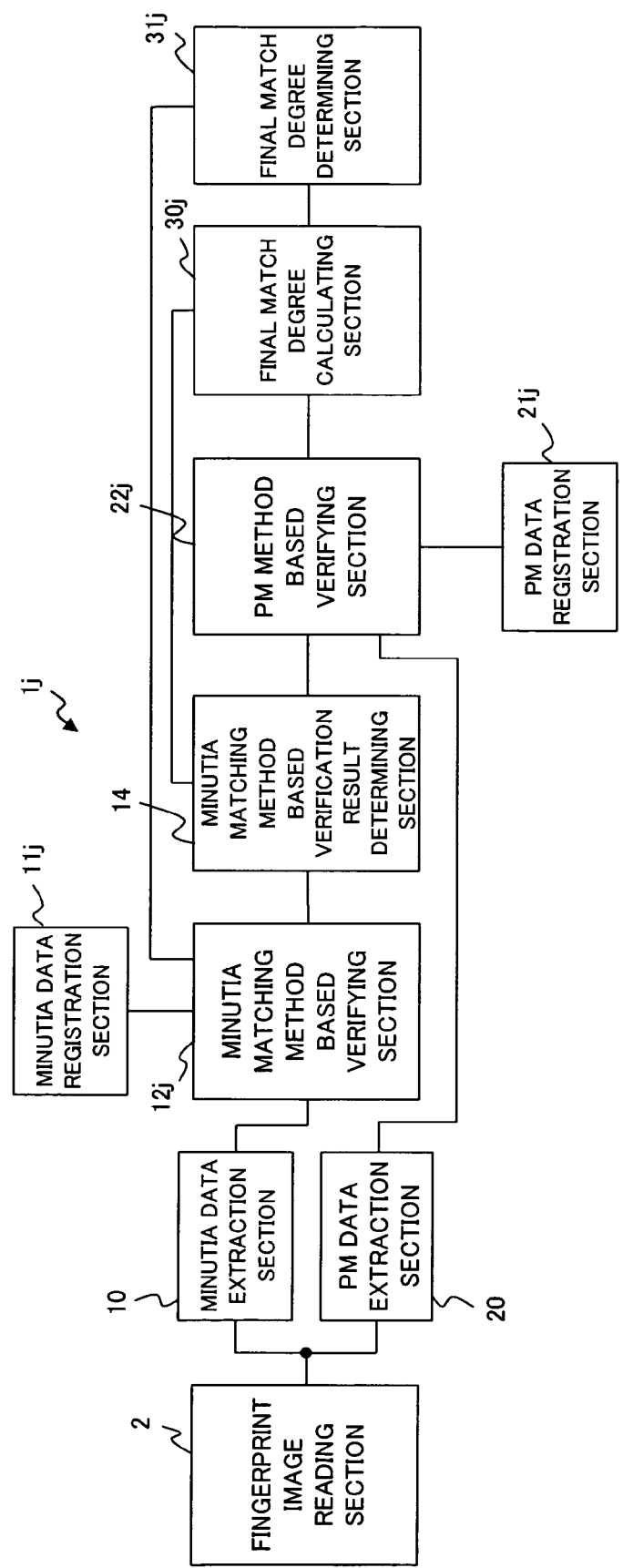
FIG. 21 is a block diagram showing the configuration of a biometric information authentication device according to an eighth embodiment of the present invention.

Next will be described a biometric information authentication device according to the eighth embodiment of the present invention. FIG. 21 is a block diagram showing the configuration of the biometric information authentication device (fingerprint authentication device) 1j according to the eighth embodiment of the present invention. It is noted that the same numerals in FIG. 21 as those mentioned above indicate the same or almost the same components.

As shown in FIG. 21, the biometric information authentication device $1j$, which performs one-to-many personal authentication as is the case with the biometric information authentication device $1h$ of the seventh embodiment mentioned above with reference to FIG. 17, is adapted to perform verification against N pieces of first registration data and second registration data sequentially until the final match degree calculating section $30j$ makes a final authentication determination, and in the case where it is determined that there is a particular relationship with the authentication object (i.e., he/she is the very person), to terminate the processing at the point. Therefore, only components different from those of the above-mentioned biometric information authentication device $1h$ of the seventh embodiment will be described in detail and the detailed description of components common to those of the biometric information authentication device $1h$ of the seventh embodiment will be omitted here.

In addition, the minutia data registration section $11j$ and the PM data registration section $21j$ of the biometric information authentication device $1j$ are the same, respectively, as the minutia data registration section $11h$ and the PM data registration section $21h$ of the biometric information authentication device $1h$ of the seventh embodiment mentioned above.

The minutia matching method based verifying section $12j$ is adapted to verify the first to-be-verified data to be authenticated against each of N pieces of first registration data held in the minutia data registration section $11j$ to obtain first match degree "M" for each first registration data as a result thereof.

The PM method based verifying section $22j$ is adapted to verify the second to-be-verified data to be authenticated against each of N pieces of second registration data held in the PM data registration section $21j$ to obtain second match degree "P" for each second registration data as a result thereof.

The final match degree calculating section $30j$ calculates final match degree "H" for each registration data.

When final match degree "H" is calculated by the final match degree calculating section $30j$, the final match degree determining section $31j$ compares the final match degree "H" with a third threshold value provided preliminarily to make an authentication determination based on the calculated final match degree "H". That is, for each calculation of final match degree "H" by the final match degree calculating section $30j$, the final match degree determining section $31j$ makes an authentication determination based on the final match degree "H".

Then, the final match degree determining section $31j$ makes an authentication determination for each calculation of final match degree "H" by the final match degree calculating section $30j$ until there exists a determination that there is a particular relationship between the authentication object and the first registration data or the second registration data (i.e., he/she is the very person).

It is noted that in the case where the final match degree determining section $31j$ determines that there is no particular relationship between the authentication object and the first registration data or the second registration data for any final match degree "H" as a result of the complete sequential determination for N pieces of final match degree "H" calculated by the final match degree calculating section $30j$, the processing is terminated. This indicates that no registration data (first or second registration data) among N pieces of registration data matches to-be-verified data (first or second to-be-verified data) to be authenticated, and that no fingerprint to be authenticated is registered.

Next, the procedure of a biometric information authentication method (operation of the biometric information authentication device $1j$) according to the eighth embodiment of the present invention will be described with reference to the flow chart (steps S10 to S13, S15, S17, S20, and S62 to S66) shown in FIG. 22. It is noted that the same numerals in FIG. 22 as those mentioned above indicate the same or almost the same components.

Figure 22:
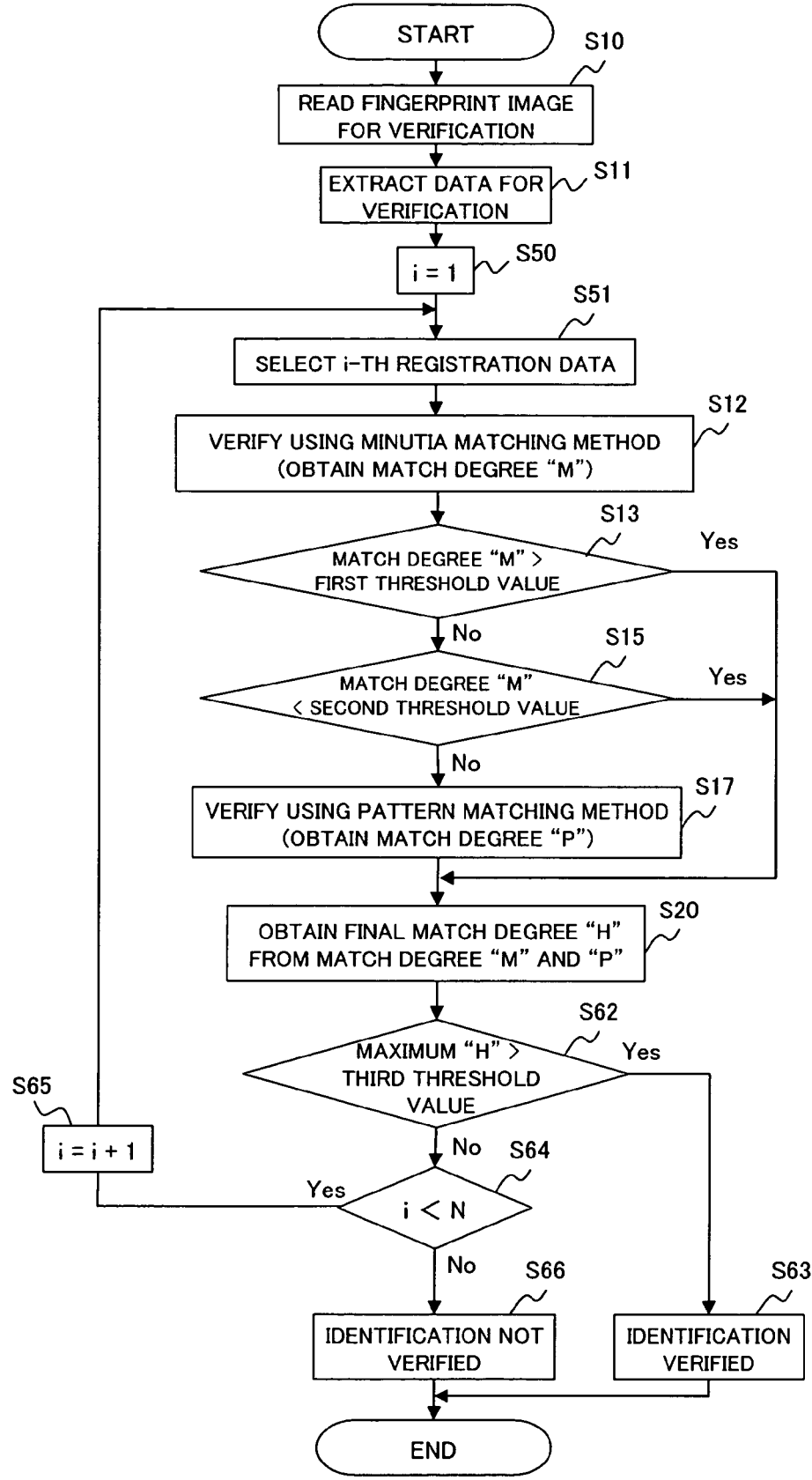
FIG. 22 is a flow chart illustrating the procedure of a biometric information authentication method according to the eighth embodiment of the present invention.

As shown in FIG. 22, the biometric information authentication method according to the eighth embodiment of the present invention performs the same processing as the biometric information authentication method of the seventh embodiment mentioned above with reference to FIG. 18 through steps S10, S11, S50, S51, S12 to S14, S17, and S20.

Then, when final match degree "H" is calculated by the final match degree calculating section $30j$ (step S20), the final match degree determining section $31j$ compares the i-th final match degree "H" calculated with a third threshold value (step S62), and in the case where the final match degree "H" is larger than the third threshold value, determines that there is a particular relationship between the authentication object and the registration data (first or second registration data) corresponding to the final match degree "H" (i.e., he/she is the very person; step S63) and then terminates the processing.

On the contrary, in the case where the final match degree "H" is equal to or smaller than the third threshold value ("No" in step S62), the final match degree determining section $31j$ determines that there is no particular relationship between the authentication object and the registration data (first or second registration data) corresponding to the final match degree "H" (i.e., he/she is not the very person), and then determines whether or not the counter "i" is smaller than N (i.e., the counter "i" reaches N; step S64).

Here in the case where the counter "i" is smaller than N ("Yes" in step S64), the final match degree determining section $31j$ increments the counter "i" by one (step S65) to apply the processing of the foregoing steps S51, S12, S13, S15, S17, S20, and S62 or S64 to the subsequent registration data (i-th data after incremented in the foregoing step S65) held in the minutia data registration section $11h$.

On the contrary, in the case where the counter "i" is not smaller than N (i.e., the counter "i" becomes equal to N; "No" in step S64), which indicates that all of N pieces of final match degree "H" calculated by the final match degree calculating section $30j$ are not larger than the third threshold value, the final match degree determining section $31j$ determines that there is no particular relationship between the authentication object and all registration data held in the minutia data registration section $11j$ or the PM data registration section $21j$ (i.e., he/she is not the very person; step S66). That is, the final match degree determining section $31j$ determines that no registration data (first or second registration data) includes the same fingerprint as that to be authenticated.

Thus, the biometric information authentication device $1j$ and the biometric information authentication method according to the eighth embodiment of the present invention can exhibit the same effect as the above-mentioned seventh embodiment, and in the case the final match degree determining section $31j$ can determine that he/she is the very person, the processing is terminated when identification verified without performing verification against all of N pieces of registration data, resulting in a shorter verification time than the seventh embodiment.

Figure 23:
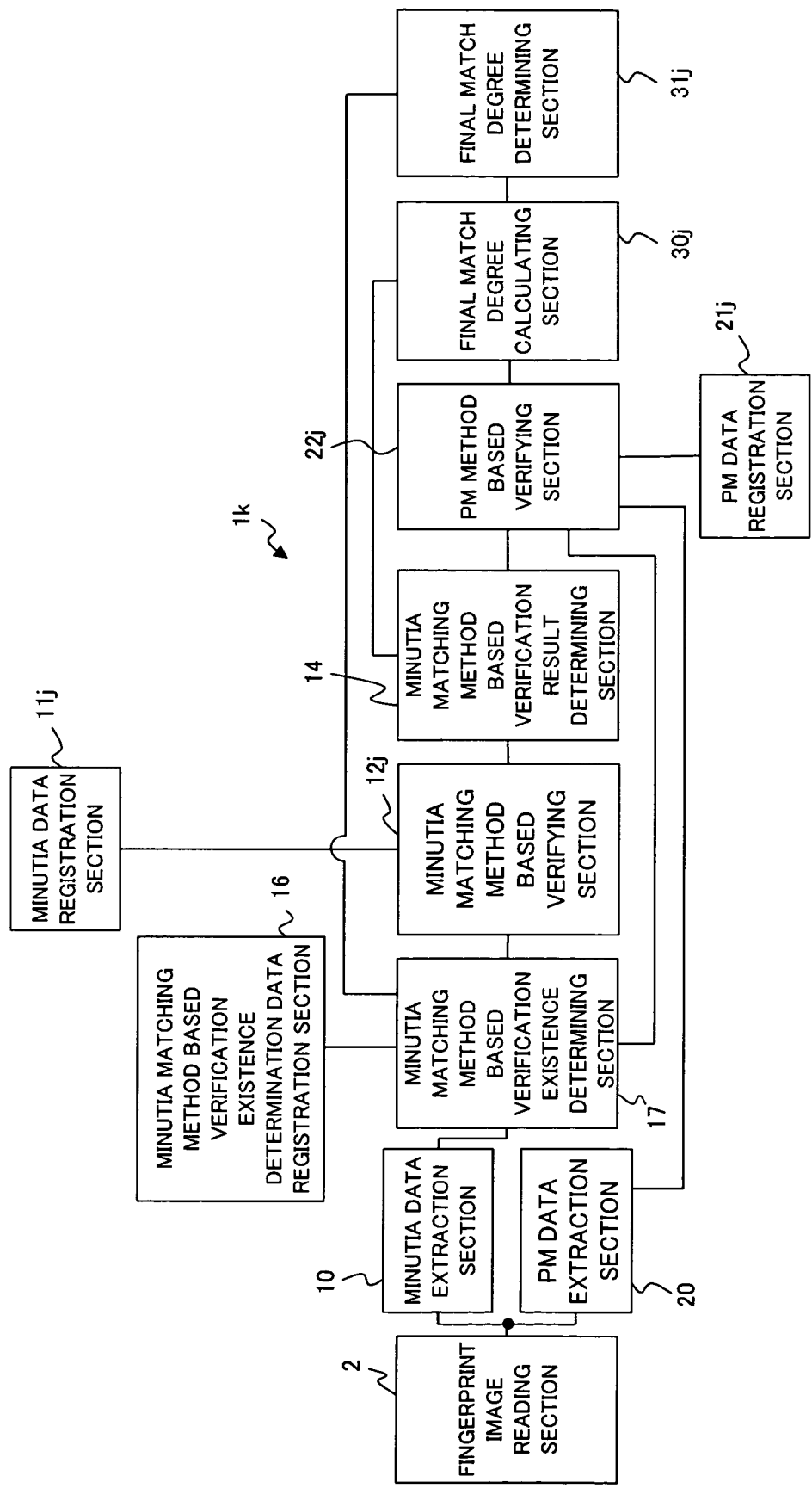
FIG. 23 is a block diagram showing the configuration of a biometric information authentication device according to a variant of the eighth embodiment of the present invention.

It is noted that the biometric information authentication device $1c$ of the fourth embodiment mentioned above with reference to FIG. 7 maybe changed to be a biometric information authentication device 1k shown in FIG. 23 as a variant of the eighth embodiment of the present invention, to perform one-to-many personal authentication, in the same way that the biometric information authentication device 1b of the third embodiment shown in FIG. 5 is changed in the eighth embodiment of the present invention.

Figure 24:
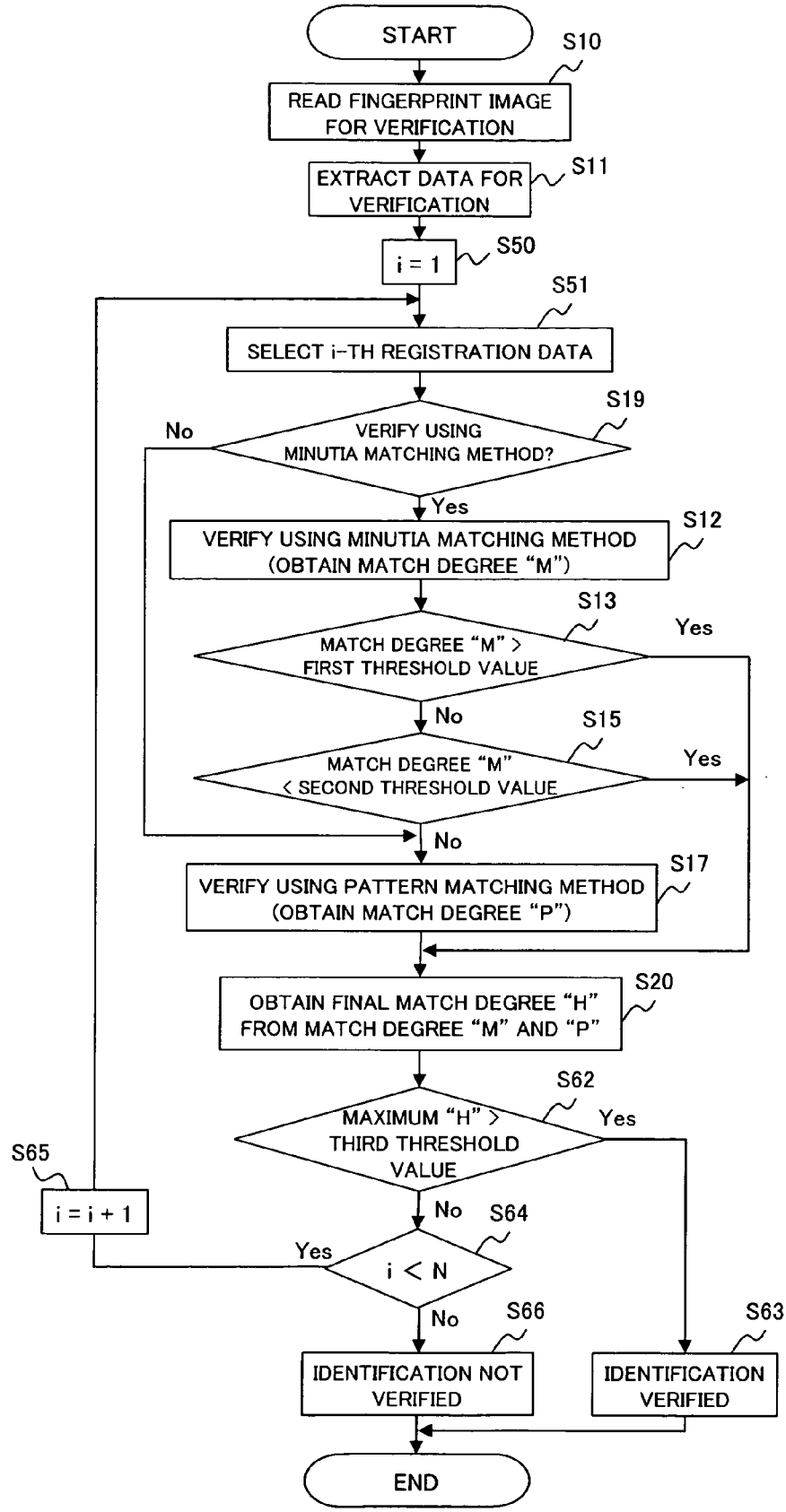
FIG. 24 is a flow chart illustrating the procedure of a biometric information authentication method according to the variant of the eighth embodiment of the present invention.

In the case above, as shown in the flow chart (steps S10 to S13, S15, S17, S19, S20, S50, S51, and S62 to S66) shown in FIG. 24, a biometric information authentication method according to the present variant includes an additional step S19 relative to the biometric information authentication method of the eighth embodiment shown in FIG. 22.

Thus, applying the change from the third embodiment in the eighth embodiment of the present invention to the above-mentioned fourth embodiment can further exhibit the same effect as the fourth embodiment in addition to the above-mentioned effect.

[9] Ninth Embodiment of the Present Invention

Figure 25:
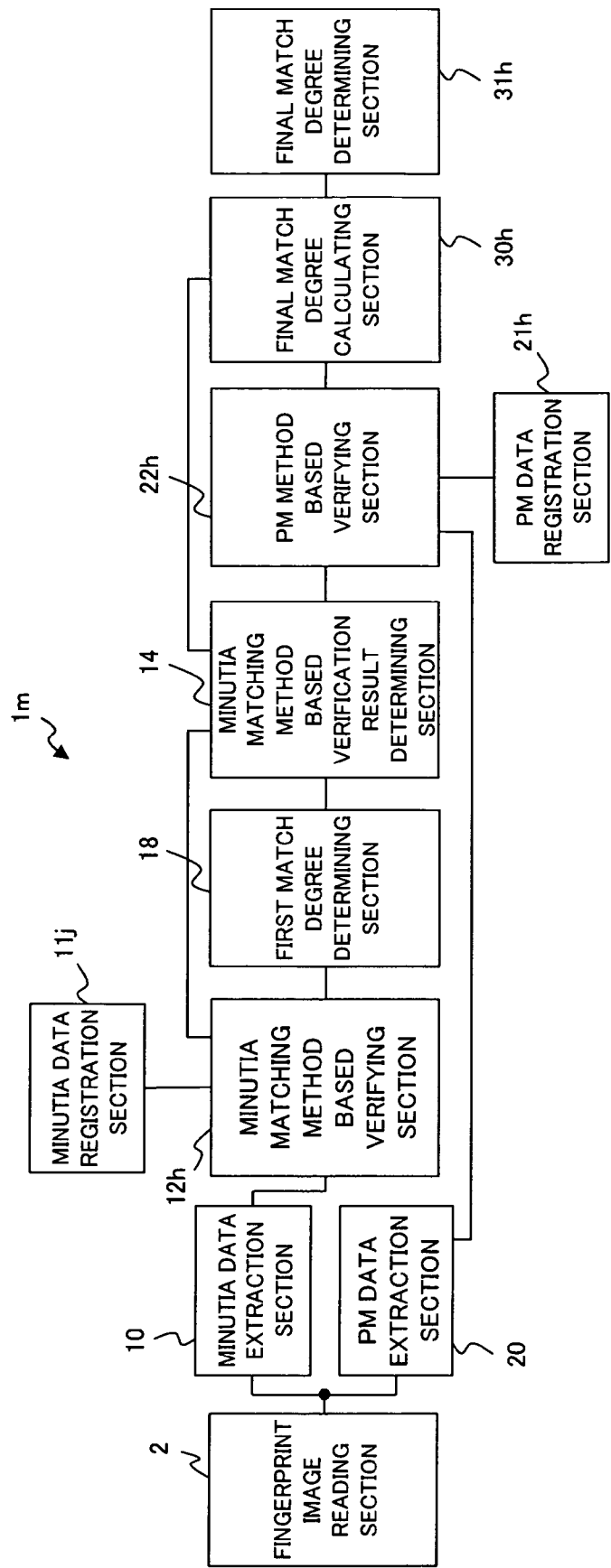
FIG. 25 is a block diagram showing the configuration of a biometric information authentication device according to a ninth embodiment of the present invention.

Next will be described a biometric information authentication device according to the ninth embodiment of the present invention. FIG. 25 is a block diagram showing the configuration of the biometric information authentication device (fingerprint authentication device) 1m according to the ninth embodiment of the present invention. It is noted that the same numerals in FIG. 25 as those mentioned above indicate the same or almost the same components.

As shown in FIG. 25, the biometric information authentication device 1m is arranged similarly as the biometric information authentication device 1h of the seventh embodiment mentioned above with reference to FIG. 17, except that the biometric information authentication device 1m comprises a first match degree determining section 18. Therefore, only components different from those of the above-mentioned biometric information authentication device 1h of the seventh embodiment will be described in detail and the detailed description of components common to those of the biometric information authentication device 1h of the seventh embodiment will be omitted here.

The first match degree determining section 18 compares the maximum first match degree "M" among a plurality (N pieces here) of first match degree "M" obtained by the minutia matching method based verifying section 12h with a seventh threshold value to determine whether or not there is a particular relationship between the authentication object and the first registration data corresponding to the maximum first match degree "M" (i.e., he/she is the very person).

The first match degree determining section 18 is also adapted to be operated prior to the determination by the minutia matching method based verification result determining section 14 (determination using the first and second threshold values), and in the case where the maximum first match degree "M" is equal to or smaller than the seventh threshold value and therefore it is determined that there is no particular relationship between the authentication object and the first registration data corresponding to the maximum first match degree "M" (i.e., he/she is not the very person), the first match degree determining section 18 allows the minutia matching method based verification result determining section 14 to make an determination, and allows the final match degree calculating section 30h and final match degree determining section 31h to operate.

On the contrary, in the case where the maximum first match degree "M" is larger than the seventh threshold value and therefore it is determined that there is a particular relationship between the authentication object and the first registration data corresponding to the maximum first match degree "M" (i.e., he/she is the very person), the first match degree determining section 18 terminates the processing of the biometric information authentication device 1m.

Next, the procedure of a biometric information authentication method (operation of the biometric information authentication device 1m) according to the ninth embodiment of the present invention will be described with reference to the flow chart (steps S10 to S13, S15, S17, S20, S50, S51, S50', S51', S52 to S56, and S72 to S74) shown in FIG. 26. It is noted that the same numerals in FIG. 26 as those mentioned above indicate the same or almost the same components.

Figure 26:
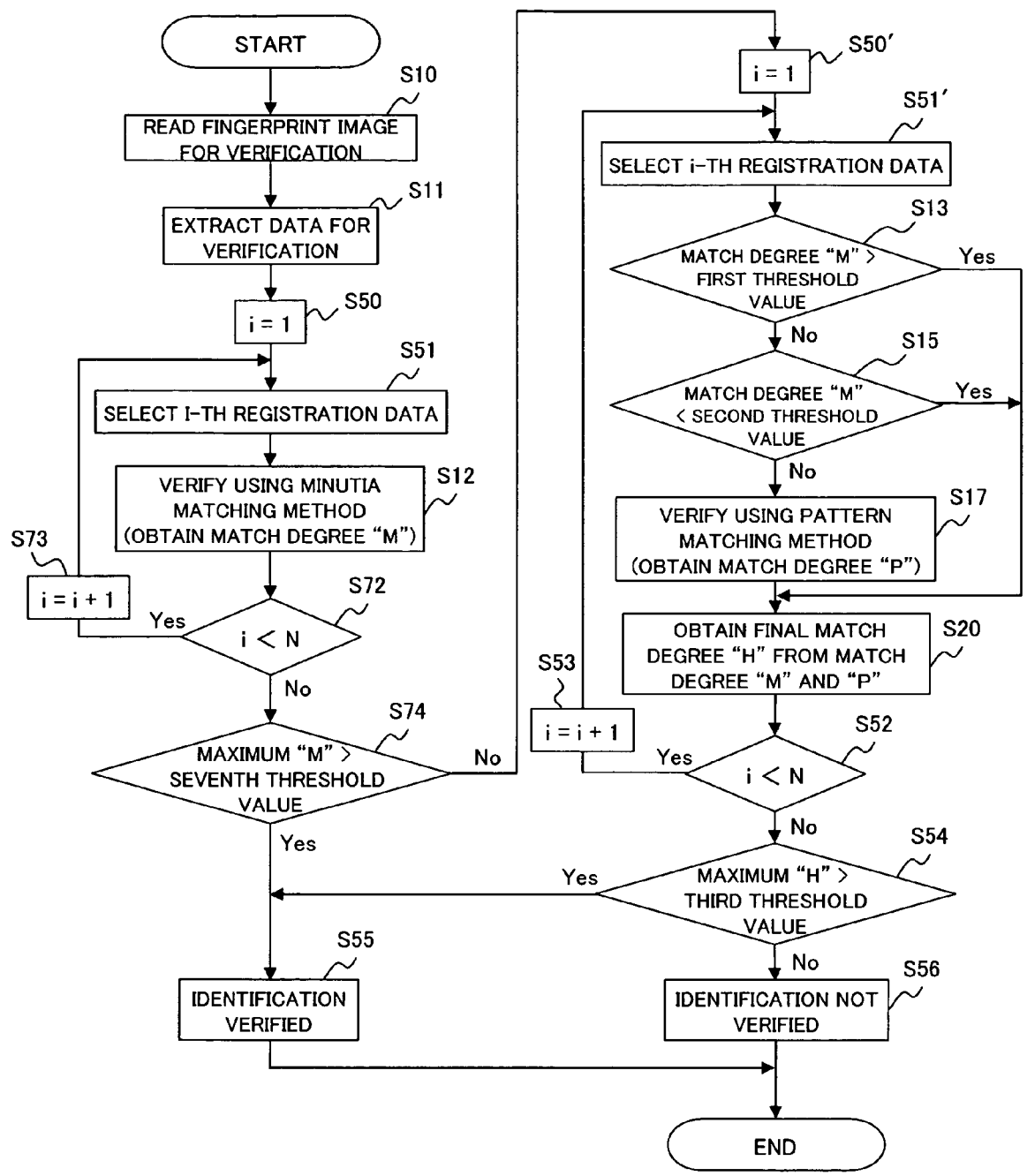
FIG. 26 is a flow chart illustrating the procedure of a biometric information authentication method according to the ninth embodiment of the present invention.

In the biometric information authentication method according to the ninth embodiment of the present invention as shown in FIG. 26, after the steps S10, S11, S50, and S51, the minutia matching method based verifying section 12h verifies the first registration data selected in the foregoing step S51 against the first to-be-verified data to be authenticated to obtain first match degree "M" as a result thereof, as is the case with the biometric information authentication method of the seventh embodiment mentioned above with reference to FIG. 18 (step S12).

Then, the minutia matching method based verifying section 12h determines whether or not the counter "i" is smaller than N (i.e., the counter "i" reaches N; step S72), and until it is determined that the counter "i" is not smaller than N (i.e., the counter "i" becomes equal to N; "No" in step S72), increments the counter "i" by one (step S73) to perform the processing of the foregoing steps S51 and S12.

Then, in the case where it is determined that the counter "i" is not smaller than N ("No" in step S72), the first match degree determining section 18 compares the maximum first match degree "M" among N pieces of first match degree "M" obtained by the minutia matching method based verifying section 12h with the seventh threshold value provided preliminarily (step S74).

Here in the case where the maximum first match degree "M" is larger than the seventh threshold value ("Yes" in step S74), the first match degree determining section 18 determines that there is a particular relationship between the first registration data corresponding to the maximum first match degree "M" and the first to-be-verified data to be authenticated (i.e., he/she is the very person; step S55) and then terminates the processing.

On the contrary, in the case where the maximum first match degree "M" is equal to or smaller than the seventh threshold value ("No" in step S74), the minutia matching method based verification result determining section 14 sets the counter "i" to 1 (step S50') and selects the first registration data registered i-th in the minutia data registration section 11h (step S51'), and then the minutia matching method based verification result determining section 14, PM method based verifying section 22h, final match degree calculating section 30h, and final match degree determining section 31h operates (steps S13, S15, S17, S20, and S52 to S56), as is the case with the seventh embodiment mentioned above with reference to FIG. 18. However in this case, since the minutia matching method based verifying section 12h has already obtained N pieces of first match degree "M" in the foregoing step S12, the minutia matching method based verifying section 12h does not perform the step of obtaining first match degree "M" (step S12).

Thus in accordance with the biometric information authentication device 1m and the biometric information authentication method according to the ninth embodiment of the present invention, the first match degree determining section 18 first determines whether or not there exists first registration data that has a particular relationship with the first to-be-verified data to be authenticated in the minutia data registration section 11h using a minutia matching method, whereby in the case where the first match degree determining section 18 can determine that he/she is the very person, it is possible to omit the processing by the minutia matching method based verification result determining section 14, PM method based verifying section 22h, final match degree calculating section 30h, and final match degree determining section 31h, resulting in a shorter verification time than the above-mentioned seventh embodiment.

Figure 27:
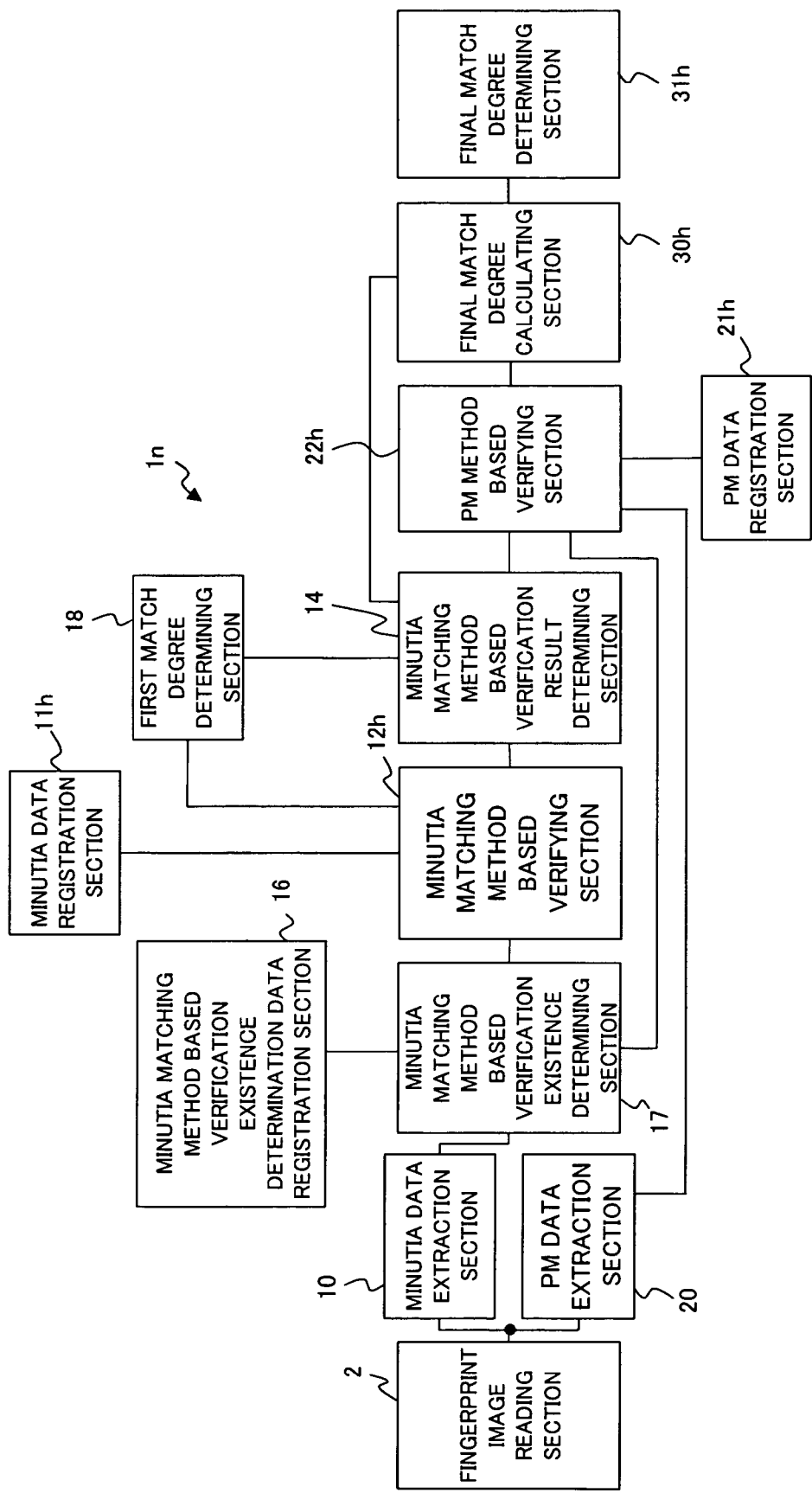
FIG. 27 is a block diagram showing the configuration of a biometric information authentication device according to a variant of the ninth embodiment of the present invention.

It is noted that the biometric information authentication device 1i according to the variant of the seventh embodiment shown in FIG. 19 may be changed to be a biometric information authentication device 1n shown in FIG. 27 as a variant of the ninth embodiment of the present invention in the same way that the biometric information authentication device 1h of the seventh embodiment shown in FIG. 17 is changed in the ninth embodiment of the present invention.

Figure 28:
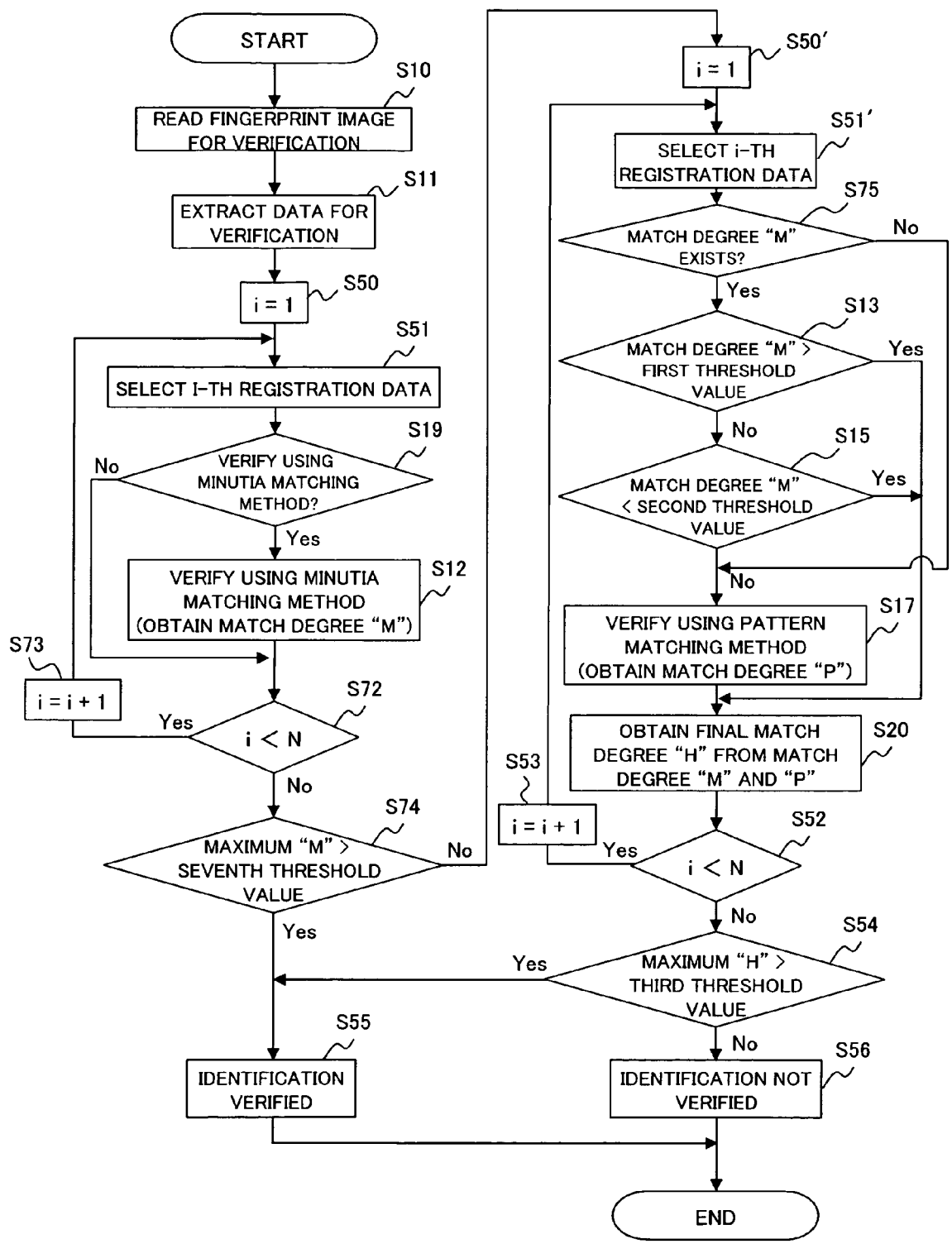
FIG. 28 is a flow chart illustrating the procedure of a biometric information authentication method according to the variant of the ninth embodiment of the present invention.

In the case above, as shown in the flow chart (steps S10 to S13, S15, S17, S19, S20, S50, S51, S50', S51', S52 to S56, and S72 to S75) shown in FIG. 28, a biometric information authentication method according to the present variant includes an additional step S19 relative to the biometric information authentication method of the ninth embodiment shown in FIG. 26, and a further additional step (step S75), in which the minutia matching method based verification result determining section 14 determines whether or not there exists first match degree "M" that corresponds to the first registration data selected in the foregoing step S51', between the foregoing steps S51' and S13. Then, in the case where such first match degree "M" exists ("Yes" in step S75), the foregoing step S13 is performed, while no such first match degree "M" exists ("No" in step S75), the foregoing steps S13 and S15 are skipped.

Thus, applying the change from the seventh embodiment in the ninth embodiment of the present invention to the biometric information authentication device 1i as a variant of the above-mentioned seventh embodiment can further exhibit the same effect as the variant of the seventh embodiment in addition to the above-mentioned effect.

[10] Tenth Embodiment of the Present Invention

Figure 29:
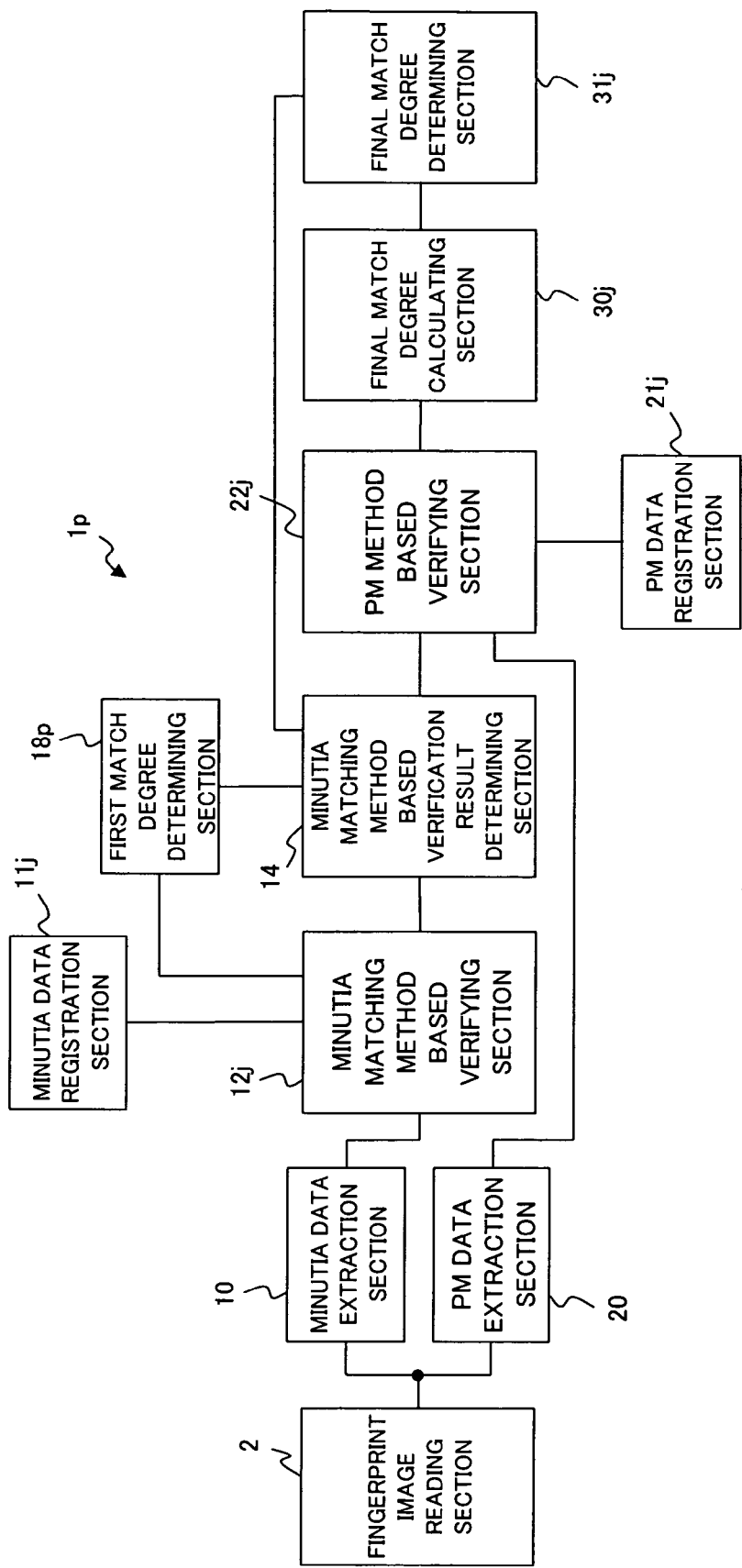
FIG. 29 is a block diagram showing the configuration of a biometric information authentication device according to a tenth embodiment of the present invention.

Next will be described a biometric information authentication device according to the tenth embodiment of the present invention. FIG. 29 is a block diagram showing the configuration of the biometric information authentication device (fingerprint authentication device) 1p according to the tenth embodiment of the present invention. It is noted that the same numerals in FIG. 29 as those mentioned above indicate the same or almost the same components.

As shown in FIG. 29, the biometric information authentication device 1p is arranged similarly as the biometric information authentication device 1j of the eighth embodiment mentioned above with reference to FIG. 21, except that the biometric information authentication device 1p comprises a first match degree determining section 18p. That is, the above-mentioned eighth embodiment is changed to be the biometric information authentication device 1p in the same way that the seventh embodiment is changed in the above-mentioned ninth embodiment. Therefore, only components different from those of the biometric information authentication device 1j of the eighth embodiment and the biometric information authentication device 1m of the ninth embodiment will be described in detail and the detailed description of components common to those will be omitted here.

The first match degree determining section 18p makes a determination for each calculation of first match degree "M" by the minutia matching method based verifying section 12j based on the first match degree "M". That is, the first match degree determining section 18p compares the first match degree "M" with the seventh threshold value to determine whether or not there is a particular relationship between the first registration data corresponding to the first match degree "M" and the first to-be-verified data to be authenticated (i.e., he/she is the very person).

Then, in the case where the first match degree "M" is larger than the seventh threshold value, the first match degree determining section 18p determines that there is a particular relationship between the first registration data corresponding to the first match degree "M" and the first to-be-verified data, and then terminates the processing of the biometric information authentication device 1p.

On the contrary, in the case where all of a plurality (N pieces here) of first match degree "M" obtained by the minutia matching method based verifying section 12j are equal to or smaller than the seventh threshold value, the first match degree determining section 18p determines that there is no first registration data that has a particular relationship with the first to-be-verified data to allow the minutia matching method based verification result determining section 14 to make an determination, and allows the final match degree calculating section 30j and final match degree determining section 31j to operate.

Next, the procedure of a biometric information authentication method (operation of the biometric information authentication device 1p) according to the tenth embodiment of the present invention will be described with reference to the flow chart (steps S10 to S13, S15, S17, S19, S20, S50, S51, S50', S51', S62 to S66, and S76 to S78) shown in FIG. 30. It is noted that the same numerals in FIG. 30 as those mentioned above indicate the same or almost the same components.

Figure 30:
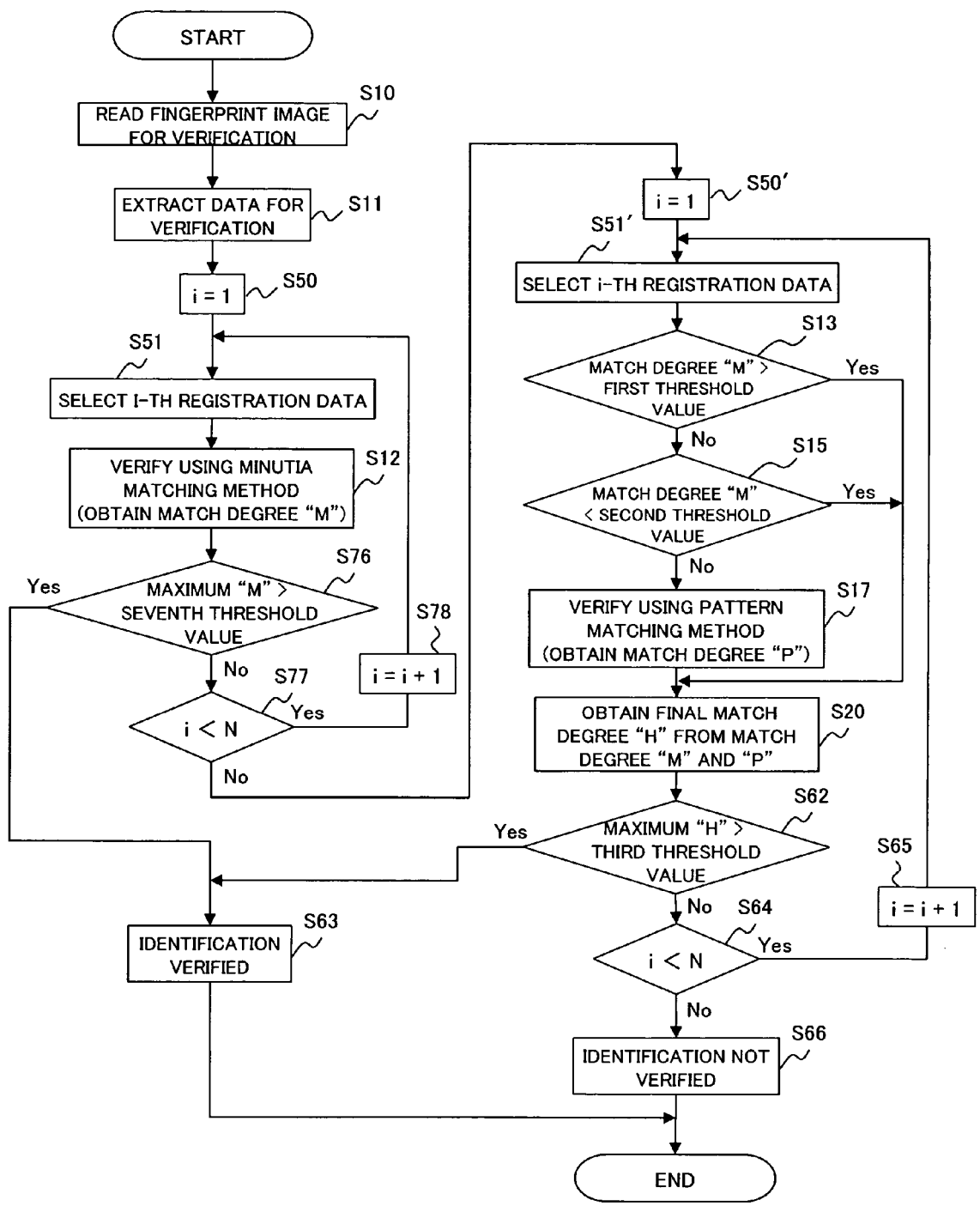
FIG. 30 is a flow chart illustrating the procedure of a biometric information authentication method according to the tenth embodiment of the present invention.

In the biometric information authentication method according to the tenth embodiment of the present invention as shown in FIG. 30, for each calculation of first match degree "M" by the minutia matching method based verifying section 12j (step S12), the first match degree determining section 18p compares the calculated first match degree "M" and the seventh threshold value (step S76), and in the case where the first match degree "M" is larger than the seventh threshold value ("Yes" in step S76), determines that there is a particular relationship between the first registration data corresponding to the first match degree "M" and the first to-be-verified data (i.e., he/she is the very person; step S63) and then terminates the processing.

On the contrary, in the case where the first match degree "M" is equal to or smaller than the seventh threshold value ("No" in step S76), the first match degree determining section 18p determines whether or not the counter "i" is smaller than N (step S77), and in the case where the counter "i" is smaller than N ("Yes" in step S77), increments the counter "i" by one (step S78), and repeats the foregoing steps S51, S12, and S76 until the counter "i" reaches N.

Then, when the counter "i" becomes equal to N ("No" in step S77), the processing is performed (steps S50', S51', S13, S15, S17, S19, S20, and S62 to S66), as is the case with the eighth embodiment mentioned above with reference to FIG. 22. However in this case, the minutia matching method based verifying section 12j does not perform the step of obtaining first match degree "M" (step S12), which has already been performed.

Thus, the biometric information authentication device 1p and the biometric information authentication method according to the tenth embodiment of the present invention can exhibit the same effect as the above-mentioned ninth embodiment.

Figure 31:
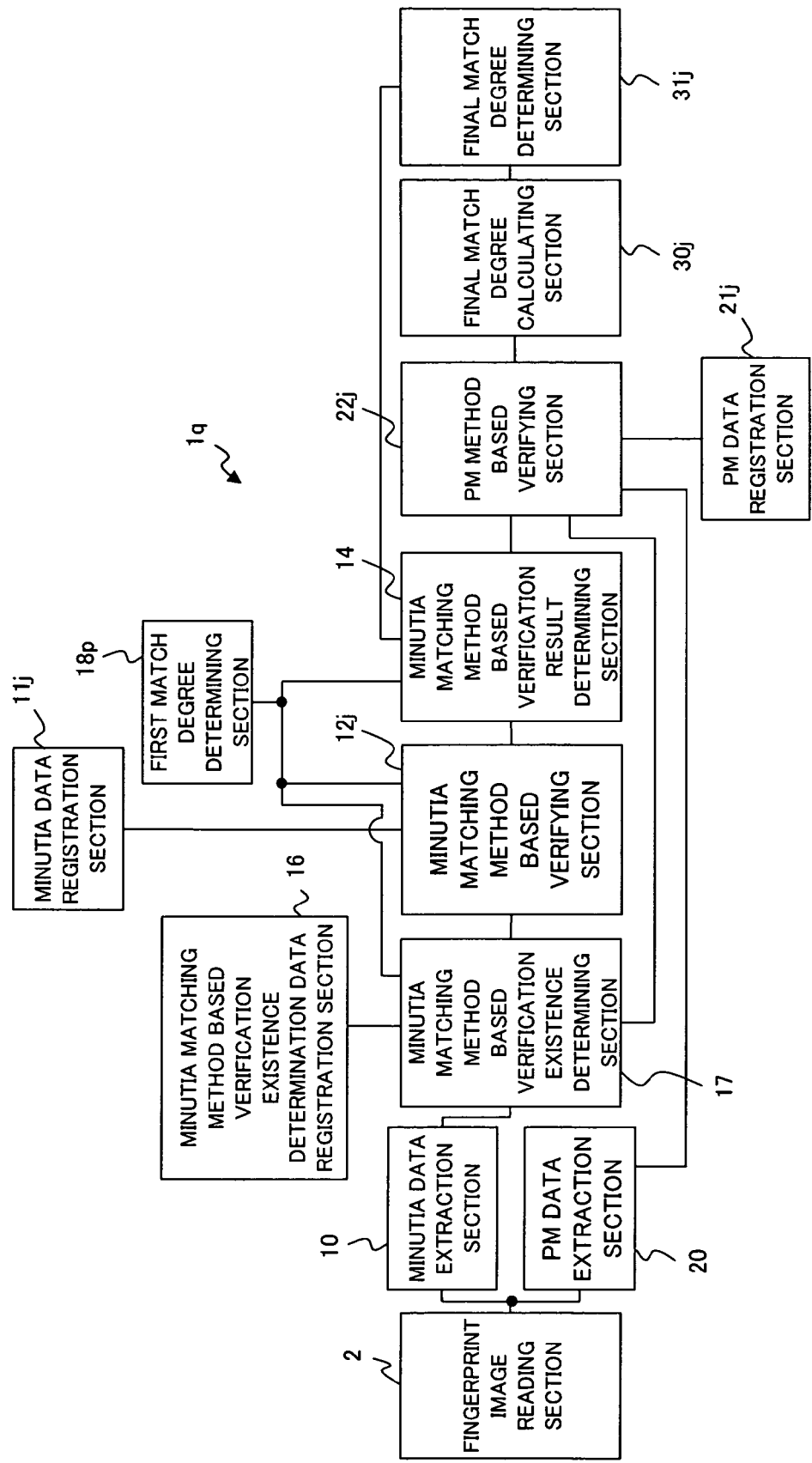
FIG. 31 is a block diagram showing the configuration of a biometric information authentication device according to a first variant of the tenth embodiment of the present invention.

It is noted that the biometric information authentication device 1k according to the variant of the eighth embodiment shown in FIG. 23 may be changed to be a biometric information authentication device 1q shown in FIG. 31 as a variant of the tenth embodiment of the present invention in the same way that the biometric information authentication device 1j of the eighth embodiment shown in FIG. 21 is changed in the tenth embodiment of the present invention.

Figure 32:
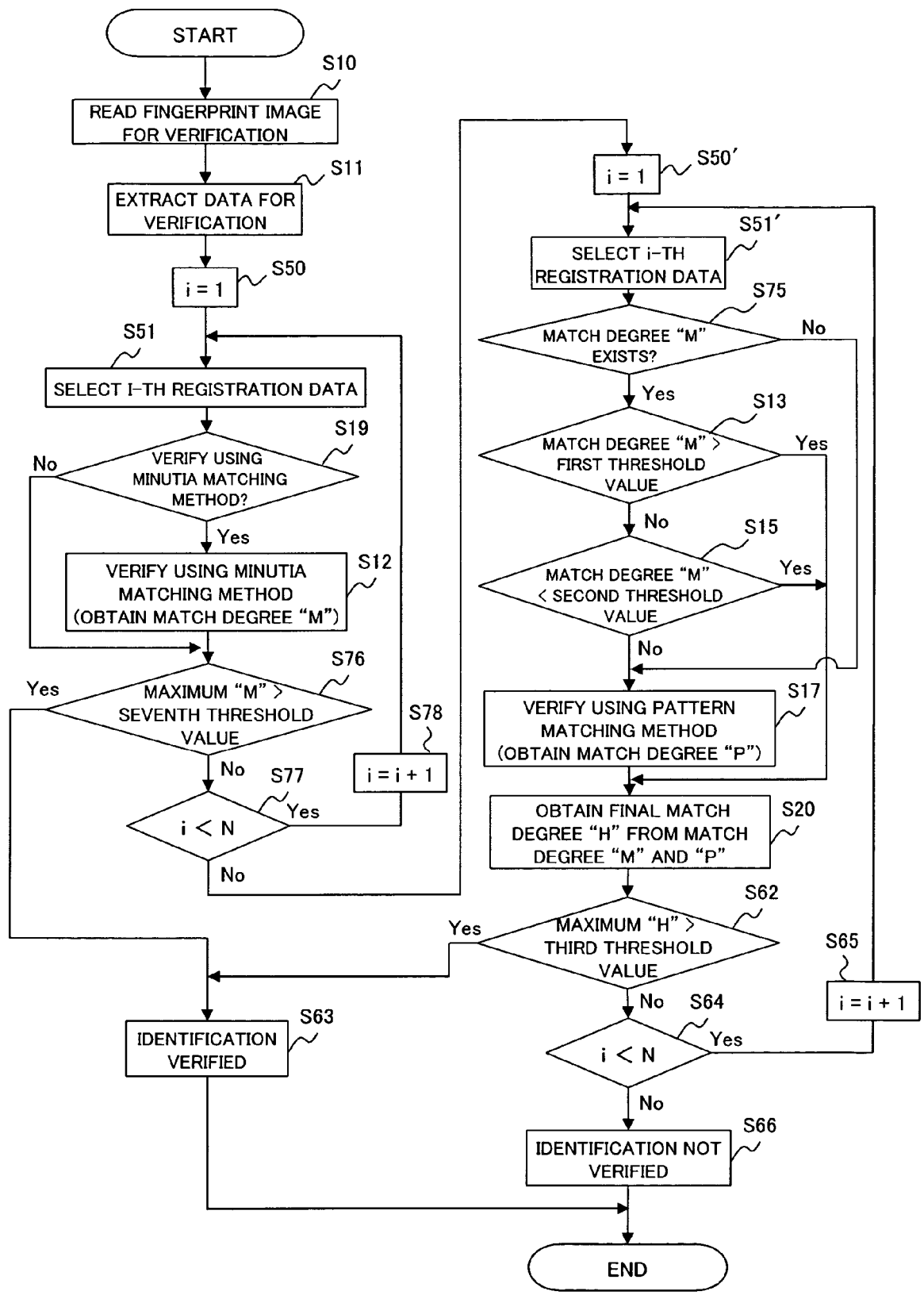
FIG. 32 is a flow chart illustrating the procedure of a biometric information authentication method according to the first variant of the tenth embodiment of the present invention.

In the case above, as shown in the flow chart (steps S10 to S13, S15, S17, S19, S20, S50, S51, S50', S51', S62 to S66, and S75 to S78) shown in FIG. 32, a biometric information authentication method according to the present variant includes additional steps of S19 and S75 relative to the biometric information authentication method of the tenth embodiment shown in FIG. 30.

Thus, applying the change from the eighth embodiment in the tenth embodiment of the present invention to the biometric information authentication device 1k as a variant of the above-mentioned eighth embodiment can further exhibit the same effect as the variant of the eighth embodiment in addition to the above-mentioned effect.

Figure 33:
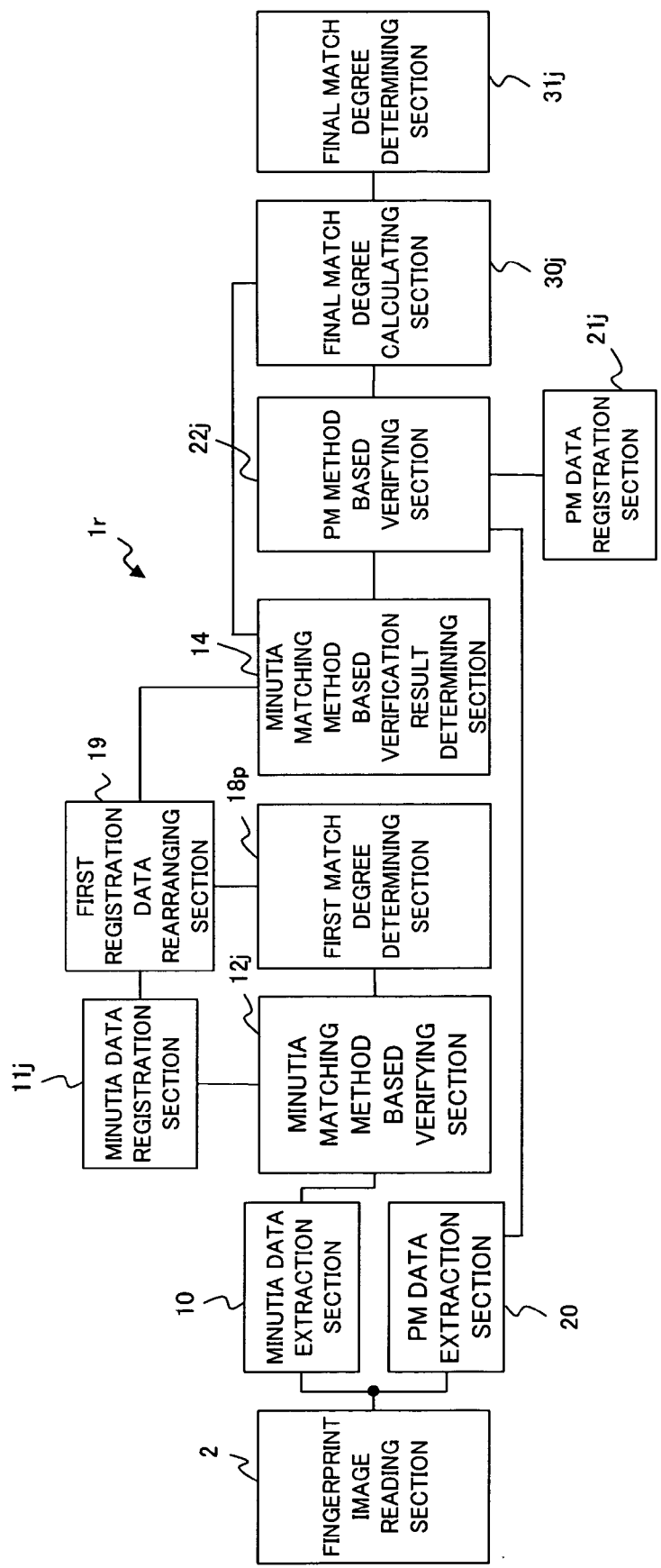
FIG. 33 is a block diagram showing the configuration of a biometric information authentication device according to a second variant of the tenth embodiment of the present invention.

Further, the biometric information authentication device 1p shown in FIG. 29 may be changed to include additionally a first registration data rearranging section 19 for rearranging a plurality of first registration data in descending order of first match degree "M" corresponding to each of the first registration data as a biometric information authentication device 1r shown in FIG. 33 as a second variant of the tenth embodiment of the present invention.

That is, after the determination by the first match degree determining section 18p and before the determination by the minutia matching method based verification result determining section 14, the first registration data rearranging section 19 rearranges a plurality of first registration data held in the minutia data registration section 11j in descending order of match degree based on the magnitude of a plurality of first match degree "M" obtained as a result of verification by the minutia matching method based verifying section 12j.

Figure 34:
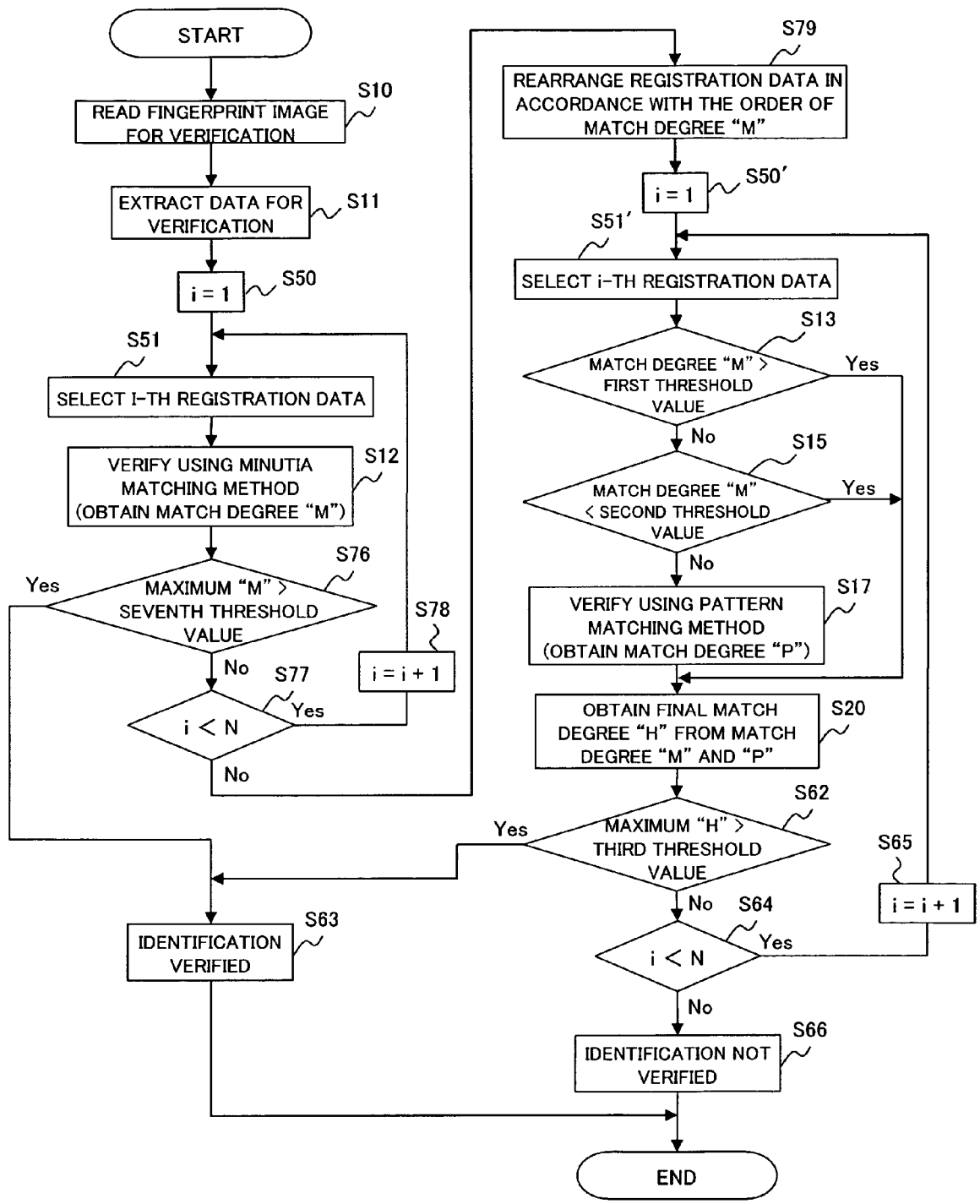
FIG. 34 is a flow chart illustrating the procedure of a biometric information authentication method according to the second variant of the tenth embodiment of the present invention.

In the case above, as shown in the flow chart (steps S10 to S13, S15, S17, S20, S50, S51, S50', S51', S62 to S66, and S76 to S79) shown in FIG. 34, the biometric information authentication method according to the present variant includes an additional step (step S79), in which the first registration data rearranging section 19 rearranges a plurality of first registration data held in the minutia data registration section 11j in descending order of first match degree "M" based on the first match degree "M" obtained as a result of verification by the minutia matching method based verifying section 12j in the foregoing step S12, between the foregoing steps S77 and S51' relative to the biometric information authentication method of the tenth embodiment shown in FIG. 30.

Then, the minutia matching method based verification result determining section 14 makes a determination in accordance with the order rearranged by the first registration data rearranging section 19.

Thus in accordance with the biometric information authentication device 1r and the biometric information authentication method according to the second variant of the tenth embodiment of the present invention, the first registration data rearranging section 19 rearranges a plurality of first registration data held in the minutia data registration section 11j based on the magnitude of first match degree "M", and then the minutia matching method based verification result determining section 14 makes a determination in accordance with the order rearranged. Therefore, since a plurality of first registration data are rearranged in descending order of their respective first match degree "M", the final match degree determining section 31j starts a determination for final match degree "H" from the first registration data corresponding to the maximum first match degree "M" among a plurality of first registration data (i.e., from the registration data that is considered to give the maximum final match degree "H"), whereby the final match degree determining section 31j can determine early that he/she is the very person, resulting in a shorter verification time.

[11] Eleventh Embodiment of the Present Invention

Figure 35:
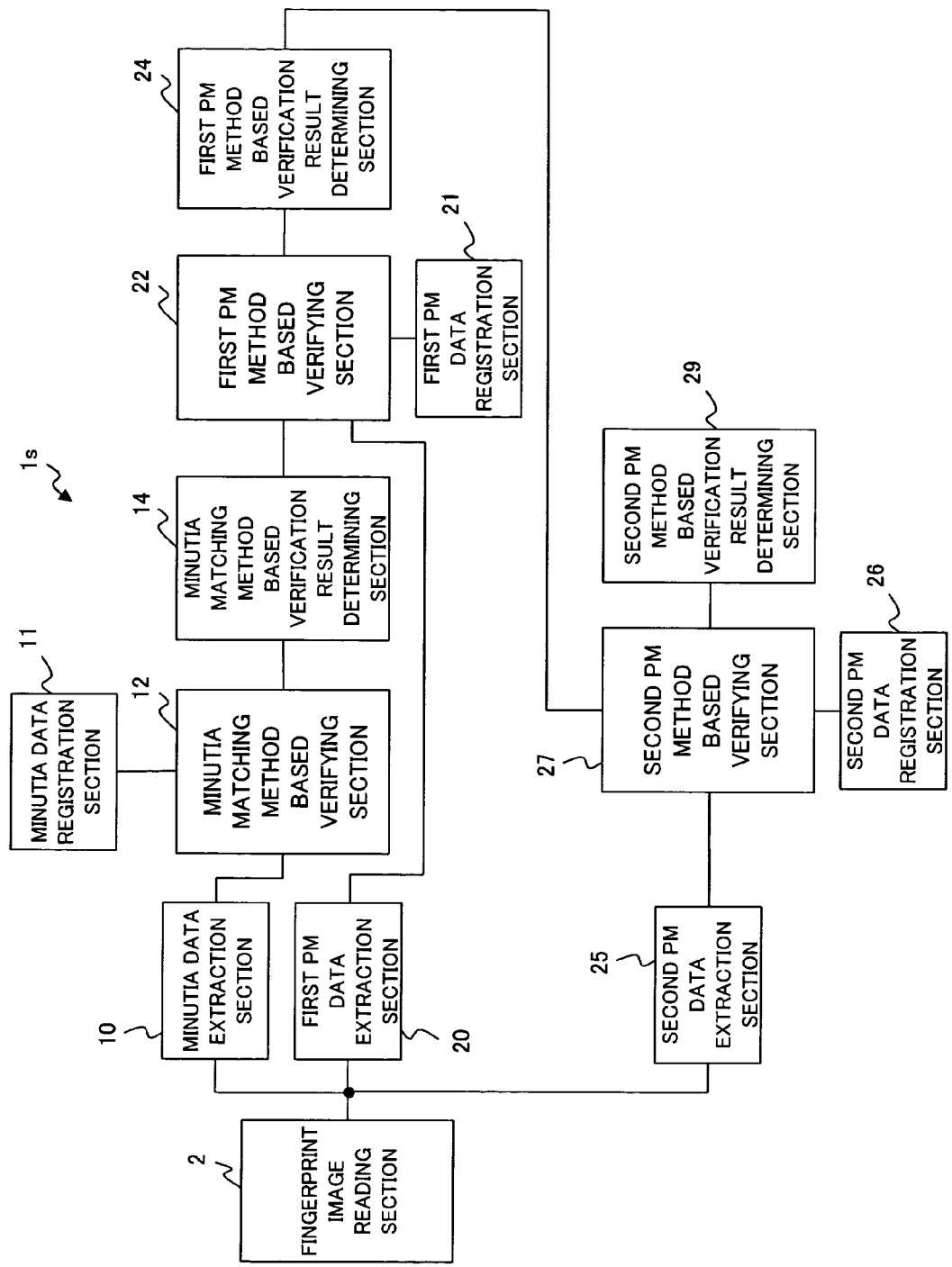
FIG. 35 is a block diagram showing the configuration of a biometric information authentication device according to an eleventh embodiment of the present invention.

Next will be described a biometric information authentication device according to the eleventh embodiment of the present invention. FIG. 35 is a block diagram showing the configuration of the biometric information authentication device (fingerprint authentication device) is according to the eleventh embodiment of the present invention. It is noted that the same numerals in FIG. 35 as those mentioned above indicate the same or almost the same components.

As shown in FIG. 35, the biometric information authentication device 1s is arranged similarly as the biometric information authentication device 1 of the first embodiment mentioned above with reference to FIG. 1, except that the device 1s comprises a second PM data extraction section (third extraction section) 25, a second PM data registration section (third registration section) 26, a second PM method based verifying section (third verifying section) 27, and a second PM method based verification result determining section 29. However, the PM data extraction section 20, PM data registration section 21, PM method based verifying section 22, and PM method based verification result determining section 24 in the above-mentioned biometric information authentication device 1 of the first embodiment are replaced, respectively, with a first PM data extraction section 20, first PM data registration section 21, first PM method based verifying section 22, and first PM method based verification result determining section 24 in the biometric information authentication device 1s, each of which has the same function as the corresponding component thereof.

That is, the biometric information authentication device 1s is arranged to make a determination using a first pattern matching method by the first PM data extraction section 20, first PM data registration section 21, first PM method based verifying section 22, and first PM method based verification result determining section 24, while another determination using a second pattern matching method different from the first pattern matching method by the second PM data extraction section 25, second PM data registration section 26, second PM method based verifying section 27, and second PM method based verification result determining section 29.

Also, the minutia matching method based verification result determining section (first determining section) 14 in the biometric information authentication device 1s is adapted to determine whether or not there is a particular relationship between the first to-be-verified data to be authenticated and the first registration data registered preliminarily (i.e., he/she has the same fingerprint (as the very person)) based on the first match degree "M" obtained as a result of verification by the minutia matching method based verifying section 12, the minutia matching method based verification result determining section 14 comprising an eighth threshold value to be used for the determination that there is a particular relationship and a ninth threshold value to be used for the determination that there is no particular relationship.

The minutia matching method based verification result determining section 14 compares the first match degree "M" and the eighth threshold value to determine that there is a good enough particular relationship between the first to-be-verified data to be authenticated and the first registration data (i.e., he/she is as likely as the very person) in the case where the first match degree "M" is larger than the eighth threshold value, while compares the first match degree "M" and the ninth threshold value to determine that there is no particular relationship between the first to-be-verified data and the first registration data (i.e., he/she is as likely as a different person) in the case where the first match degree "M" is smaller than the ninth threshold value, and further in a different case than above where the first match degree "M" is equal to or smaller than the eighth threshold value and equal to or larger than the ninth threshold value, allows the first PM method based verifying section 22 to perform verification.

Also, the first PM method based verification result determining section 24 is adapted to determine whether or not there is a particular relationship between the second to-be-verified data to be authenticated and the second registration data registered preliminarily (i.e., he/she has the same fingerprint (as the very person)) based on the second match degree "P" obtained as a result of verification by the first PM method based verifying section 22, the first PM method based verification result determining section 24 comprising a tenth threshold value to be used for the determination that there is a particular relationship and an eleventh threshold value to be used for the determination that there is no particular relationship.

The first PM method based verification result determining section 24 compares the second match degree "P" and the tenth threshold value to determine that there is a good enough particular relationship between the second to-be-verified data to be authenticated and the second registration data (i.e., he/she is as likely as the very person) in the case where the second match degree "P" is larger than the tenth threshold value, while compares the second match degree "P" and the eleventh threshold value to determine that there is no particular relationship between the second to-be-verified data and the second registration data (i.e., he/she is as likely as a different person) in the case where the second match degree "P" is smaller than the eleventh threshold value, and further in a different case than above where the second match degree "P" is equal to or smaller than the tenth threshold value and equal to or larger than the eleventh threshold value, allows the second PM method based verifying section 27 to perform verification.

The second PM method based verifying section 27 is adapted to verify, using the second pattern matching method, whether or not there is a particular relationship between the third to-be-verified data extracted by the second PM data extraction section 25 and the third registration data registered preliminarily in the second PM data registration section 26 (i.e., he/she is the very person), and to obtain match degree (third match degree "Q") between the third to-be-verified data and the third registration data as a result thereof.

The second PM method based verification result determining section 29 is adapted to compare the third match degree "Q" obtained as a result of verification by the second PM method based verifying section 27 with a threshold value "B" held preliminarily to determine that there is a particular relationship between the third to-be-verified data and the third registration data, which determines that there is a particular relationship in the case where the third match degree "Q" is larger than the threshold value "B", while that there is no particular relationship in the case where the third match degree "Q" is equal to or smaller than the threshold value "B".

Next, the procedure of a biometric information authentication method (operation of the biometric information authentication device 1s) according to the eleventh embodiment of the present invention will be described with reference to the flow chart (steps S10 to S12, S13', S14, S15', S16, S17, and S80 to S83) shown in FIG. 36. It is noted that the same numerals in FIG. 36 as those mentioned above indicate the same or almost the same components.

Figure 36:
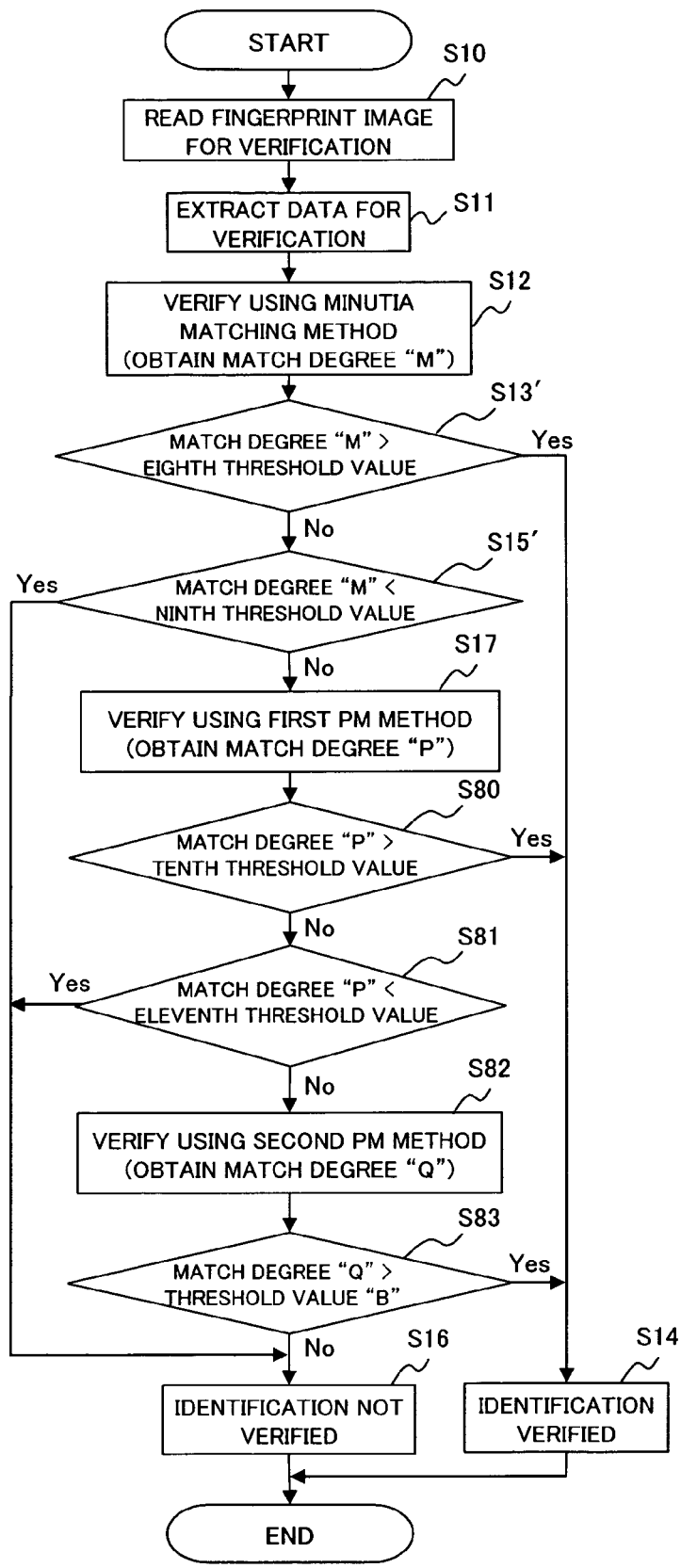
FIG. 36 is a flow chart illustrating the procedure of a biometric information authentication method according to the eleventh embodiment of the present invention.

In the biometric information authentication method according to the eleventh embodiment of the present invention as shown in FIG. 36, unlike the biometric information authentication method of the first embodiment shown in FIG. 2, the minutia matching method based verification result determining section 14 uses not the first and second threshold values but the eighth and ninth threshold values to make an authentication determination (steps S13', S14, S15', and S16).

Then, in the case where the first match degree "M" is equal to or smaller than the eighth threshold value and equal to or larger than the ninth threshold value ("No" in step S13' and then "No" in step S15'), the first PM method based verifying section 22 performs verification (step S17), and then the first PM method based verification result determining section 24 makes an authentication determination based on the second match degree "P" and the tenth and eleventh threshold values (steps S80, S14, S81, and S16).

Next, in the case where the second match degree "P" is equal to or smaller than the tenth threshold value and equal to or larger than the eleventh threshold value ("No" in step S80 and then "No" in step S81), the second PM method based verifying section 27 performs verification to obtain third match degree "Q" as a result thereof (step S82).

Then, the second PM method based verification result determining section 29 makes an authentication determination based on the third match degree "Q" and the threshold value "B" (steps S83, S14, and S16).

Thus, the biometric information authentication device 1s and the biometric information authentication method according to the eleventh embodiment of the present invention make an authentication determination (personal authentication) using the minutia matching method as well as the first and second pattern matching method, which allows verification time to be reduced as is the case with the above-mentioned first embodiment, and allows for a higher-accuracy personal authentication (i.e., unsupported rate to be further decreased).

[12] Twelfth Embodiment of the Present Invention

Figure 37:
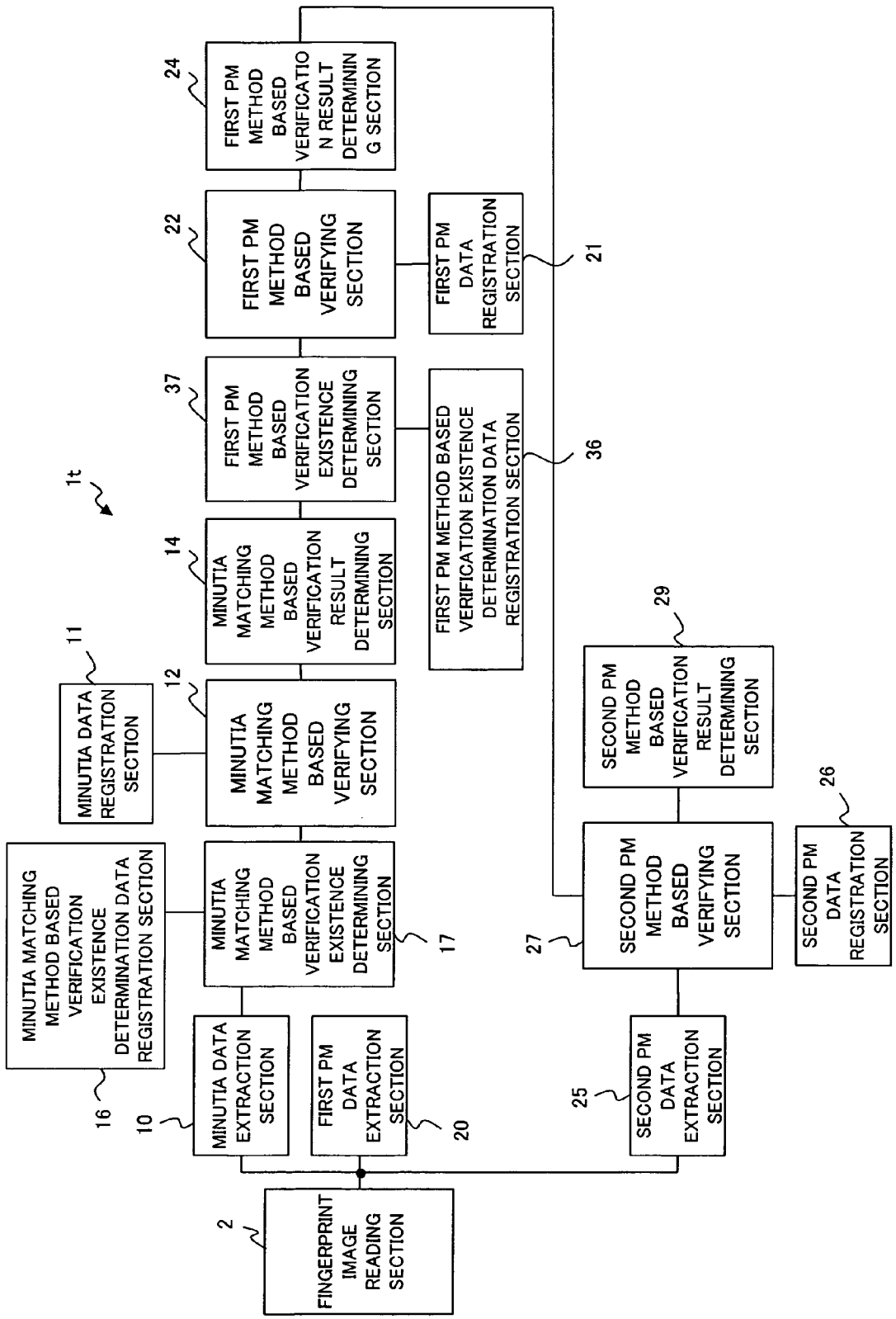
FIG. 37 is a block diagram showing the configuration of a biometric information authentication device according to a twelfth embodiment of the present invention.

Next will be described a biometric information authentication device according to the twelfth embodiment of the present invention. FIG. 37 is a block diagram showing the configuration of the biometric information authentication device (fingerprint authentication device) 1t according to the twelfth embodiment of the present invention. It is noted that the same numerals in FIG. 37 as those mentioned above indicate the same or almost the same components.

As shown in FIG. 37, the biometric information authentication device 1t is arranged similarly as the biometric information authentication device 1s of the eleventh embodiment mentioned above with reference to FIG. 35, except that the device 1t comprises a minutia matching method based verification existence determination data registration section 16 and a minutia matching method based verification existence determining section (first authentication advisability determining section) 17, as well as a first PM method based verification existence determination data registration section 36 and a first PM method based verification existence determining section (second authentication advisability determining section) 37, which have the same function, respectively, as the minutia matching method based verification existence determination data registration section 16 and the minutia matching method based verification existence determining section 17 except that second registration data to be used for the first pattern matching method is used.

That is, in the biometric information authentication device 1*t*, the minutia matching method based verification existence determining section 17 determines whether or not to allow the minutia matching method based verifying section 12 to perform verification, while the first PM method based verification existence determining section 37 determines whether or not to allow the first PM method based verifying section 22 to perform verification.

It is noted that first PM method based verification existence determination data in the first PM method based verification existence determination data registration section 36 means information about the reliability of second registration data (registration data used for the first PM method), which is extracted based, for example, on the quality and/or the estimated value of match degree of second registration data, as is the case with minutia matching method based verification existence determination data.

Also, the first PM method based verification existence determination data registration section 36 may be integrated in the biometric information authentication device 1*t*, attached to the biometric information authentication device 1*t*, or connected through a network etc., in either case being connected in such a manner as to be able to provide first PM method based verification existence determination data to the biometric information authentication device 1*t*.

It is noted that first PM method based verification existence determination data to be registered and held in the first PM method based verification existence determination data registration section 36 may also be extracted and obtained from a registration fingerprint image input through the fingerprint image reading section 2 by a registrant using a first PM method based verification existence determination data extraction section provided in the biometric information authentication device 1*t*, the fingerprint image reading section 2, and the first PM data extraction section 20, or extracted and obtained by a different device than the biometric information authentication device 1*t* to be registered and held in the first PM method based verification existence determination data registration section 36.

Next, the procedure of a biometric information authentication method (operation of the biometric information authentication device 1*t*) according to the twelfth embodiment of the present invention will be described with reference to the flow chart (steps S10 to S12, S13', S14, S15', S16, S17, S19, and S80 to S84) shown in FIG. 38. It is noted that the same numerals in FIG. 38 as those mentioned above indicate the same or almost the same components.

Figure 38:
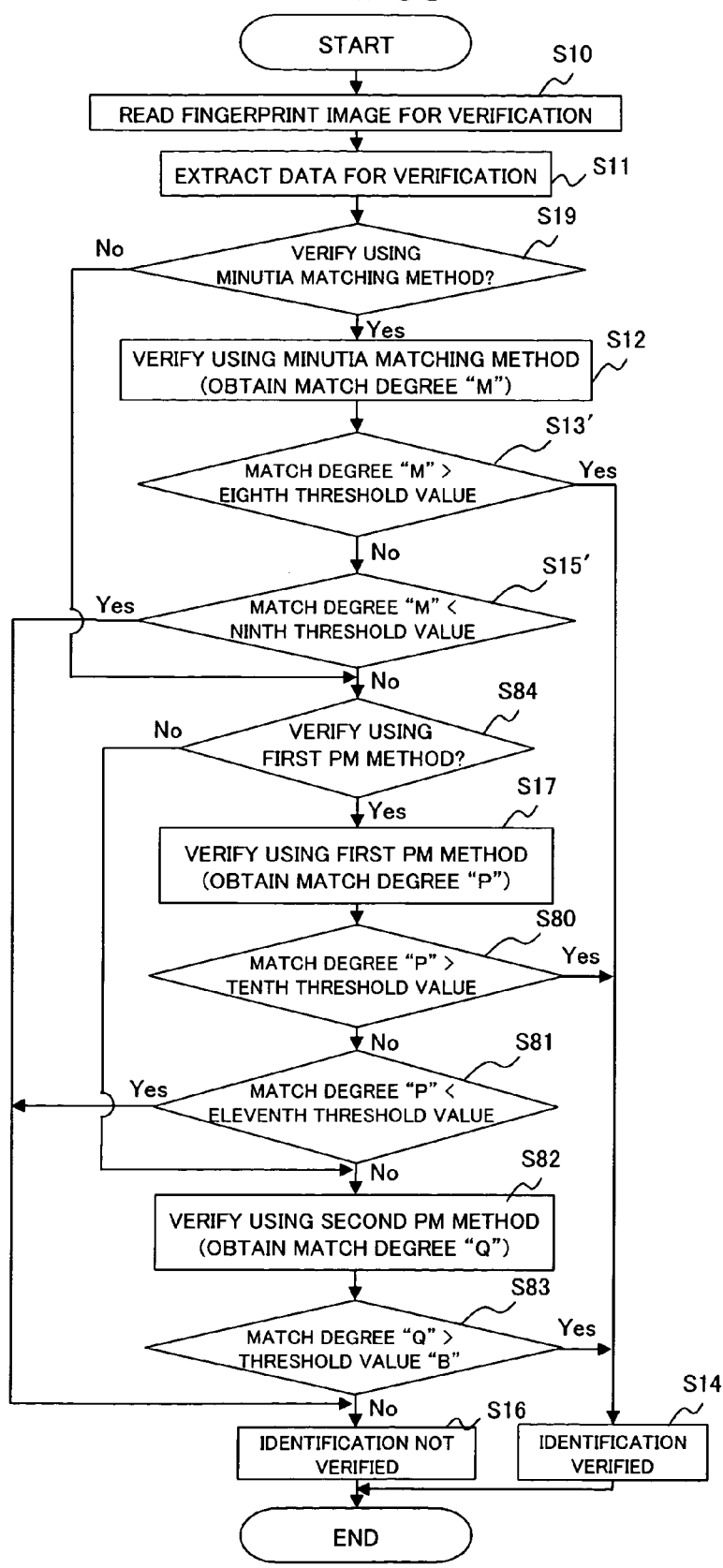
FIG. 38 is a flow chart illustrating the procedure of a biometric information authentication method according to the twelfth embodiment of the present invention.

As shown in FIG. 38, the biometric information authentication method according to the twelfth embodiment of the present invention includes an additional step (step S19) in which the minutia matching method based verification existence determining section 17 determines whether or not to allow the minutia matching method based verifying section 12 to perform verification based on minutia matching method based verification existence determination data and a further additional step (step S84) in which the first PM method based verification existence determining section 37 determines whether or not to allow the first PM method based verifying section 22 to perform verification based on first PM method based verification existence determination data, relative to the above-mentioned biometric information authentication method of the eleventh embodiment shown in FIG. 36.

That is, in the foregoing step S19, in the case where the minutia matching method based verification existence determining section 17 determines not to allow the minutia matching method based verifying section 12 to perform verification ("No" in step S19), the steps S12, S13', and S15' (verification by the minutia matching method based verifying section 12 and determination by the minutia matching method based verification result determining section 14) are skipped.

Also, in the foregoing step S84, in the case where the first PM method based verification existence determining section 37 determines not to allow the first PM method based verifying section 22 to perform verification ("No" in step S84), the steps S17, S80, and S81 (verification by the first PM method based verifying section 22 and determination by the first PM method based verification result determining section 24) are skipped.

Thus in accordance with the biometric information authentication device 1*t* and the biometric information authentication method according to the twelfth embodiment of the present invention, if the first registration data has poor reliability (quality and/or estimated value of match degree), which results in the difficulty of performing verification using the minutia matching method, not the minutia matching method but only the pattern matching method can be used to perform verification. For this reason, it is possible to prevent performing verification using the minutia matching method for fingerprints which are difficult to be verified using the minutia matching method to eliminate wasting verification time, and further to perform verification more reliably for fingerprints which are difficult to be verified using the minutia matching method.

Also, if the second registration data (registration data for the first PM method) has poor reliability (quality and/or estimated value of match degree), which results in the difficulty of performing verification using the first PM method, not the first PM method but the second PM method can be used to perform verification. For this reason, it is possible to prevent performing verification using the first PM method for fingerprints which are difficult to be verified using the first PM method to eliminate wasting verification time, which allows to perform verification more reliably.

[13] Variants of the Present Invention

It is noted that the present invention is not restricted to the above-mentioned embodiments, and that variations and combinations may be made therein without departing from the scope thereof.

[13-1]

For example, although the above-mentioned embodiments are arranged in such a manner that the minutia matching method based verification result determining section 14 compares the first match degree "M" with the first and second threshold values to perform unfailing verification and determination (personal authentication) using a pattern matching method for to-be-verified data which is difficult to be verified and determined (personal authentication) using a minutia matching method, the present invention is not restricted thereto, and the minutia matching method based verification result determining section 14 may determine whether or not it is necessary to perform verification and determination using a pattern matching method based on only the first threshold value or the second threshold value.

Figure 39:
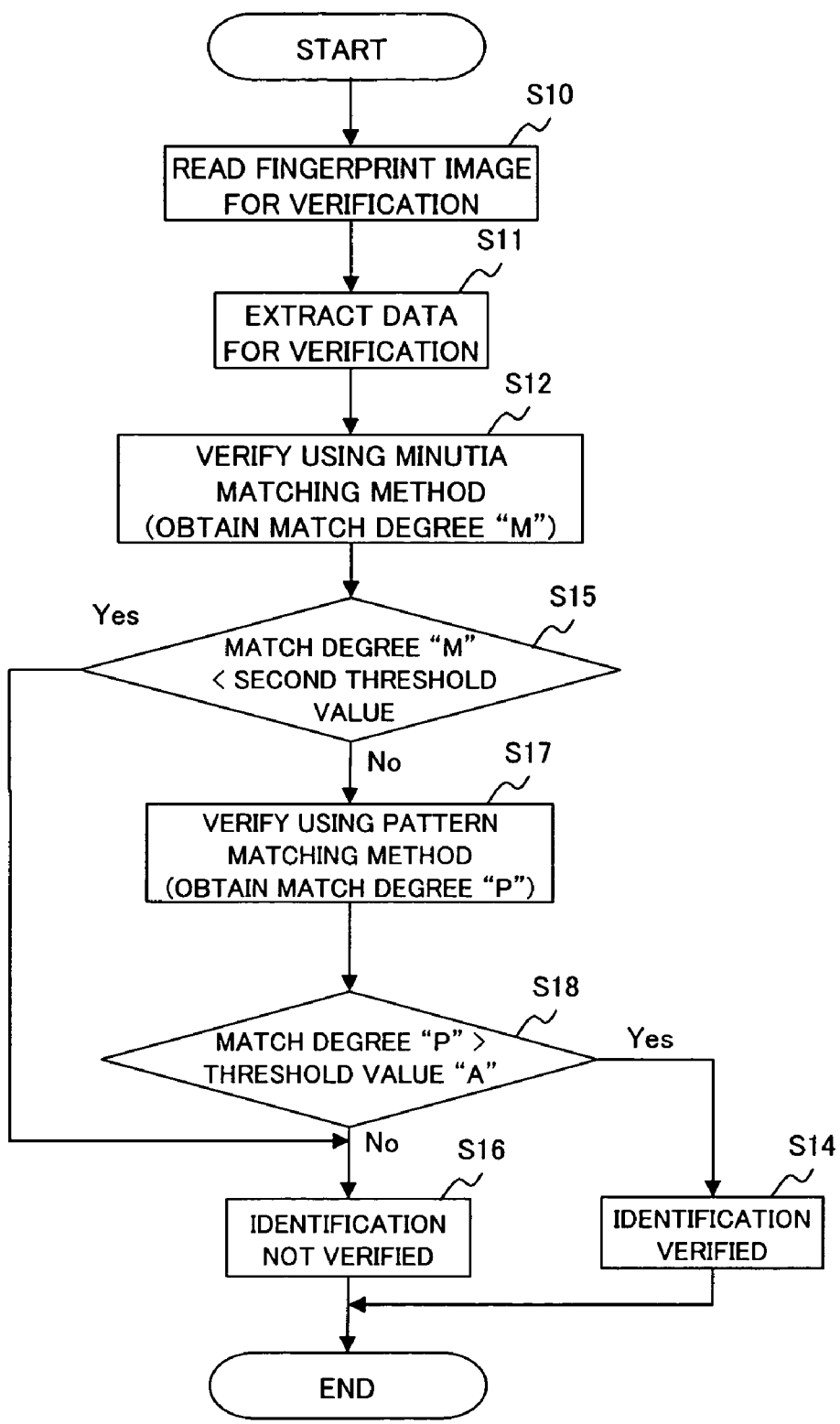
FIG. 39 is a flow chart illustrating the procedure of a biometric information authentication method according to a variant of the present invention.

For example, in the biometric information authentication device 1 according to the first embodiment mentioned above with reference to FIG. 1, the minutia matching method based verification result determining section 14 may be arranged in such a manner as to make a determination based on only the second threshold value to achieve a biometric information authentication method in accordance with the procedure shown in the flow chart (steps S10 to S12 and S14 to S18) of FIG. 39.

That is, the minutia matching method based verification result determining section 14 compares the first match degree "M" obtained as a result of verification by the minutia matching method based verifying section 12 with the second threshold value provided preliminarily (the maximum value of the first match degree "M" where it is determined that there is no particular relationship between the first to-be-verified data and the first registration data, here), and in the case where the first match degree "M" is smaller than the second threshold value ("Yes" in step S15), that is, it can be determined clearly that he/she is not the very person by an authentication determination using the minutia matching method, the verification processing by the PM method based verifying section 22 (step S17) and the determination processing (step S18) by the PM method based verification result determining section 24 may be skipped.

Thus, with the arrangement that verification using a pattern matching method is prevented only if it can be determined clearly that he/she is a different person, while performed if he/she may be the very person, the variant shown in FIG. 39 can exhibit the effect in personal authentication that unsupported ratio can be decreased while verification time to be reduced, as is the case with the above-mentioned embodiments.

Figure 40:
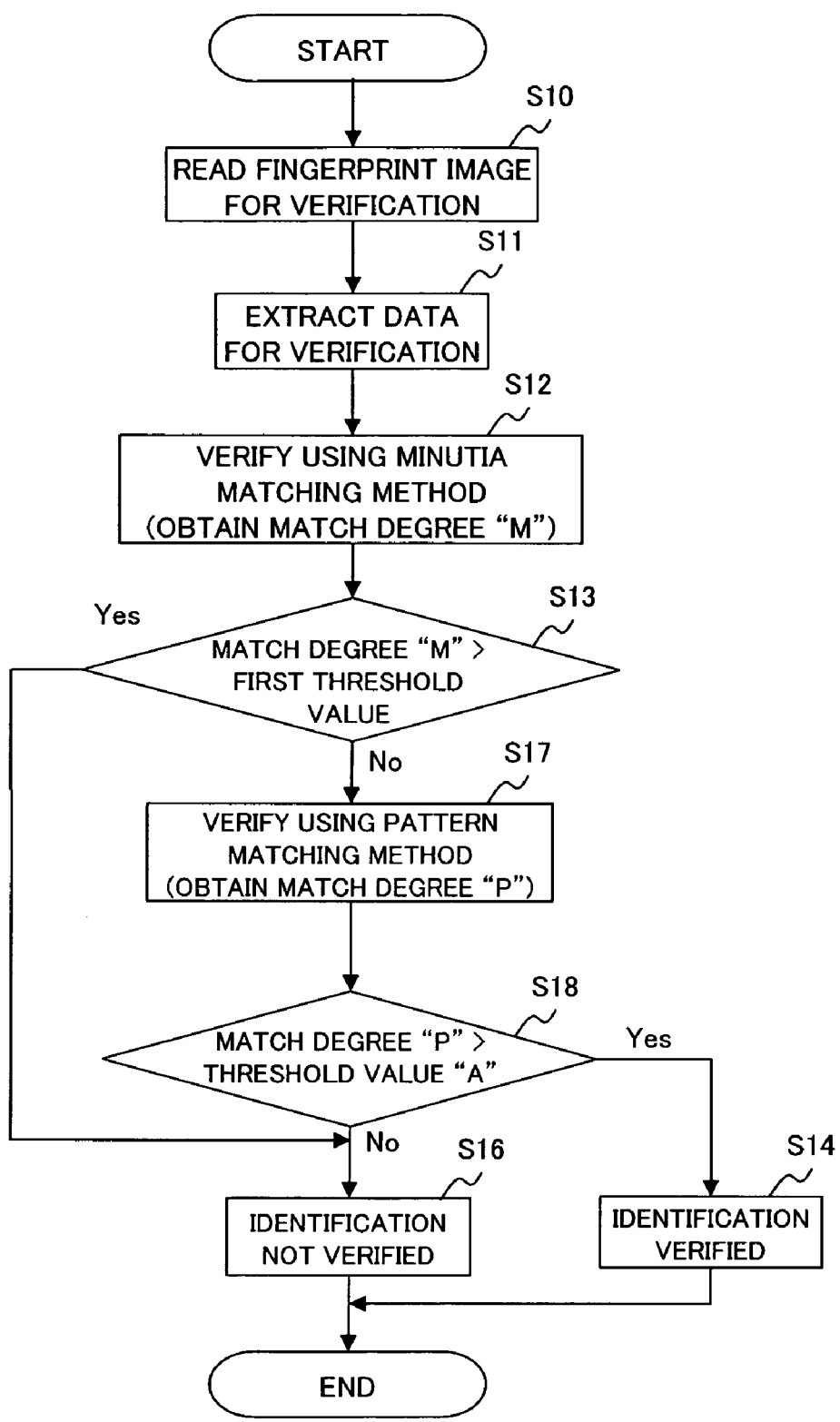
FIG. 40 is a flow chart illustrating the procedure of a biometric information authentication method according to another variant of the present invention.

Further, for example, in the biometric information authentication device 1 according to the first embodiment mentioned above with reference to FIG. 1, the minutia matching method based verification result determining section 14 may be arranged in such a manner as to make a determination based on only the first threshold value to achieve a biometric information authentication method in accordance with the procedure shown in the flow chart (steps S10 to S14 and S16 to S18) of FIG. 40.

That is, the minutia matching method based verification result determining section 14 compares the first match degree "M" obtained as a result of verification by the minutia matching method based verifying section 12 with the first threshold value provided preliminarily (the minimum value of the first match degree "M" where it is determined that there is a particular relationship between the first to-be-verified data and the first registration data, here), and in the case where the first match degree "M" is larger than the first threshold value ("Yes" in step S13), that is, it can be determined clearly that he/she is the very person by an authentication determination using the minutia matching method, the verification processing (step S17) by the PM method based verifying section 22 and the determination processing (step S18) by the PM method based verification result determining section 24 may be skipped.

Thus, with the arrangement that verification using a pattern matching method is prevented only if it can be determined clearly that he/she is a different person, while performed if he/she may be the very person, the variant shown in FIG. 40 can exhibit the effect in personal authentication that unsupported ratio can be decreased while verification time to be reduced, as is the case with the above-mentioned embodiments.

It is noted that the methods above, in which the minutia matching method based verification result determining section 14 determines whether or not to make an authentication determination using the pattern matching method based on only the first or second threshold value, can be applied not only to the first embodiment but also to all of the above-mentioned first to twelfth embodiments, in either case allowing the same or almost the same effect as each embodiment to be exhibited.

[13-2]

In addition, although the above-mentioned seventh to eleventh embodiments are arrange in such a manner that the final match degree determining section 31h or the final match degree determining section 31j compares the final match degree "H" and the third threshold value to make a final authentication determination, the present invention is not restricted thereto, and instead of the final match degree determining section 31h or the final match degree determining section 31j, the final match degree determining section 31d of the fifth embodiment that uses the fourth or fifth threshold value according to the original match degree of the calculated final match degree "H" or the final match degree determining section 31f of the sixth embodiment that uses the fourth, fifth or sixth threshold value according to the original match degree of the calculated final match degree "H" may be applied in the seventh to eleventh embodiments.

[13-3]

Further, although in the above-mentioned embodiments is cited a fingerprint authentication device that uses a fingerprint as biometric information, the biometric information authentication device and the biometric information authentication method of the present invention are not restricted thereto, and may also be applied to biometric information such as palm print, palm shape, blood vessel pattern (digital vein, palm-vein, etc.), iris, and/or face image.

[13-4]

In the above embodiments, each of the first through eleventh threshold values are regarded as a minimum value for judgment that registration data has a particular relationship with to-be-verified data or a maximum value for judgment that the registration data has no particular relationship with the to-be-verified data. The present invention however should by no means be limited to this. Alternatively, each threshold value may be, conversely to the foregoing embodiments, regarded as a minimum value for judgment that registration data has no particular relationship with to-be-verified data or a maximum value for judgment that the registration data has a particular relationship with the to-be-verified data.

For example, in the above first embodiment, the minutia matching method based verification result determining section 14 may determine that there is no particular relationship between the first authentication object and the first registration data if the first match degree M is larger than the first threshold value; and may determine that there is particular relationship between the object and the data if the first match degree M is smaller than the second threshold value.

[14] Others

Also, a computer (including CPU, information processor, and various terminals) runs a predetermined application program (biometric information authentication program) to achieve functions as the above-mentioned minutia data extraction section (first extraction section) 10, minutia matching method based verifying section (first verifying section) 12, 12h, 12j, minutia matching method based verification result determining section (determining section) 14, 14b, minutia matching method based verification existence determining section (first authentication advisability determining section) 17, first match degree determining section 18, 18p, first registration data rearranging section 19, PM data extraction section (second extraction section) 20, PM method based verifying section (second verifying section) 22, 22h, 22j, PM method based verification result determining section (second determining section) 24, second PM data extraction section (third extraction section) 25, second PM method based verifying section (third verifying section) 27, second PM method based verification result determining section (third determining section) 29, final match degree calculating section 30, 30*d*, 30*f*, 30*h*, 30*j*, final match degree determining section 31, 31*d*, 31*f*, 31*h*, 31*j*, and first PM method based verification existence determining section (second authentication advisability determining section) 37.

The program is provided with being recorded on a computer-readable recording medium such as a flexible disk, CD (CD-ROM, CD-R, CD-RW, etc.), or DVD (DVD-ROM, DVD-RAM, DVD-R, DVD-RW, DVD+R, DVD+RW, etc.). In this case, the biometric information authentication program is read out of the recording medium, and then transferred to and stored in an internal or external memory device to be used in the computer. The biometric information authentication program may also be recorded on a memory device (recording medium) such as a magnetic disk, optical disk, or magneto optical disk to be provided to the computer through a communication line.

Here, computer is a concept including hardware and OS (operating system), which means hardware that operates under the control of OS. Also, if no OS is required and an application program operates hardware by itself, the hardware itself corresponds to a computer. Hardware comprises at least a microprocessor such as a CPU, and means for reading a computer program recorded on a recording medium. The above-described application program as a biometric information authentication program includes program code for achieving functions as the minutia data extraction section (first extraction section) 10, minutia matching method based verifying section (first verifying section) 12, 12*h*, 12*j*, minutia matching method based verification result determining section (determining section) 14, 14*b*, minutia matching method based verification existence determining section (first authentication advisability determining section) 17, first match degree determining section 18, 18*p*, first registration data rearranging section 19, PM data extraction section (second extraction section) 20, PM method based verifying section (second verifying section) 22, 22*h*, 22*j*, PM method based verification result determining section (second determining section) 24, second PM data extraction section (third extraction section) 25, second PM method based verifying section (third verifying section) 27, second PM method based verification result determining section (third determining section) 29, final match degree calculating section 30, 30*d*, 30*f*, 30*h*, 30*j*, final match degree determining section 31, 31*d*, 31*f*, 31*h*, 31*j*, and first PM method based verification existence determining section (second authentication advisability determining section) 37 in such a computer. Also, some of the functions may be achieved not by the application program but by the OS.

Further, as a recording medium according to the present embodiment can be utilized various kinds of computer-readable media such as the above-mentioned flexible disk, CD, DVD, magnetic disk, optical disk, and magneto optical disk as well as an IC card, ROM cartridge, magnetic tape, punch card, internal memory device (memory such as a RAM or ROM) of a computer, external memory device, and printed matter with code such as bar-code printed thereon.

What is claimed is:

1. A biometric information authentication device comprising:

an obtaining section for obtaining biometric information of an authentication object;

a first extraction section for extracting first to-be-verified data to be used in a minutia matching method from said biometric information obtained by said obtaining section;

a second extraction section for extracting second to-be-verified data to be used in a pattern matching method from said biometric information obtained by said obtaining section;

a first verifying section for verifying said first to-be-verified data extracted by said first extraction section against first registration data registered preliminarily using said minutia matching method;

a second verifying section for verifying said second to-be-verified data extracted by said second extraction section against second registration data registered preliminarily using said pattern matching method; and a determining section for comparing match degree (hereinafter referred to as first match degree) between said first to-be-verified data and said first registration data, which is obtained as a result of verification by said first verifying section, with a first threshold value provided preliminarily and a second threshold value also provided preliminarily to allow said second verifying section to perform verification in the case where said first match degree is equal to or smaller than said first threshold value and equal to or larger than said second threshold value.

2. The biometric information authentication device according to claim 1, further comprising a first authentication advisability determining section for determining whether or not to perform verification using said minutia matching method based on information about the reliability of said first registration data, wherein in the case of a determination by said first authentication advisability determining section not to perform verification using said minutia matching method, not said first verifying section but said second verifying section performs verification.

3. The biometric information authentication device according to claim 2, wherein said information about the reliability of said first registration data relates to the quality of said first registration data.

4. The biometric information authentication device according to claim 2, wherein said first registration data is generated based on a plurality of biometric information obtained through a plurality of times of collection from the same living body; and said information about the reliability of said first registration data is generated based on match degree obtained by verifying sets of minutia data extracted, respectively, from said plurality of biometric information against each other.

5. The biometric information authentication device according to claim 1, wherein said determining section determines that there is a particular relationship between said authentication object and said first registration data in the case where said first match degree is larger than said first threshold value, while that there is no said particular relationship between said authentication object and said first registration data in the case where said first match degree is smaller than said second threshold value.

6. The biometric information authentication device according to claim 1, wherein said determining section determines that there is no particular relationship between said authentication object and said first registration data in the case where said first match degree is larger than said first threshold value, while that there is said particular relationship between said authentication object and said first registration data in the case where said first match degree is smaller than said second threshold value.

7. The biometric information authentication device according to claim 1, further comprising:
- a final match degree calculating section for calculating final match degree based on at least one of either said first match degree or match degree (hereinafter referred to as second match degree) between said second to-be-verified data and said second registration data, which is obtained as a result of verification by said second verifying section; and
- a final match degree determining section for determining whether or not there is a particular relationship between said authentication object and said first registration data or said second registration data based on said final match degree calculated by said final match degree calculating section.

8. The biometric information authentication device according to claim 7, wherein said final match degree calculating section employs said first match degree calculated by said first verifying section as said final match degree in the case where no said second match degree is calculated by said second verifying section, while employs said second match degree as said final match degree in the case where said second match degree is calculated by said second verifying section.

9. The biometric information authentication device according to claim 8, wherein said final match degree determining section compares:
- in the case where said final match degree calculated by said final match degree calculating section is said first match degree, said final match degree with a fourth threshold value provided preliminarily to determine that there is said particular relationship between said authentication object and said first registration data in the case where said final match degree is larger than said fourth threshold value, while that there is no said particular relationship between said authentication object and said first registration data in the case where said final match degree is equal to or smaller than said fourth threshold value; while
- in the case where said final match degree calculated by said final match degree calculating section is said second match degree, said final match degree with a fifth threshold value provided preliminarily to determine that there is said particular relationship between said authentication object and said second registration data in the case where said final match degree is larger than said fifth threshold value, while that there is no said particular relationship between said authentication object and said second registration data in the case where said final match degree is equal to or smaller than said fifth threshold value.

10. The biometric information authentication device according to claim 7, wherein said final match degree calculating section employs, in the case where one of either said first match degree or said second match degree is calculated, either one calculated as said final match degree, while calculates, in the case where both said first match degree and said second match degree are calculated, said final match degree based on said first match degree and said second match degree.

11. The biometric information authentication device according to claim 10, wherein said final match degree determining section compares:
- in the case where said final match degree calculated by said final match degree calculating section is said first match degree, said final match degree with a fourth threshold value provided preliminarily to determine that there is said particular relationship between said authentication object and said first registration data in the case where said final match degree is larger than said fourth threshold value, while that there is no said particular relationship between said authentication object and said first registration data in the case where said final match degree is equal to or smaller than said fourth threshold value; while
- in the case where said final match degree calculated by said final match degree calculating section is said second match degree, said final match degree with a fifth threshold value provided preliminarily to determine that there is said particular relationship between said authentication object and said second registration data in the case where said final match degree is larger than said fifth threshold value, while that there is no said particular relationship between said authentication object and said second registration data in the case where said final match degree is equal to or smaller than said fifth threshold value.

12. The biometric information authentication device according to claim 11, wherein said final match degree determining section compares, in the case where said final match degree is calculated by said final match degree calculating section based on said first match degree and said second match degree, said final match degree with a sixth threshold value provided preliminarily to determine that there is said particular relationship between said authentication object and said first registration data as well as said second registration data in the case where said final match degree is larger than said sixth threshold value, while that there is no said particular relationship between said authentication object and said first registration data as well as said second registration data in the case where said final match degree is equal to or smaller than said sixth threshold value.

13. The biometric information authentication device according to claim 10, wherein said final match degree determining section compares, in the case where said final match degree is calculated by said final match degree calculating section based on said first match degree and said second match degree, said final match degree with a sixth threshold value provided preliminarily to determine that there is said particular relationship between said authentication object and said first registration data as well as said second registration data in the case where said final match degree is larger than said sixth threshold value, while that there is no said particular relationship between said authentication object and said first registration data as well as said second registration data in the case where said final match degree is equal to or smaller than said sixth threshold value.

14. The biometric information authentication device according to claim 7, including a plurality of said first registration data and said second registration data respectively; and wherein
- said final match degree calculating section calculates said final match degree for each of said registration data; and
- said final match degree determining section makes said determination based on the maximum final match degree among said plurality of final match degree calculated by said final match degree calculating section.

15. The biometric information authentication device according to claim 7, including a plurality of said first registration data and said second registration data respectively; and wherein
- said final match degree calculating section calculates said final match degree for each of said registration data; and said final match degree determining section makes said determination, for each calculation of final match degree by said final match degree calculating section, based on said final match degree until there exists a determination that there is a particular relationship between said authentication object and said first registration data or said second registration data.

16. The biometric information authentication device according to claim 7, including a plurality of said first registration data and said second registration data respectively; and wherein said first verifying section calculates said first match degree for each of said first registration data, said biometric information authentication device further comprising a first match degree determining section for comparing the maximum first match degree among said plurality of first match degree calculated by said first verifying section with a seventh threshold value provided preliminarily to determine whether or not there is said particular relationship between said authentication object and the first registration data corresponding to the maximum first match degree;

said final match degree calculating section calculates said final match degree for each of said registration data in the case where said first match degree determining section determines that the maximum first match degree is equal to or smaller than said seventh threshold value and that there is no said particular relationship between said authentication object and the first registration data corresponding to the maximum first match degree; and said final match degree determining section makes said determination based on the maximum final match degree among said plurality of final match degree calculated by said final match degree calculating section.

17. The biometric information authentication device according to claim 16, further comprising an authentication advisability determining section for determining, for each of said plurality of first registration data, whether or not to perform verification using said minutia matching method based on said information about the reliability of said first registration data, wherein first registration data, for which said authentication advisability determining section determines not to perform verification using said minutia matching method, is not subject to verification by said first verifying section.

18. The biometric information authentication device according to claim 7, including a plurality of said first registration data and said second registration data respectively; and wherein said first verifying section calculates said first match degree for each of said first registration data, said biometric information authentication device further comprising a first match degree determining section for comparing, for each calculation of first match degree by said first verifying section, said first match degree with a seventh threshold value provided preliminarily to determine whether or not there is said particular relationship between said authentication object and the first registration data corresponding to said first match degree;

said final match degree calculating section calculates said final match degree for each of said plurality of registration data in the case where said first match degree determining section determines that all first match degree calculated by said first verifying section is equal to or smaller than said seventh threshold value and that there is no said particular relationship between said authentication object and said plurality of first registration data; and said final match degree determining section makes said determination, for each calculation of final match degree by said final match degree calculating section, based on said final match degree until there exists a determination that there is a particular relationship between said authentication object and said first registration data or said second registration data.

19. The biometric information authentication device according to claim 18, further comprising a first registration data rearranging section for rearranging said plurality of first registration data in descending order of said first match degree corresponding to each of said first registration data, wherein said determining section makes said determination in accordance with the order rearranged by said first registration data rearranging section.

20. The biometric information authentication device according to claim 7, wherein said final match degree determining section compares said final match degree with a third threshold value provided preliminarily to determine that there is a particular relationship between said authentication object and said first registration data or said second registration data in the case where said final match degree is larger than said third threshold value, while that there is no said particular relationship between said authentication object and said first registration data or said second registration data in the case where said final match degree is equal to or smaller than said third threshold value.

21. A biometric information authentication device comprising:

an obtaining section for obtaining biometric information of an authentication object;

a first extraction section for extracting first to-be-verified data to be used in a minutia matching method from said biometric information obtained by said obtaining section;

a second extraction section for extracting second to-be-verified data to be used in a first pattern matching method from said biometric information obtained by said obtaining section;

a third extraction section for extracting third to-be-verified data to be used in a second pattern matching method from said biometric information obtained by said obtaining section;

a first verifying section for verifying said first to-be-verified data extracted by said first extraction section against first registration data registered preliminarily using said minutia matching method;

a second verifying section for verifying said second to-be-verified data extracted by said second extraction section against second registration data registered preliminarily using said first pattern matching method;

a third verifying section for verifying said third to-be-verified data extracted by said third extraction section against third registration data registered preliminarily using said second pattern matching method;

a first determining section for comparing match degree (herein after referred to as first match degree) between said first to-be-verified data and said first registration data, which is obtained as a result of verification by said first verifying section, with an eighth threshold value provided preliminarily and a ninth threshold value also provided preliminarily to allow said second verifying section to perform verification in the case where said first match degree is equal to or smaller than said eighth threshold value and equal to or larger than said ninth threshold value; and a second determining section for comparing match degree (hereinafter referred to as second match degree) between said second to-be-verified data and said second registration data, which is obtained as a result of verification by said second verifying section, with a tenth threshold value provided preliminarily and an eleventh threshold value also provided preliminarily to allow said third verifying section to perform verification in the case where said second match degree is equal to or smaller than said tenth threshold value and equal to or larger than said eleventh threshold value.

22. The biometric information authentication device according to claim 21, further comprising a first authentication advisability determining section for determining whether or not to perform verification using said minutia matching method based on information about the reliability of said first registration data, wherein in the case of a determination by said first authentication advisability determining section not to perform verification using said minutia matching method, not said first verifying section but said second verifying section performs verification.

23. The biometric information authentication device according to claim 22, wherein said information about the reliability of said first registration data relates to the quality of said first registration data.

24. The biometric information authentication device according to claim 22, wherein said first registration data is generated based on a plurality of biometric information obtained through a plurality of times of collection from the same living body; and said information about the reliability of said first registration data is generated based on match degree obtained by verifying sets of minutia data extracted, respectively, from said plurality of biometric information against each other.

25. The biometric information authentication device according to claim 21, further comprising a second authentication advisability determining section for determining whether or not to perform verification using said first pattern matching method based on information about the reliability of said second registration data, wherein in the case of a determination by said second authentication advisability determining section not to perform verification using said first pattern matching method, not said second verifying section but said third verifying section performs verification.

26. The biometric information authentication device according to claim 25, wherein said information about the reliability of said second registration data relates to the quality of said second registration data.

27. The biometric information authentication device according to claim 25, wherein said second registration data is generated based on a plurality of biometric information obtained through a plurality of times of collection from the same living body; and said information about the reliability of said second registration data is generated based on match degree obtained by verifying a plurality of pattern matching data extracted, respectively, from said plurality of biometric information against each other.

28. A biometric information authentication device comprising:
an obtaining section for obtaining biometric information of an authentication object;
a first extraction section for extracting first to-be-verified data to be used in a minutia matching method from said biometric information obtained by said obtaining section;
a second extraction section for extracting second to-be-verified data to be used in a pattern matching method from said biometric information obtained by said obtaining section;
a first verifying section for verifying said first to-be-verified data extracted by said first extraction section against first registration data registered preliminarily using said minutia matching method;
a second verifying section for verifying said second to-be-verified data extracted by said second extraction section against second registration data registered preliminarily using said pattern matching method; and
a determining section for comparing match degree (hereinafter referred to as first match degree) between said first to-be-verified data and said first registration data, which is obtained as a result of verification by said first verifying section, with a threshold value provided preliminarily (the maximum value of said first match degree where it is determined that there is no particular relationship between said first to-be-verified data and said first registration data) to allow said second verifying section to perform verification in the case where said first match degree is equal to or larger than said threshold value.

29. A biometric information authentication device comprising:
an obtaining section for obtaining biometric information of an authentication object;
a first extraction section for extracting first to-be-verified data to be used in a minutia matching method from said biometric information obtained by said obtaining section;
a second extraction section for extracting second to-be-verified data to be used in a pattern matching method from said biometric information obtained by said obtaining section;
a first verifying section for verifying said first to-be-verified data extracted by said first extraction section against first registration data registered preliminarily using said minutia matching method;
a second verifying section for verifying said second to-be-verified data extracted by said second extraction section against second registration data registered preliminarily using said pattern matching method; and
a determining section for comparing match degree (hereinafter referred to as first match degree) between said first to-be-verified data and said first registration data, which is obtained as a result of verification by said first verifying section, with a threshold value provided preliminarily (the minimum value of said first match degree where it is determined that there is a particular relationship between said first to-be-verified data and said first registration data) to allow said second verifying section to perform verification in the case where said first match degree is equal to or smaller than said threshold value.

30. A biometric information authentication method comprising the steps of:
(a) obtaining biometric information of an authentication object;
(b) extracting first to-be-verified data to be used in a minutia matching method from said biometric information obtained in said step (a) of obtaining;

(c) extracting second to-be-verified data to be used in a pattern matching method from said biometric information obtained in said step (a) of obtaining;

(d) verifying said first to-be-verified data extracted in said step (b) of extracting against first registration data registered preliminarily using said minutia matching method;

(e) verifying said second to-be-verified data extracted in said step (c) of extracting against second registration data registered preliminarily using said pattern matching method; and (f) comparing match degree (hereinafter referred to as first match degree) between said first to-be-verified data and said first registration data, which is obtained as a result of verification in said step (d) of verifying, with a first threshold value provided preliminarily and a second threshold value also provided preliminarily to allow said step (e) of verifying to perform verification in the case where said first match degree is equal to or smaller than said first threshold value and equal to or larger than said second threshold value.

31. A computer-readable recording medium with a biometric information authentication program recorded thereon, for allowing a computer to function as a biometric information authentication device comprising an obtaining section for obtaining biometric information of an authentication object and adapted to determine, based on said biometric information obtained by said obtaining section and data registered preliminarily, whether or not there is a particular relationship between said authentication object and said data, wherein said biometric information authentication program allows said computer to function as:

a first extraction section for extracting first to-be-verified data to be used in a minutia matching method from said biometric information obtained by said obtaining section;

a second extraction section for extracting second to-be-verified data to be used in a pattern matching -method from said biometric information obtained by said obtaining section;

a first verifying section for verifying said first to-be-verified data extracted by said first extraction section against first registration data registered preliminarily using said minutia matching method;

a second verifying section for verifying said second to-be-verified data extracted by said second extraction section against second registration data registered preliminarily using said pattern matching method; and a determining section for comparing match degree (hereinafter referred to as first match degree) between said first to-be-verified data and said first registration data, which is obtained as a result of verification by said first verifying section, with a first threshold value provided preliminarily and a second threshold value also provided preliminarily to allow said second verifying section to perform verification in the case where said first match degree is equal or smaller than to said first threshold value and equal to or larger than said second threshold value.

* * * * *